United States Patent
Mitsui

(10) Patent No.: US 7,222,235 B1
(45) Date of Patent: May 22, 2007

(54) IMAGE PROCESSING SYSTEM UTILIZING DIGITAL WATERMARKS IN PREDETERMINED REGIONS

(75) Inventor: Yasuhiro Mitsui, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/539,421

(22) Filed: Mar. 30, 2000

(30) Foreign Application Priority Data

Mar. 30, 1999 (JP) ............................. H11-090253
Mar. 30, 1999 (JP) ............................. H11-090254

(51) Int. Cl.
*G09C 5/00* (2006.01)
(52) U.S. Cl. ..................... 713/176; 380/54; 380/28
(58) Field of Classification Search .............. 380/3–55, 380/100; 382/100–240; 383/17–905; 355/79; 705/51; 713/176
See application file for complete search history.

(56) References Cited

U.S. PATENT DOCUMENTS 5,875,249 A * 2/1999 Mintzer et al. .............. 380/54
5,901,224 A * 5/1999 Hecht ........................... 713/179
6,233,684 B1 * 5/2001 Stefik et al. .................. 713/176
6,504,941 B2 * 1/2003 Wong ........................... 382/100
6,553,127 B1 * 4/2003 Kurowski .................... 382/100

FOREIGN PATENT DOCUMENTS

JP          H-4-158487          6/1992

* cited by examiner

*Primary Examiner*—Kambiz Zand
*Assistant Examiner*—Ellen C Tran
(74) *Attorney, Agent, or Firm*—Venable LLP; Michael A. Sartori; Catherine M. Voorhees

(57) ABSTRACT

An image processing system comprises an image providing apparatus which provides an image file, from which a digital watermark information can be extracted by using a watermark key that includes an authentication information which authenticates the image file provided by an valid provider, and the watermark key of the image file; and an image utilizing apparatus which extracts the digital watermark information from the image file provided by the image providing apparatus using the watermark key provided by the image providing apparatus, verifies whether the watermark key has been tampered or not using the authentication information in the watermark key, verifies whether the image file has been tampered or not using the verified watermark key, and displays the verified image file.

87 Claims, 41 Drawing Sheets

|  |  |
| --- | --- |
| DATE | JANUARY 31, 1999 |

(12345678)  —R4

| | | |
| --- | --- | --- |
| CERTIFICATE NUMBER | 0123456789 | —R1 |

| | | | | |
| --- | --- | --- | --- | --- |
| NAME | YAMADA TARO | | | |
| | YAMADA TARO | SEX | MALE | |
| BIRTH DATE | JANUARY 31, 1926 | | | |
| ADDRESS | NIHON PREFECTURE, NIHON CITY, NIHON MACHI, NIHON MURA | | | |
| | NIHON PREFECTURE, NIHON CITY, NIHON MACHI, NIHON MURA | | | |
| TELEPHONE NUMBER | 012-3456-7890 | | | |

R2

| | |
| --- | --- |
| SICK NAME | INFLUENZA |
| MEDICAL EXAMINATION STARTING DATE | JANUARY 31, 1985 |
| AMOUNT | 50,000 YEN |

—R3

| | |
| --- | --- |
| POST SCRIPT | |

*Fig. 25*

| REGION 1 | x11, y11, x21, y21 |
|---|---|
| REGION 2 | x12, y12, x22, y22 |
| REGION 3 | x13, y13, x23, y23 |
| ⋮ | ⋮ |
| REGION n | x1n, y1n, x2n, y2n |

*Fig. 26*

| | |
|---|---|
| DATE | JANUARY 31, 1999 |

R4: 12345678

| | |
|---|---|
| CERTIFICATE NUMBER | 0123456789 | — R1

| NAME | YAMADA TARO | | |
|---|---|---|---|
| | YAMADA TARO | SEX | MALE |

R2

| BIRTH DATE | JANUARY 31, 1926 |
|---|---|
| ADDRESS | NIHON PREFECTURE, NIHON CITY, NIHON MACHI, NIHON MURA |
| | NIHON PREFECTURE, NIHON CITY, NIHON MACHI, NIHON MURA |
| TELEPHONE NUMBER | 012-3456-7890 |

| SICK NAME | INFLUENZA |
|---|---|
| MEDICAL EXAMINATION STARTING DATE | JANUARY 31, 1985 |
| AMOUNT | 50,000 YEN | — R3

| POST SCRIPT | |
|---|---|

Fig. 27

| REGION 1 | EMBEDDING REGION 1 | CHARACTER | GRAY | LARGE |
| --- | --- | --- | --- | --- |
| REGION 2 | EMBEDDING REGION 2 | CHARACTER | GRAY | SMALL |
| REGION 3 | EMBEDDING REGION 3 | PHOTOGRAPH | GRAY | DENSE |
| ⋮ | ⋮ | ⋮ | ⋮ | ⋮ |
| REGION n | EMBEDDING REGION n | PHOTOGRAPH | COLOR | COARSE |

*Fig. 32*

|  |  |  |
|---|---|---|
| DATE | JANUARY 31, 1999 | |

U1 → DATE label, U2 → CERTIFICATE NUMBER, T1 → JANUARY 31, 1999, T2 → 0123456789, Z → outer box, W → 12345678

| DATE | JANUARY 31, 1999 | | 12345678 |
|---|---|---|---|
| CERTIFICATE NUMBER | 0123456789 | | |
| NAME | YAMADA TARO | | |
|  | YAMADA TARO | | |
| BIRTH DATE | JANUARY 31, 1926 | | |
| ADDRESS | NIHON PREFECTURE, NIHON CITY, NIHON MACHI, NIHON MURA | | |
|  | NIHON PREFECTURE, NIHON CITY, NIHON MACHI, NIHON MURA | | |
| TELEPHONE NUMBER | 012-3456-7890 | | |

*Fig. 35*

| REGION 1 | OBJECT REGION T1 | EMBEDDING REGION U1 |
| REGION 2 | OBJECT REGION T2 | EMBEDDIMG REGION U2 |
| REGION n | OBJECT REGION Tn | EMBEDDING REGION Un |

*Fig. 36*

| REGION 1 | OBJECT REGION T1 |
|----------|------------------|
| REGION 2 | OBJECT REGION T2 |
| ⋮ | ⋮ |
| REGION n | OBJECT REGION Tn |

| DATE | JANUARY 31, 1999 | | 12345678 |

| CERTIFICATE NUMBER | 0123456789 | |
|---|---|---|
| NAME | YAMADA TARO | YAMADA TARO |
| BIRTH DATE | JANUARY 31, 1926 | |
| ADDRESS | NIHON PREFECTURE, NIHON CITY, NIHON MACHI, NIHON MURA | |
| TELEPHONE NUMBER | 012-3456-7890 | |

*Fig. 40*

IMAGE PROCESSING SYSTEM UTILIZING DIGITAL WATERMARKS IN PREDETERMINED REGIONS

This patent application claims priority based on Japanese patent application, H11-090253 filed on Mar. 30, 1999 and H11-090254 filed on Mar. 30, 1999, the contents of which are incorporated herein by reference.

BACKGROUND OF THE INVENTION

1. Field of the Invention

The present invention relates to an image processing system. In particular, the present invention relates to an image processing system that can prevent an image from being tampered by embedding a digital watermark. Here, the tamper means the operation of alteration or replacement. The alteration changes the value of the data, which constitute the contents of the image. The replacement replaces the image to other data.

2. Description of the Related Art

There exist some needs for managing documents as image data, such as billing or recording sheets, and utilizing the electric documents in a network-connected image processing system. The image processing system has to process the large amount of the images of the documents having various document types. The image processing system also has to be strictly secure from tampering with the electric documents.

The conventional image processing system manages the image basically by controlling the access to the image storing and processing apparatus. The method of controlling the access prevents the image file from being tampered by prohibiting writing to the image file and permitting reading the image file. The access control also can be realized by a system coupling with a cryptosystem. The system encodes the image and stores the decoding key and the encoded image. The encoded image cannot be decoded without the decoding key, and the image cannot be processed without decoding the encoded image.

As a method of detecting tampering with the image other than encoding the image itself, there is a method which generates a characteristic bit pattern such as a message digest, a compression parameter, or a hash value, which function like the fingerprint of the data, from the image data as a verifying data. The method then manages the bit pattern independently of the image, generates the verifying data from the image to be verified, and compares the generated verifying data with the managed verifying data. If the generated verifying data is different from the managed verifying data, it can be recognized that the image data has been tampered. The message digest function to generate the verifying data, which is most generally used, is a series of the algorithms such as MD2, MD4, and MD5 by the RSA Security Inc.

Even in the system which generates the verifying data and detecting tamper by examining the verifying data, both the image and the verifying data can be replaced by generating the verifying data from the tampered image, and thus the verifying data must be encoded before using.

As a cryptosystem, generally, there are a "common key system", which encoding and decoding the data by a common private key, and a "public key system", which uses a public key that is open to the public and a private key that is secret to the people other than possessor of the key. The data is encoded by the public key and decoded by the private key in the public key system. In addition, a digital signature is used for the authentication. As an example of the common key system, there are the DES system, Data Encryption Standard system, the FEAL system, Fast Encryption Algorithm system by Nippon Telegraph and Telephone Corporation, the MISTY system by Mitsubishi Electric Corporation. As an example of the public key system, there is the RSA public key system by RSA Security Inc.

As shown in Nikkei Electronics, Feb. 24, 1997 (no. 683), the conventional digital watermark technology was mostly used for copyright protection. Many methods have been proposed where the image quality does not deteriorate and the watermark is embedded as inerasably as possible. These methods use digital watermark, which is difficult to recognize and difficult to erase even by alternating the image, to embed an information and confirm the copyright by examining the embedded information. Furthermore, the digital watermark was embedded all over the image because the digital watermark was used for protecting the whole image.

As a format identifying technology of the image, there is a method of identifying the format by analyzing the structure of the frame format in the form as disclosed in Japanese Patent Application Laid-Open No. H4-158487. There is also a method of distinguishing an image quality and separates into regions as described in the Journal of the Institute of Image Electronics Engineers of Japan in the 124th issue, Vol. 25, No. 5, P. 533-P. 540, 1996.

As a method of using the digital watermark for the image verification, it is proposed to embed a stamping information in the original image by using a steganography, or data hiding, that is one characteristic of the digital watermark. Tamper can be detected by extracting the stamping information from the original image and examining the stamping information. Many uses are proposed for information embedding using the digital watermark. The systems are proposed that embed various managing informations such as an information of apparatus that generates an image, creator information, and user information other than the copyright information, in image by the digital watermark.

However, tampering by a privileged user cannot be prevented by operating the access right only. It cost a lot to configure a complete set of the access rights for all apparatus that process the images. The image managing method by encoding needs to decode or re-encode an image file to display the image because the image file itself is encoded. Therefore, it causes a problem that the image processing load increases, especially for the system which processes a large amount of images.

In a system that uses the images in a plurality of machines distributed within the system, it is difficult to manage perfectly the encoding and decoding processes, the encoding and decoding keys, and the decoded images, because the decoding or the encoding is processed at each machines. Therefore, iniquity can be easily done by attacking a machine, which is less strictly secured. In the case of detecting tamper by a verifying data such as a message digest, the cryptosystem that manages the verifying data is needed to protect the verifying data when managing the verifying data, and the same problems may occur as the image encoding systems described above.

Furthermore, the method of using the digital watermark in the conventional image processing system described above embeds the digital watermark all over the image because the purpose of using digital watermark is to protect the whole image. There was no problem when using the digital watermark for the purpose of protecting the copyright of the image such as a single image of a picture or a photograph.

However, embedding the digital watermark increases the quantity of information of the image itself because some additional information are inserted into the image as noise components, although many methods have been proposed for minimizing the visual influence on the image. If the image is not compressed the size of the image, in which the digital watermark is embedded, is the same as the size of the original image. If the image is compressed, in most cases, the size of the image, in which the digital watermark is embedded, is larger than the size of the original image so that a large storing space will be needed and costs lots. It also takes time to process the image.

Additionally, there is a possibility of decreasing the image quality depending on the location when the digital watermark is used for an image having images with different qualities such as a character and a photograph. It is because the digital watermark technology does not take the difference in the image quality. There is a case that the image cannot be recognized because the conventional use of the digital watermark does not consider the influence on the character recognition of the image by OCR, so that the embedded watermark can be a noise for the character recognition.

SUMMARY OF THE INVENTION

Therefore, it is an object of the present invention to provide an image processing system which overcomes the above issues in the related art. This object is achieved by combinations described in the independent claims. The dependent claims define further advantageous and exemplary combinations of the present invention.

According to the first aspect of the present invention, an image processing system can be provided which comprises an image providing apparatus which provides an image file, from which a digital watermark information can be extracted by using a watermark key that includes an authentication information which authenticates the image file provided by an valid provider, and the watermark key of the image file; and an image utilizing apparatus which extracts the digital watermark information from the image file provided by the image providing apparatus using the watermark key provided by the image providing apparatus, verifies whether the watermark key has been tampered or not using the authentication information in the watermark key, verifies whether the image file has been tampered or not using the verified watermark key, and displays the verified image file.

According to the another aspect of the present invention, an image processing system can be provided comprises an image providing apparatus which provides an image file, from which a digital watermark information can be extracted using a watermark key that includes an authentication information which authenticates the image file provided by an valid provider; and an image utilizing apparatus which generates a watermark key which includes an authentication information that authenticates the image file provided by the valid provider, extracts the digital watermark information from the image file provided by the image providing apparatus using the generated watermark key, verifies whether the watermark key has been tampered or not using the authentication information in the watermark key, verifies whether the image file has been tampered or not using the verified watermark key, and displays the verified image file.

According to the other aspect of the present invention, an image processing system can be provided which comprises an image providing apparatus which generates a watermark key which includes an authentication information that authenticates an image file provided by a valid provider, embeds a digital watermark, which can be extracted by using the watermark key, in the image file, and provides the image file and the watermark key; an image managing apparatus which extracts the digital watermark information from the image file provided by the image providing apparatus using the watermark key provided by the image providing apparatus, verifies whether the watermark key has been tampered or not using the authentication information in the watermark key, verifies whether the image file has been tampered or not using the verified watermark key, stores the verified image file and the verified watermark key, and provides the verified image file and the verified watermark key to a user; and an image utilizing apparatus which extracts the digital watermark information from the image file provided by the image managing apparatus using the watermark key provided by the image managing apparatus, verifies whether the watermark key has been tampered or not using the authentication information in the watermark key, verifies whether the image file has been tampered or not using the verified watermark key, and displays the verified image file.

According to the still other aspect of the present invention, an image processing system can be provided which comprises an image providing apparatus which generates a watermark key which includes an authentication information that authenticates an image file provided by a valid provider, embeds a digital watermark, which can be extracted, in the image file by the watermark key, and provides the image file; an image managing apparatus which generates a watermark key which includes an authentication information that authenticates the image file provided by the valid provider, extracts the digital watermark information from the image file provided by the image providing apparatus using the watermark key, verifies whether the watermark key has been tampered or not using the authentication information in the watermark key, verifies whether the image file has been tampered or not using the verified watermark key, stores the verified image file, and provides the verified image file to a user; and an image utilizing apparatus which generates a watermark key which includes an authentication information that authenticates the image file provided by the valid provider, extracts the digital watermark information from the image file provided by the image managing apparatus using the watermark key, verifies whether the watermark key has been tampered or not using the authentication information in the watermark key, verifies whether the image file has been tampered or not using the verified watermark key, and displays the verified image file.

According to the still other aspect of the present invention, an image processing system can be provided which comprises an image providing apparatus which generates a watermark key which includes an authentication information that authenticates an image file provided by a valid provider, embeds a digital watermark, which can be extracted, in the image file by the watermark key, and provides the image file; an image managing apparatus which generates a watermark key which includes an authentication information that authenticates the image file provided by the valid provider, extracts the digital watermark information from the image file provided by the image providing apparatus using the watermark key, verifies whether the watermark key has been tampered or not using the authentication information in the watermark key, verifies whether the image file has been tampered or not using the verified watermark key, stores the verified image file, associates an additional information, which includes an authentication information that authenticates the image file provided by the valid provider, with the image file, and provides the image file with the additional information to a user; and an image utilizing apparatus which extracts the authentication information from the additional information, generates a watermark key which includes the authentication information, extracts the digital watermark information from the image file provided by the image managing apparatus using the watermark key, verifies whether the watermark key has been tampered or not using the authentication information in the watermark key, verifies whether the image file has been tampered or not using the verified watermark key, and displays the verified image file.

An image processing system can be provided such that the image utilizing apparatus generates the authentication information which authenticates the image file provided by the valid provider, and compares the generated authentication information with an authentication information extracted from the provided watermark key to verify whether the provided watermark key is valid.

An image processing system can be provided such that the image managing apparatus generates the authentication information which authenticates the image file provided by the valid provider, and compares the generated authentication information with an authentication information extracted from the provided watermark key to verify whether the provided watermark key is valid.

An image processing system can be provided such that the image utilizing apparatus generates the authentication information which authenticates the image file provided by the valid provider, and compares the generated authentication information with an authentication information extracted from the provided watermark key to verify whether the provided watermark key is valid.

An image processing system can be provided such that the image managing apparatus associates an additional information, which includes an authentication information that authenticates the image file provided by the valid provider, with the image file, and provides the image file with the additional information to a user; and the image utilizing apparatus extracts the authentication information in the additional information, generates a watermark key which includes the authentication information, extracts the information of the digital watermark from the image file provided by the image managing apparatus by the watermark key, verifies whether the image file has been tampered or not, and displays the verified image file.

An image processing system can be provided such that the authentication information includes a provider identifying information which identifies the provider of the image file or an image identifying information which identifies the image file.

An image processing system can be provided such that the image providing apparatus defines a location information for embedding a digital watermark in a part of a region in an image file, and provides the image file in which the digital watermark is embedded based on the location information; and the image utilizing apparatus extracts the digital watermark from the image file provided by the image providing system based on the location information, and verifies whether a data in the part of a region, in which the digital watermark is embedded, has been tampered.

An image processing system can be provided such that the image providing apparatus recognizes a format of an image file, and provides the image file in which the digital watermark is embedded in a part of a region based on the format; and the image utilizing apparatus recognizes the format of the image file provided by the image providing apparatus, extracts the digital watermark from the part of a region based on the format, and verifies whether a data in the part of a region, in which the digital watermark is embedded, has been tampered.

An image processing system can be provided which comprises an image providing apparatus which defines a location information for embedding a digital watermark in a part of a region in an image file and provides the image file, in which the digital watermark is embedded based on the location information; and an image utilizing apparatus which extracts the digital watermark from the image file provided by the image providing apparatus based on the location information, and verifies whether a data in the part of a region, in which the digital watermark is embedded, has been tampered.

An image processing system can be provided which comprises an image providing apparatus which recognizes a format of an image file and provides the image file in which a digital watermark is embedded in a part of a region based on the format; and an image utilizing apparatus which recognizes the format of the image file, extracts the digital watermark from the part of a region based on the format, and verifies whether a data in the part of a region in the image file, in which the digital watermark is embedded, has been tampered.

An image processing system can be provided such that the image providing apparatus provides the image file in which a different kind of the digital watermark is embedded in a different region in the image file.

An image processing system can be provided such that the image providing apparatus provides the image file in which a different kind of the digital watermark is embedded according to an image quality in each region where the digital watermark is embedded.

An image processing system can be provided such that the location information for embedding a digital watermark in the part of a region includes a location information of a region for displaying specific information necessary for detecting a tamper; and the image utilizing apparatus extracts the digital watermark with the message digest from the image file based on the location information, and generates a corresponding message digest using the specific information in the provided image file, and detects tampering with the image file by comparing the extracted message digest with the corresponding generated message digest.

An image processing system can be provided such that the location information for embedding a digital watermark in the part of a region includes a location information of a region for displaying specific information necessary for detecting a tamper and a location information of a region for embedding a message digest corresponding to the specific information; and the image utilizing apparatus extracts the digital watermark with the message digest from the image file based on the location information, generates a corresponding message digest using the specific information in the provided image file, and detects tampering with the image file by comparing the extracted message digest with the corresponding generated message digest.

An image processing system can be provided such that the region for embedding the message digest corresponding to the specific information is independent of the region for displaying the specific information necessary for detecting the tamper.

An image processing system can be provided such that the location information is registered in both of the image providing apparatus and the image utilizing apparatus, and the image providing apparatus embeds the digital watermark in the image file based on the registered location information, and the image utilizing apparatus extracts the digital watermark from the image file based on the registered location information.

An image processing system can be provided such that the image providing apparatus which provides the image file transfers the location information to the image utilizing apparatus, and the image providing apparatus embeds the digital watermark in the image file based on the location information to be transferred, and the image utilizing apparatus extracts the digital watermark from the image file based on the location information transferred from the image providing apparatus.

This summary of the invention does not necessarily describe all necessary features so that the invention may also be a sub-combination of these described features.

BRIEF DESCRIPTION OF THE DRAWINGS

FIG. 25 shows an example of the document formats in which the necessary specific information is dispersed.

FIG. 26 shows an example of the document format information table.

FIG. 27 shows the form X in which the digital watermark is embedded.

FIG. 32 shows an example of the document format information table.

FIG. 35 shows an example of the form Z in which the digital watermark is embedded. The case is assumed that the digital watermark is used for detecting the tamper of the form Z.

FIG. 36 shows an example of the document format information table.

FIG. 38 shows another example of the document format information table.

FIG. 40 shows the example of the form P.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
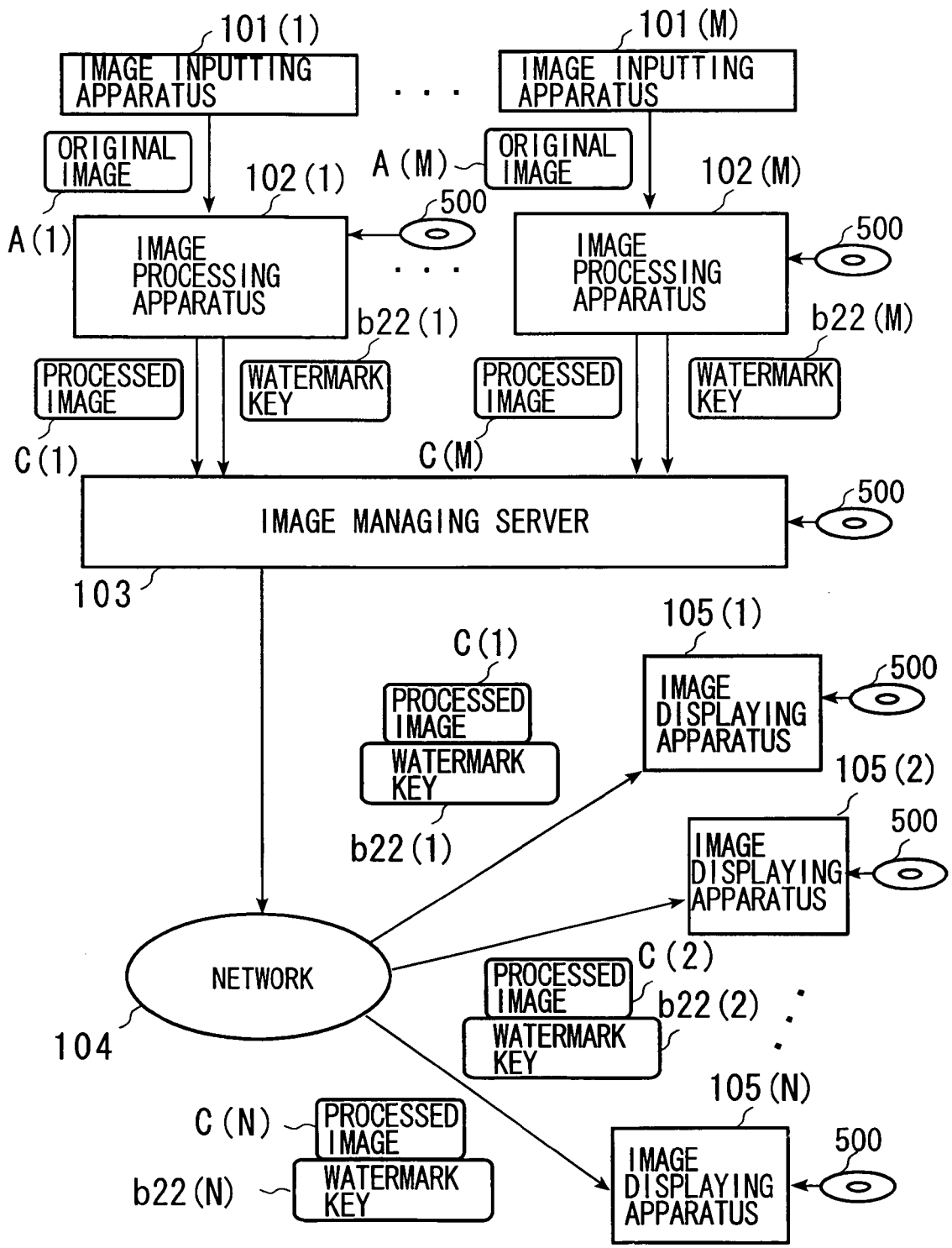
FIG. 1 shows the network structure of the image processing system of the first embodiment of the present invention.

FIG. 1 shows the network structure of the image processing system of the first embodiment of the present invention. In this image processing system, the images input by an image inputting apparatus 101(1) to 101(M) are displayed by an image displaying apparatus 105(1) to 105(N) through an image processing apparatus 102(1) to 102 (M), an image managing server 103, and a network 104. The image processing apparatus 102 is an example of an image providing apparatus, the image managing server 103 is an example of an image managing apparatus, and the image displaying apparatus 105 is an example of an image utilizing apparatus. Each of CD-ROMs 500 as an example of a recording medium can store a computer program to be executed on the image processing apparatus 102, the image managing server 103, and the image displaying apparatus 105 respectively. The stored program is read from each of CD-ROMs 500 and installed and executed on the corresponding apparatus as shown in FIG. 1. In the following explanation, let 101(m) be the m-th image inputting apparatus among 101(1) to 101 (M), and let 102(m) be the m-th image processing apparatus 102(1) to 102 (M), and let 105(n) be the n-th image displaying apparatus 105(1) to 105(N).

The image inputting apparatus 101(m) inputs an image and converts the input image to electronic data. The image inputting apparatus 101(m) may be a scanner or a digital camera. The image inputting apparatus 101(m) outputs the input image data as an original image A(m). The image processing apparatus 102(m) has a function of inputting the original image A(m) from the image inputting apparatus 101(m) and outputting a pair of a processed image C(m) and a watermark key b22(m) which is encoded. The image processing apparatus 102(m) generates the processed image C(m) by embedding a digital watermark into the original image A(m).

Figure 2:
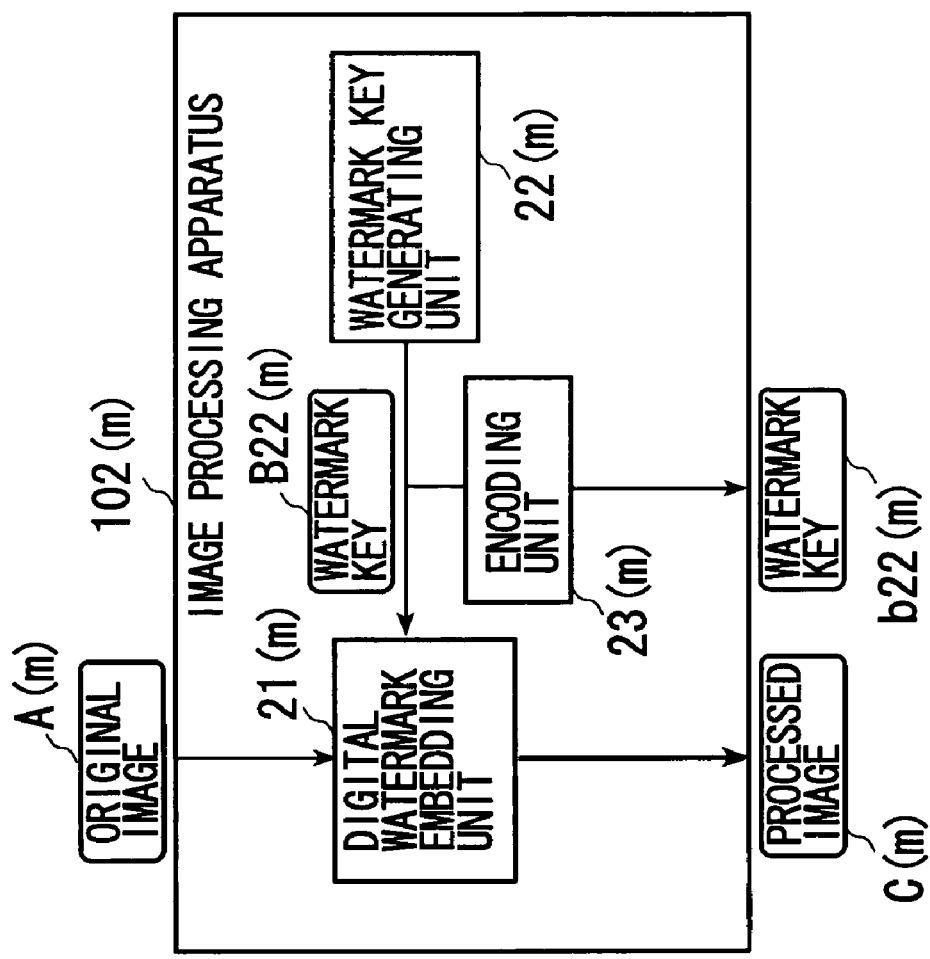
FIG. 2 shows a block diagram which shows the function of the image processing apparatus of the first embodiment.

FIG. 2 shows a block diagram which shows the function of the image processing apparatus of the first embodiment. This image processing apparatus 102(m) has a digital watermark embedding unit 21(m), a watermark key generating unit 22(m), and an encoding unit 23(m). The digital watermark embedding unit 21(m) outputs the processed image C(m) by embedding an digital watermark, which is embedded for detecting tampering with the original image A(m), into the original image A(m) using the watermark key B22(m). The watermark key generating unit 22(m) generates the watermark key B22(m). Here, the watermark key B22(m) is explained as a common key that can be used for both embedding and detecting the digital watermark, but the watermark keys B22 for each of the embedding and the detecting can be different.

If the original image A(m), the processed image C(m), and the watermark key B22(m) can be easily obtained, the method of embedding the digital watermark can be easily analyzed. Then, it becomes easier to tamper and forge the processed image C(m) by examining the relationship between the watermark keys B22 and the difference between the various original images A(m) and corresponding processed images C(m). Therefore, it is preferable that the watermark key B22(m) is not distributed in an original format. Here, the case is assumed that the watermark key B22(m) is generated and exchanged by a public key cryptosystem such as RSA.

Figure 3:
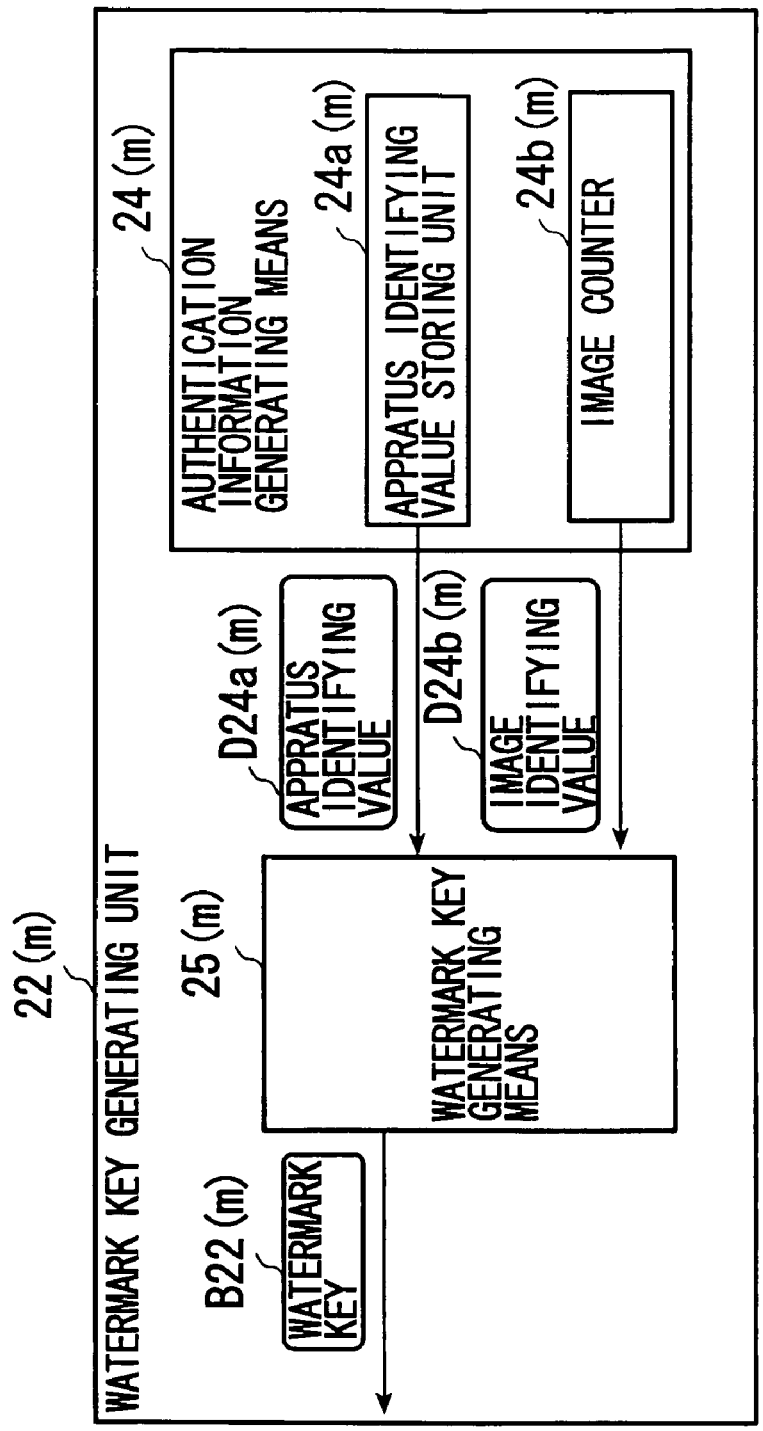
FIG. 3 shows a block diagram which shows the function of the watermark key generating unit in the image processing apparatus of the first embodiment.

FIG. 3 shows a block diagram which shows the function of the watermark key generating unit in the image processing apparatus of the first embodiment. This watermark key generating unit 22(m) has an authentication information generating means 24(m) and a watermark key generating means 25(m). The authentication information generating means 24(m) has a function of generating an authentication information which authenticates the image file that is provided by a valid provider. The authentication information has a provider identifying information to identify the provider of the image file and an image identifying information to identify the image file. Here, an apparatus identifying value D24a(m) for identifying the image processing apparatus 102(m), which is a provider, and an image identifying value D24b(m) for identifying the original image A(m) are used.

Furthermore, the authentication information generating means 24(m) has an apparatus identifying value storing unit 24a(m), which stores the apparatus identifying value D24a(m), and an image counter 24b(m). The image counter outputs the image identifying value D24b(m), which is for numbering the original image A(m), as a count number that counts the number of the times of processing of the original image A(m). The watermark key generating means 25(m) generates the watermark key B22(m) which includes the apparatus identifying value D24a(m) and the image identifying value D24b(m).

For example, in the case of setting the apparatus identifying value D24a(m) as "KKK FJI123" and setting the image counter D24b(m) as "01234567", the watermark key generating means 25(m) generates the watermark key B22(m) as "KKK FJI12301234567", which simply connects the apparatus identifying value D24a(m) and the image identifying value D24b(m). The value set for software and hardware inside the image processing apparatus 102(m) can be used for apparatus identifying value D24a(m).

As shown in the FIG. 2, the encoding unit 23 outputs the watermark key b22(m) by encoding the watermark key B22(m). The image processing apparatus 102(m) then outputs a pair of the processed image C(m) and the watermark key b22(m). As shown in the FIG. 1, the image managing server 103 is a server which stores and manages the processed image C(m) and the watermark key b22(m) sent from the image processing apparatus 102(m). The image processing apparatus 102(m) can be constructed as a usual database or a workflow system. The image processing apparatus 102(m) manages the processed image C(m) and the watermark key b22(m) as a pair.

Figure 4:
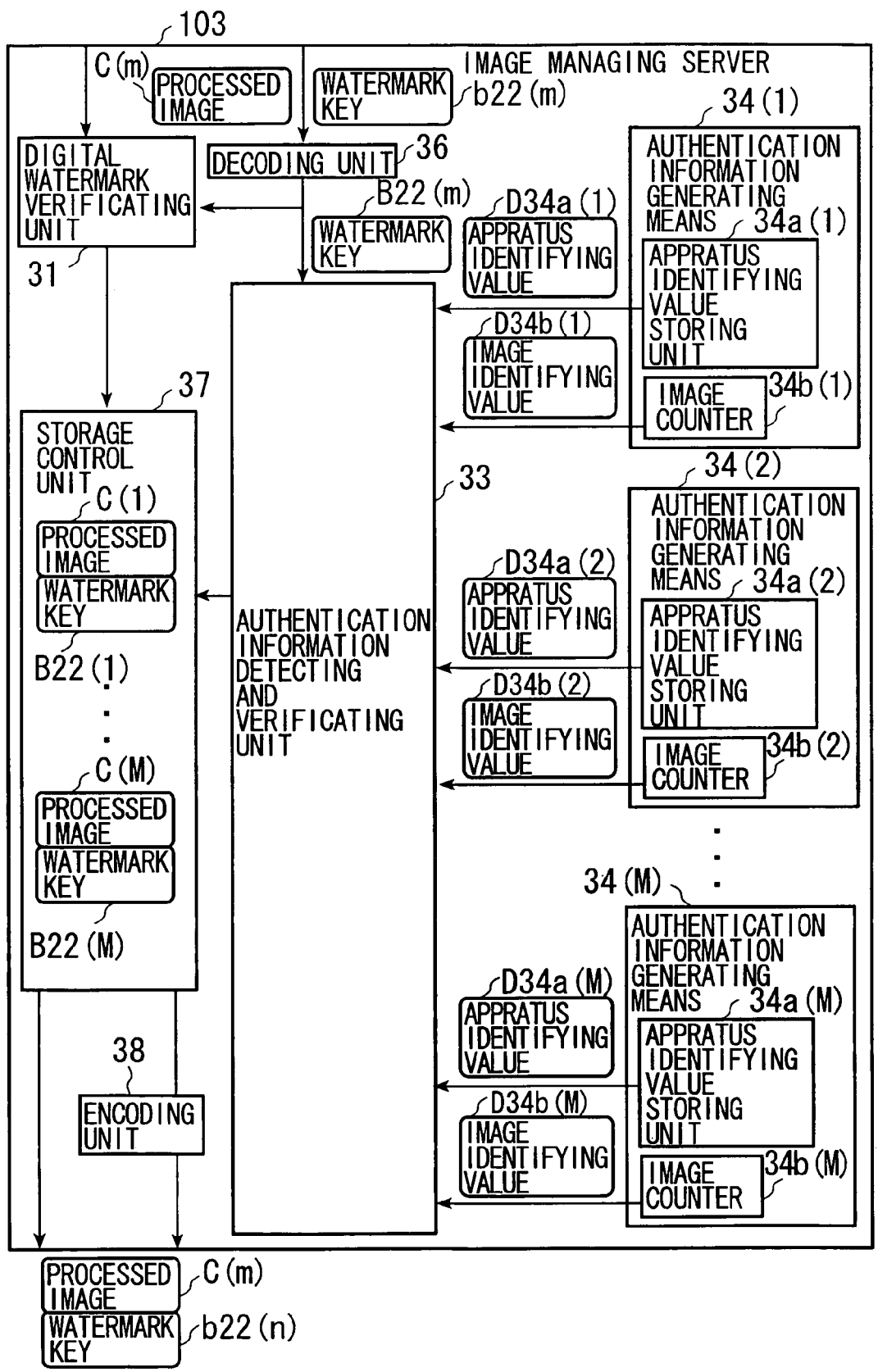
FIG. 4 shows a block diagram which shows the function of the image managing server of the first embodiment.

FIG. 4 shows a block diagram which shows the function of the image managing server of the first embodiment. The image managing server 103 has a digital watermark verifying unit 31, an authentication information detecting and verifying unit 33, an authentication information generating means 34(1) to 34(m), a decoding unit 36, a storage control unit 37, and an encoding unit 23. The m-th authentication information generating means is called as the authentication information generating means 34(m) in following. The digital watermark verifying unit 31 verifies whether the digital watermark can be extracted from the processed image C(m) provided by the image processing apparatus 102(m) using the watermark key b22(m) which is also provided by the image processing apparatus 102(m).

If the watermark key b22(m) is valid, it can be recognized that the processed image C(m) has been tampered when the tamper is detected in the processed image C(m) even if the digital watermark can be extracted from the processed image C(m). If the digital watermark cannot be extracted, it can be recognized that the processed image C(m) has been replaced. The authentication information detecting and verifying unit 33 extracts the apparatus identifying value D24a(m) and the image identifying value D24b(m).

The authentication information detecting and verifying unit 33 then compares the apparatus identifying value D34a(M) and the image identifying value D34b(M), which is generated from the authentication information generating means 34(m), with the apparatus identifying value D24a(m) and the image identifying value D24b(m) to verify whether the provided watermark key b22(m) is valid. The m-th apparatus identifying value is called as the apparatus identifying value D34a(m) in the following. The m-th image identifying value D34b(m) is called as the image identifying value D34b(m) in the following.

The authentication information generating means 34(m) has a function, which generates the authentication information that authenticates the image file provided by the valid provider. The authentication information has a provider identifying information to identify the provider of the image file and an image identifying information to identify the image file. Here, the apparatus identifying value D34a(m), which is identical with the apparatus identifying value D24a(m) for identifying the image processing apparatus 102(m), which is a provider, and the image identifying value D34b(m), which is identical with the image identifying value D24b(m) for identifying the original image A(m) are used.

Furthermore, the authentication information generating means 34(m) has an apparatus identifying value storing unit 34a(m), which stores the apparatus identifying value D34a(m), and an image counter 34b(m). The image counter 34b(m) outputs the image identifying value D34b(m), which is for numbering the original image A(m), as a count number that counts the number of the times of processing of the processed image C(m). The apparatus identifying value D34a(m) is stored in the apparatus identifying value storing unit 34a(m), and the image counter 34b(m) is set before starting the operation of the system or during the operation.

The decoding unit 36 decodes the watermark key b22(m), which is encoded and sent from the image processing apparatus 102(m), to the original watermark key B22(m). The storage control unit 37 manages the processed image C(m) and the watermark key B22(m) as a pair. The encoding unit 38 generates the watermark key b22(n) by encoding the watermark key B22(m) corresponding to each of the image displaying apparatus 105(n). The image managing server 103 sends the each pair of processed image C(m) and the watermark key b22(n) to the image displaying apparatus 105(n) as shown in FIG. 1. Here, it is assumed that the number of the times of processing the images at the image processing apparatus 102(m) and the number of times of displaying the images at the image displaying apparatus 105(n) are the same when the processed image C(m), which is processed at the image processing apparatus 102(m), is sent through the image managing server 103 to the image displaying apparatus 105(n) to be displayed. This assumption is also valid for the following embodiments.

As shown in the FIG. 1, the network 104 is a network constructed by such as LAN or WAN. The image displaying apparatus 105(n) is an apparatus to display the processed image C(m).

Figure 5:
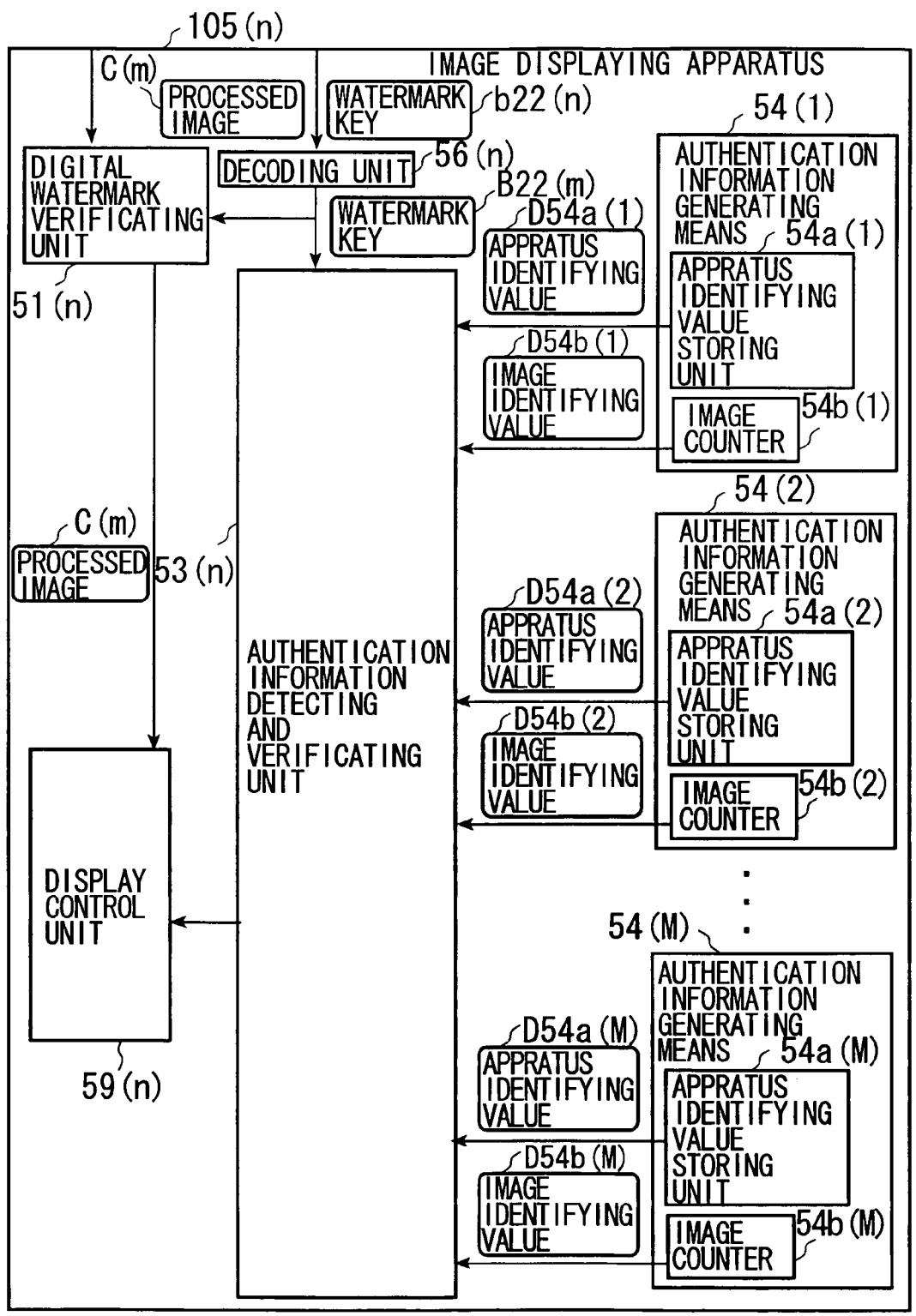
FIG. 5 shows a block diagram which shows the function of the image displaying apparatus of the first embodiment.

FIG. 5 shows a block diagram which shows the function of the image displaying apparatus of the first embodiment. This image displaying apparatus 105(n) has a digital watermark verifying unit 51(n), an authentication information detecting and verifying unit 53(n), authentication information generating means 54(1) to 54(M), a decoding unit 56(n), and a display control unit 59(n). The m-th authentication information generating means is called as the authentication information generating means 54(m) in the following. The digital watermark verifying unit 51 verifies whether the digital watermark can be extracted from the processed image C(m) provided by the image managing server 103 using the watermark key B22(m) which is also provided by the image managing server 103.

If the watermark key b22(m) is valid, it can be recognized that the processed image C(m) has been tampered when a tamper is detected in the processed image C(m) even if the digital watermark can be extracted from the processed image C(m). If the digital watermark cannot be extracted, it can be recognized that the processed image C(m) has been replaced. The authentication information detecting and verifying unit 53(n) extracts the apparatus identifying value D24a(m) and the image identifying value D24b(m) from the watermark key B22(m).

The authentication information detecting and verifying unit 53(n) then compares the apparatus identifying value D54a(m) and the image identifying value D54b(m), which is generated from the authentication information generating means 54(n), with the apparatus identifying value D24a(m) and the image identifying value D24b(m) to verify whether the provided watermark key B22(m) is valid.

The authentication information generating means 54(m) has a function, which generates the authentication information that authenticates the image file provided by the valid provider. The authentication information has a provider identifying information to identify the provider of the image file and an image identifying information to identify the image file. Here, the apparatus identifying value D54a(m), which is identical with the apparatus identifying value D24a(m) for identifying the image processing apparatus 102(m), which is a provider, and an image identifying value D54b(m), which is identical with the image identifying value D24b(m) for identifying the original image A(m) are used.

Furthermore, the authentication information generating means 54(m) has an apparatus identifying value storing unit 54a(m), which stores the apparatus identifying value D54a(m), and an image counter 54b(m). The image counter 54b(m) outputs the image identifying value D54b(m), which is for numbering the order of the original image A(m) to be sent, as a count number that counts the number of the times of processing of the processed image C(m). The apparatus identifying value D54a(m) is stored in the apparatus identifying value storing unit 54a(m), and the image counter 54b(m) is set before starting the operation of the system or during the operation.

The decoding unit 56(n) decodes the watermark key b22(m), which is encoded and sent from the image managing server 103, to the original watermark key B22(m). The display control unit 59(n) displays the provided processed image C(m) on the displaying unit, not shown in the figure, such as CRT.

The flow of the image processing of the image processing system shown above will be explained using FIG. 6 to FIG. 8. First, the original image A(m), which is input and processed to be an electronic data by the image inputting apparatus 101(m) is input to image processing apparatus 102(m).

Figure 6:
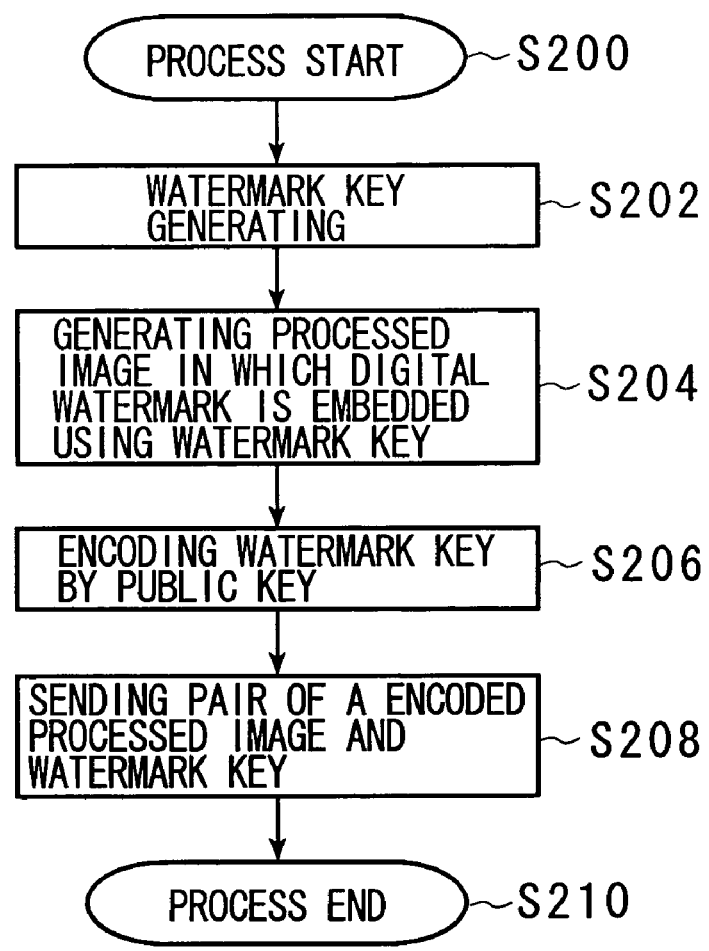
FIG. 6 shows a flow chart of the process of the image processing apparatus $102(m)$.

FIG. 6 shows a flow chart of the process of the image processing apparatus 102(m). The image processing apparatus 102(m) generates the watermark key B22(m) for embedding the digital watermark in the watermark key generating unit 22(m) (S202). The digital watermark embedding unit 21(m) then generates processed image C(m), in which a digital watermark is embedded, using the watermark key B22(m) (S204). In the image processing apparatus 102(m), the encoding unit 23(m) encodes the watermark key B22(m), which is generated by a public key of the image managing server 103, to generate a watermark key b22(m) (S206). The image processing apparatus 102(m) then sends a pair of the processed image C(m) and the watermark key b22(m) to the image managing server 103 (S208).

Figure 7:
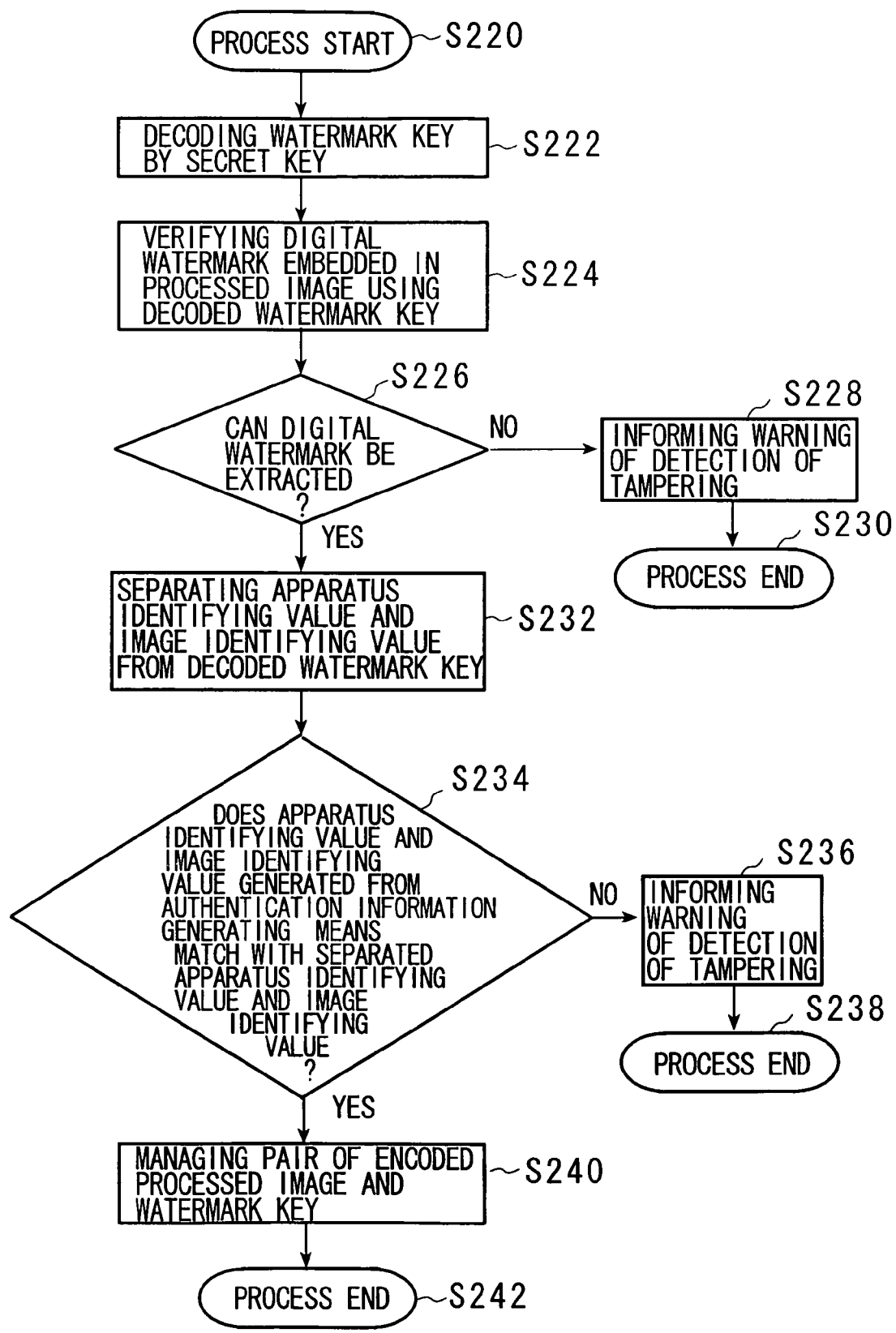
FIG. 7 shows a flow chart of the process of the image managing server 103.

FIG. 7 shows a flow chart of the process of the image managing server 103. In the image managing server 103, the decoding unit 36 decodes the sent watermark key b22(m) by the private key of the image managing server 103 (S222). The digital watermark verifying unit 31 verifies the digital watermark of the processed image C(m) by the decoded watermark key B22(*m*) (S224). If the digital watermark can be extracted, it is confirmed that the processed image C(m), which is sent, is not tampered (S226). In the image managing server 103, the authentication information detecting and verifying unit 33 separates the apparatus identifying value D24*a*(*m*) and the image identifying value D24*b*(*m*) from the decoded water mark key B22(*m*) (S232). The authentication information detecting and verifying unit 33 compares each of the apparatus identifying value D24*a*(*m*) and the image identifying value D24*b*(*m*) with the apparatus identifying value D34*a*(*m*) and the image identifying value D34*b*(*m*) generated by the authentication information generating means 34(*m*) (S234).

If the apparatus identifying value D24*a*(*m*) matches with the apparatus identifying value D34*a*(*m*), and the image identifying value D24*b*(*m*) matches with the image identifying value D34*b*(*m*) as a result of this comparison, the authentication information detecting and verifying unit 33 verifies the provided watermark key B22(*m*) is valid so that the watermark key B22(*m*) is provided by a valid provider. If both of the value do not match or one of the values does not match, the authentication information detecting and verifying unit 33 verifies that the watermark key B22(*m*) provided by the valid provider is invalid because the watermark key B22(*m*) has been tampered (S236).

In the image managing server 103, the storage control unit 37 manages the pair of the processed image C(m) and the watermark key B22(*m*), which are not tampered (S240). Here, the image managing server 103 informs by displaying a warning of detecting the tamper when the digital watermark cannot be extracted or when the tamper is detected although the digital watermark can be extracted because the processed image C(m) is invalid. In this case, the image managing server 103 does not display the processed image C(m) so that the iniquity done by the tampered image can be prevented.

When the image managing server 103 is requested a transfer of the processed image C(m) from the image displaying apparatus 105(*n*) or sends the processed image C(m) automatically, the image managing server 103 generates the watermark key b22(*n*), which is made by encoding the watermark key B22(*m*) corresponding to each of the image displaying apparatus 105(*n*) in the encoding unit 38, and sends each of the watermark key b22(*n*) with the corresponding processed image C(m) as a pair to each of the image displaying apparatus 105(*n*).

Figure 8:
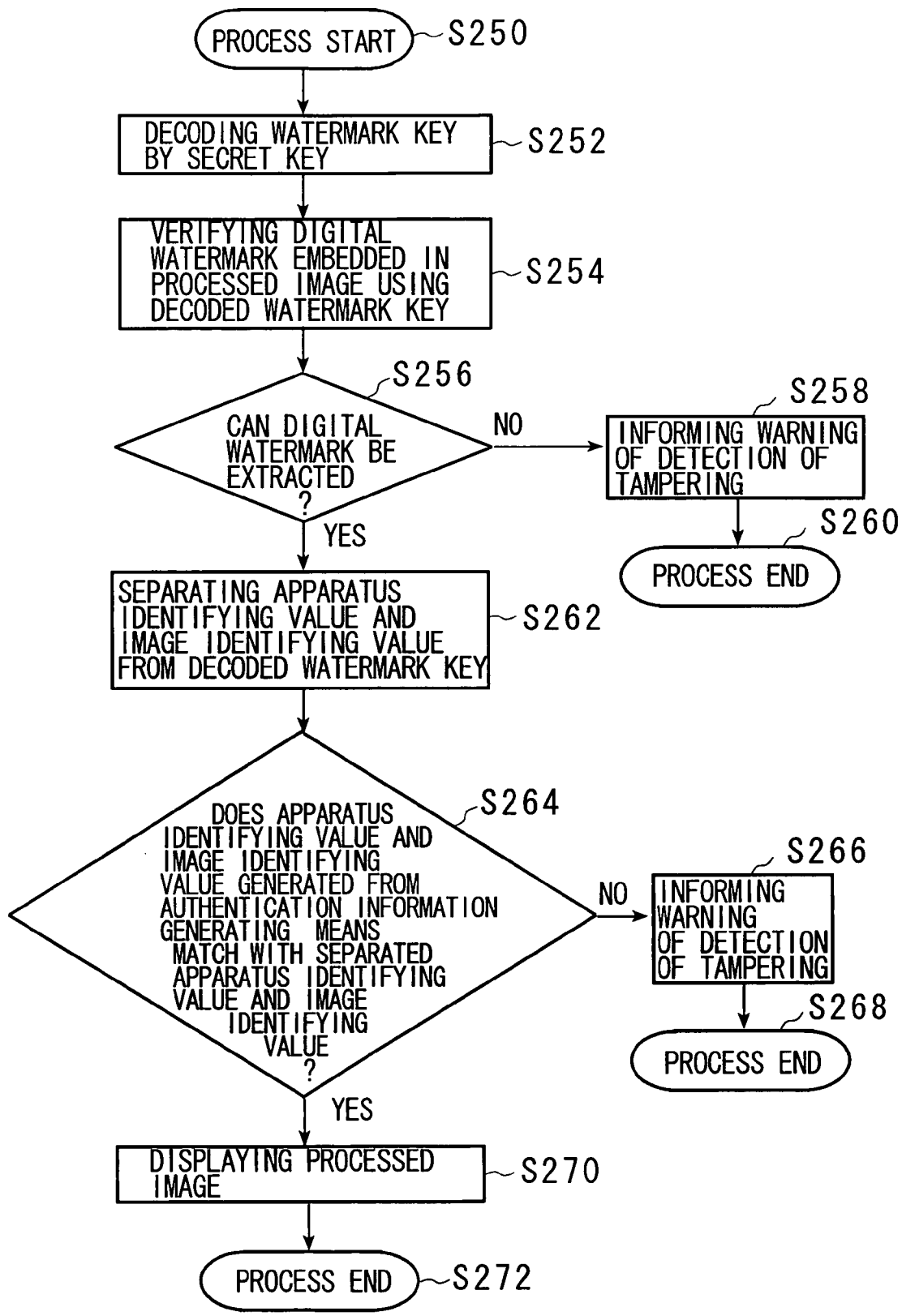
FIG. 8 shows a flow chart of the process of the image displaying apparatus $105(n)$.

FIG. 8 shows a flow chart of the process of the image displaying apparatus 105(*n*). In the image displaying apparatus 105(*n*), the decoding unit 56(*n*) decodes the sent watermark key b22(*n*) by the private key of the image displaying apparatus 105(*n*) (S252). The digital watermark verifying unit 51(*n*) verifies the digital watermark of the processed image C(m) by the decoded watermark key B22(*m*) (S254). If the digital watermark can be extracted, it is confirmed that the processed image C(m), which is sent, is not tampered (S256).

The authentication information detecting and verifying unit 53(*m*) separates the apparatus identifying value D24*a*(*m*) and the image identifying value D24*b*(*m*) from the decoded watermark key B22(*m*) in the image displaying apparatus 105(*n*) (S262). The authentication information detecting and verifying unit 53(*m*) compares each of the apparatus identifying value D24*a*(*m*) and the image identifying value D24*b*(*m*) with the apparatus identifying value D54*a*(*m*) and the image identifying value D54*b*(*m*) generated by the authentication information generating means 54(*m*) (S264).

If the apparatus identifying value D24*a*(*m*) matches with the apparatus identifying value D54*a*(*m*), and the image identifying value D24*b*(*m*) matches with the image identifying value D54*b*(*m*) as a result of the comparison, the authentication information detecting and verifying unit 33 verifies the provided watermark key B22(*m*) is valid so that the watermark key B22(*m*) is provided by the valid provider. If both of the value do not match or one of the value does not match, the authentication information detecting and verifying unit 33 verifies that the watermark key B22(*m*) provided by the valid provider is invalid because the watermark key B22(*m*) is tampered (S266). Moreover, in the image managing server 103, the display control unit 59(*n*) displays the processed image C(m) on the displaying unit, not shown in the figure, such as CRT when the provided processed image C(m) is proved to be not tampered (S270).

The image displaying apparatus 105 therefore can prevent the iniquity by the tampered image by informing by displaying a warning of detecting the tamper and not displaying the processed image C(m) when the digital watermark cannot be extracted or when the tamper is detected although the digital watermark can be extracted, because the processed image C(m) is invalid.

The first embodiment shown above can detect the tamper of the processed image because the image processing apparatus, which only displays the image when using the image, provides the processed image, in which the digital watermark is embedded for detecting the alteration, and the watermark key including an authentication information. The first embodiment shown above can also detect the tamper of the processed image because the receiver of the processed image and the watermark key extracts the digital watermark from the processed image by the watermark key. The receiver can extract the authentication information from the watermark key, which includes the authentication information. The receiver can authenticate the validity of the watermark key by generating the authentication information identical with the extracted authentication information if the watermark key is valid and comparing the authentication information with each other.

Therefore, when the digital watermark cannot be extracted from the provided processed image by the provided watermark key, it is difficult to verify whether the processed image itself has been tampered or the watermark key tampered if the validity of the watermark key is not confirmed. It can be verified whether the processed image has been tampered if the validity of the watermark key can be confirmed as in the first embodiment shown above. The first embodiment thus does not require to introduce other authentication system and can increase the security against impersonating the image processing apparatus and replacing the image.

Furthermore, the first embodiment can manage the image as the image data comparing to the encoding system that manages the encoded image and cannot display the image without decoding the image. The system that manages the image data therefore can be constructed as a usual image processing system, and the system can prevent the alteration of the image, especially when the original image data will not be created once after the processed image is created.

The first embodiment shows the example that transfers the watermark key after encoding the watermark key. The watermark key is used when the digital watermark is embedded into the processed image. After generating the processed image in which the digital watermark is embedded, the watermark key is used only for the extracting and verifying the digital watermark. The watermark key is different from the decoding key in the cryptsystem because the watermark key is not the key for recovering the original image so that the watermark key can be managed less strictly than the decoding key.

If the image inputting apparatus, the image processing apparatus, and the image managing server are the one body of the apparatus with high security which has property of anti-tamper, for example, the apparatus that cannot be hacked from outside, the inside of which cannot be seen, or the system of which cannot be destroyed, there is a few possibility of exploiting the original image data. Therefore, the security of the watermark key can be relaxed, and there are few problems when the watermark key is transferred as an original data.

However, although the processed image is verified by the watermark key, the digital watermark can be verified by replacing both of the processed image and the watermark key with the forged processed image and the forged watermark key. Even though the either one of the processed image and the watermark key is replaced to an invalid one, the replacement can be detected because the processed image and the watermark key cannot be verified. To prove that the processed image is valid, and the tamper such as replacement or the changes in the image is not done, first, it is necessary to prove that the watermark key is valid. Next, the digital watermark has to be extracted from the processed image by using the watermark key. Finally, it is necessary to prove that the image is not tampered when the digital watermark is verified.

As one of methods of generating the forged processed image and the forged watermark key in which the verification of the digital watermark succeeds, there is a method of using the image processing apparatus iniquitously and replacing the processed image and the watermark key with the forged processed image and the forged watermark key by the image processing apparatus. If the process is operated by the software, it is possible to steal the software and using the software iniquitously.

The image processing apparatus is the core of the security system in the first embodiment so that the possibility of causing the problem is very low unless the image processing apparatus is stolen. The watermark key generating unit and the digital watermark embedding unit can be implemented into the hardware to hide the process and make it difficult to be stolen. However, taking the cost and the realizability into consideration, the software implementation and some counter measure against iniquity may be needed. It is therefore possible to authenticate the image processing apparatus, which sends the processed image and the watermark key, by using the watermark key including an authentication information as in the first embodiment.

Figure 9:
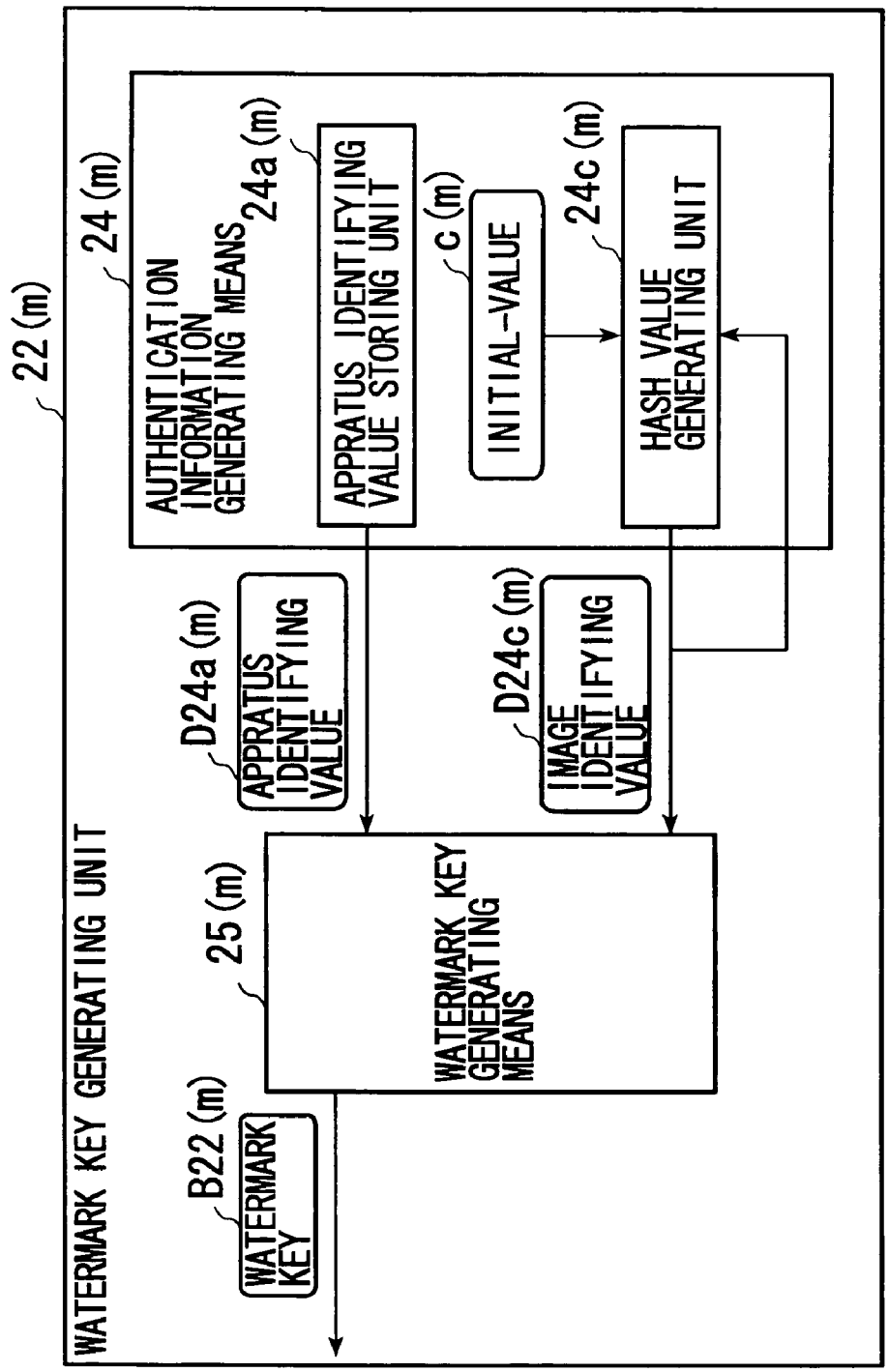
FIG. 9 shows a block diagram which shows the function of the watermark key generating unit in the image processing apparatus of the second embodiment.

FIG. 9 shows a block diagram which shows the function of the watermark key generating unit in the image processing apparatus of the second embodiment. The difference between the first embodiment and the second embodiment will be explained in the following. The second embodiment sets a hash value that is labeled for each of the image file as the image identifying value in the authentication information included in a watermark key. In the case of the first embodiment, the image identifying value is set as a count value of the image counter. The hash value is used because the hash value can be used for any authentication information. The network of the image processing system used in the first embodiment is assumed for the second embodiment so that the explanation of the network will be omitted.

This watermark key generating unit $22(m)$ has an authentication information generating means $24(m)$ and a watermark key generating means $25(m)$. The authentication information generating means $24(m)$ has a function of generating an authentication information which authenticates the image file that is provided by a valid provider. The authentication information has a provider identifying information to identify the provider of the image file and an image identifying information to identify the image file. Here, an apparatus identifying value $D24a(m)$ for identifying the image processing apparatus $102(m)$, which is a provider, and an image identifying value $D24c(m)$ for identifying the original image $A(m)$ are used. This image identifying value $D24c(m)$ is a hash value in the case of the second embodiment. This hash value is generated by the one-way hash function such as MD4 and MD5 of the RSA Security Inc. (United States), and SHA, Secure Hash Algorithm, and so on.

Therefore, the authentication information generating means $24(m)$ has an apparatus identifying value storing unit $24a(m)$, which stores the apparatus identifying value $D24a(m)$, and an hash value generating unit $24C(m)$, which generates the hash value for each time of processing of the original image $A(m)$ as the image identifying value $D24c(m)$ that numbers the original image $A(m)$. The watermark key generating means $25(m)$ generates the watermark key $B22(m)$ which includes the apparatus identifying value $D24a(m)$ and the image identifying value $D24b(m)$ as a hash value. To generate the hash value, an initial value $c(m)$ is needed. The initial value $c(m)$ is set beforehand, for example, at the start of the operation of the system. When the operation of the system starts, the hash value generating unit $24C(m)$ generates the hash value from the initial value $c(m)$. The hash value generating unit $24C(m)$ then generates the hash value of the present image using the feedback hash value generated for the previous image. The watermark key generating means $25(m)$ generates the watermark key $B22(m)$ using the hash value of the present image.

The authentication information generating means $24(m)$ in the watermark key generating unit $22(m)$ can be provided in the image managing server $103$ or the image inputting apparatus $101(M)$. Then, the image managing server $103$ or the image inputting apparatus $101(M)$ can verify each other whether the watermark key is valid. Thus, the explanation for the image managing server $103$ and the image inputting apparatus $101(M)$ will be omitted. The initial value for the one-way hash function can be set beforehand in the image managing server $103$ and the image inputting apparatus $101(M)$ at the start of the operation of the system.

The apparatus identifying value $D24a(m)$ of the image processing apparatus can be used as the initial value $c(m)$. In this case, the initial value $c(m)$ can be set only by inputting the apparatus identifying value $D24a(m)$ in the image managing server $103$ and the image inputting apparatus $101(M)$. In the case of changing the watermark key $B22(m)$ during exchanging the watermark key between the image managing server $103$ and the image inputting apparatus $101(M)$, the hash value used between the image managing server $103$ and the image inputting apparatus $101(M)$ can be set by inputting the apparatus identifying value $D24a(m)$ only in the image managing server $103$.

Because the second embodiment uses the watermark key $B22(m)$ including a authentication information generated by the hash value, it is very difficult to generating the authentication information without knowing the initial value $c(m)$, the hash function which is used, and the present number of the times of applying the hash function. It is difficult to forge the watermark key $B22(m)$ comparing to the first embodiment which uses the counter. The security of the system thus can increases. The hash value to be generated has a property that the size of the hash value is fixed, so that the hash value is useful for the digital watermark which has a limit in the size of the watermark key B22(*m*).

Figure 10:
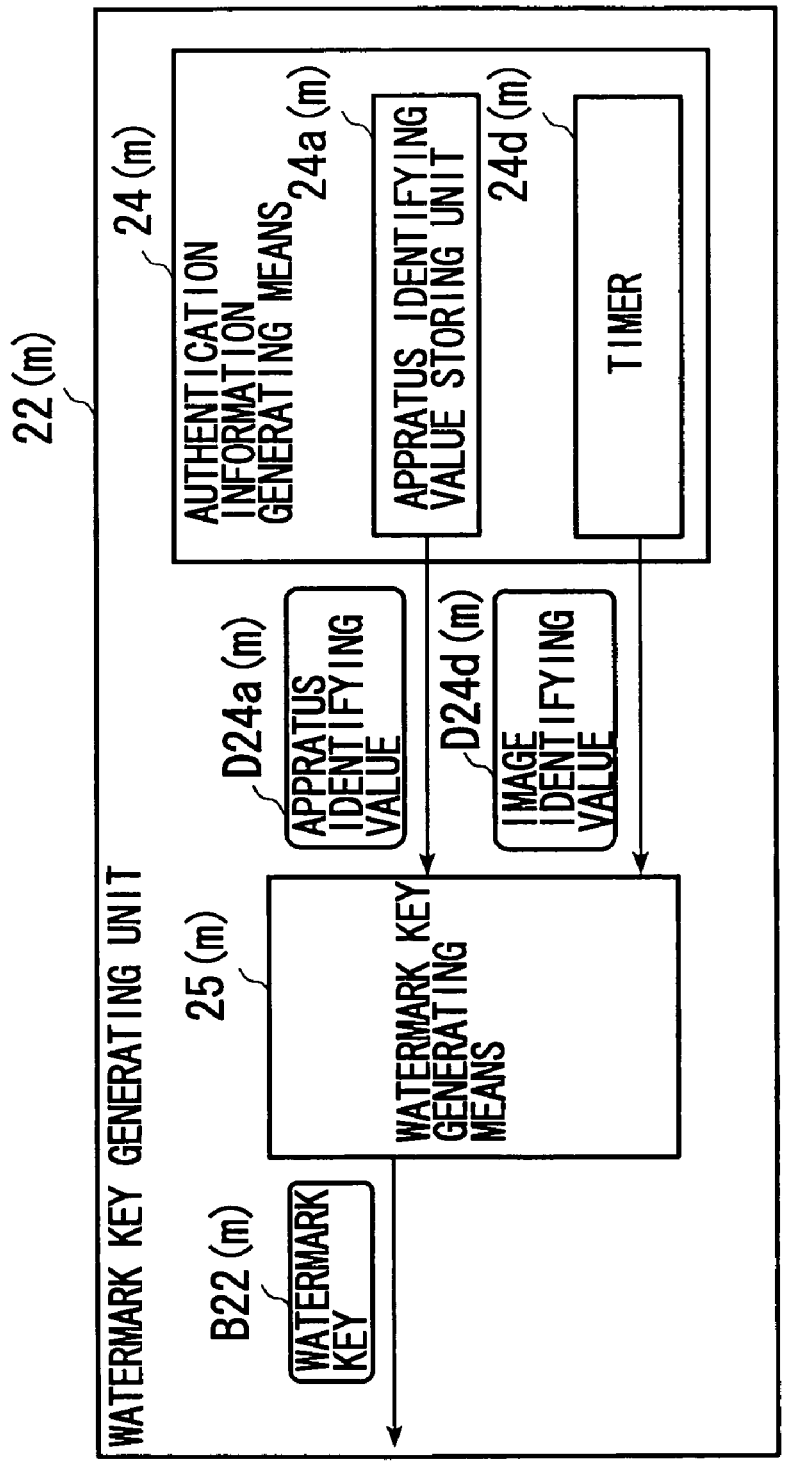
FIG. 10 shows a block diagram which shows the function of the watermark key generating unit in the image processing apparatus of the third embodiment.

FIG. 10 shows a block diagram which shows the function of the watermark key generating unit in the image processing apparatus of the third embodiment. The difference between the first embodiment and the third embodiment will be explained in the following. The third embodiment sets a file generating time that is the time of generating the image file with the image identifying value in the authentication information included in a watermark key. In the case of the first embodiment, the image identifying value is set as a count value of the image counter.

This watermark key generating unit 22(*m*) has an authentication information generating means 24(*m*) and a watermark key generating means 25(*m*). The authentication information generating means 24(*m*) has a function of generating an authentication information which authenticates the image file that is provided by a valid provider. The authentication information has a provider identifying information to identify the provider of the image file and an image identifying information to identify the image file. Here, an apparatus identifying value D24*a*(*m*) for identifying the image processing apparatus 102(*m*), which is a provider, and an image identifying value D24*d*(*m*) for identifying the original image A(m) are used. This image identifying value D24*c*(*m*) is a file generating time in the case of the third embodiment.

Therefore, the authentication information generating means 24(*m*) has an apparatus identifying value storing unit 24*a*(*m*) which stores the apparatus identifying value D24*a*(*m*), and an timer 24*d*(*m*), which records the file generating time for each time of processing of the original image A(m) as the image identifying value D24*c*(*m*) that numbers the original image A(m). Usually, the timer 24*d* does not have to be provided because the file generating time is held together with the image file in almost all file systems. The watermark key generating means 25(*m*) generates the watermark key B22(*m*) which includes the apparatus identifying value D24*a*(*m*) and the image identifying value D24*b*(*m*) as a file generating time.

Figure 11:
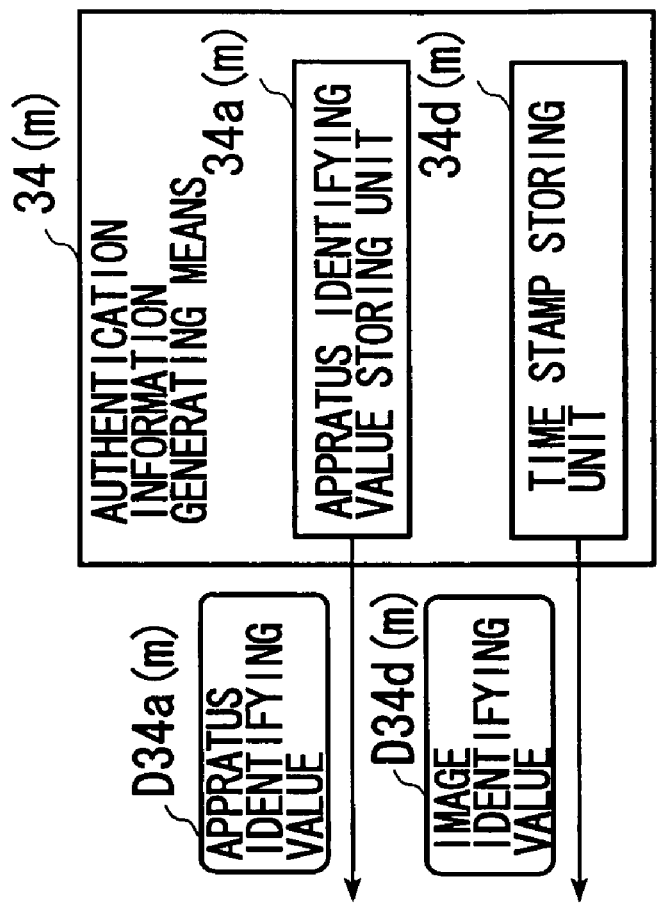
FIG. 11 shows a block diagram which shows the function of the authentication information generating means in the image managing server.

FIG. 11 shows a block diagram which shows the function of the authentication information generating means in the image managing server. This authentication information generating means 34(*m*) has a function of generating an authentication information which authenticates the image file that is provided by a valid provider. The authentication information has a provider identifying information to identify the provider of the image file and an image identifying information to identify the image file. Here, an apparatus identifying value D34*a*(*m*) for identifying the image processing apparatus 102(*m*), which is a provider, and an image identifying value D34*d*(*m*) for identifying the original image A(m) are used. This image identifying value D34*d*(*m*) is a file generating time in the case of the third embodiment.

Therefore, the authentication information generating means 34(*m*) has an apparatus identifying value storing unit 34*a*(*m*), which stores the apparatus identifying value D34*a*(*m*), and an time stamp storing unit 34*d*(*m*), which stores the file generating time for each processing of the original image A(m) as the image identifying value D34*d*(*m*) that numbers the original image A(m). Usually, the time stamp storing unit 34*d*(*m*) does not have to be provided because the file generating time is transferred together with the image file as an additional information associated with the image file in almost all file systems.

The authentication information generating means 34(*m*) can be provided in the image managing server 103 or the image inputting apparatus 101(M). Then, the image managing server 103 or the image inputting apparatus 101(M) can verify each other whether the watermark key is valid. Thus, the explanation for the image managing server 103 and the image inputting apparatus 101(M) will be omitted.

Because the third embodiment uses the file generating time as an image identifying value and uses the watermark key B22(*m*) that includes an authentication information generated by this file generating time, the image counter becomes unnecessary comparing to the first embodiment which uses the image counter. The file generating time is preferable to be encoded before the file generating time is transferred because the security become less strict if the file generating time is transferred in the condition that anyone can examine the file generating time as in the conventional file systems.

Figure 12:
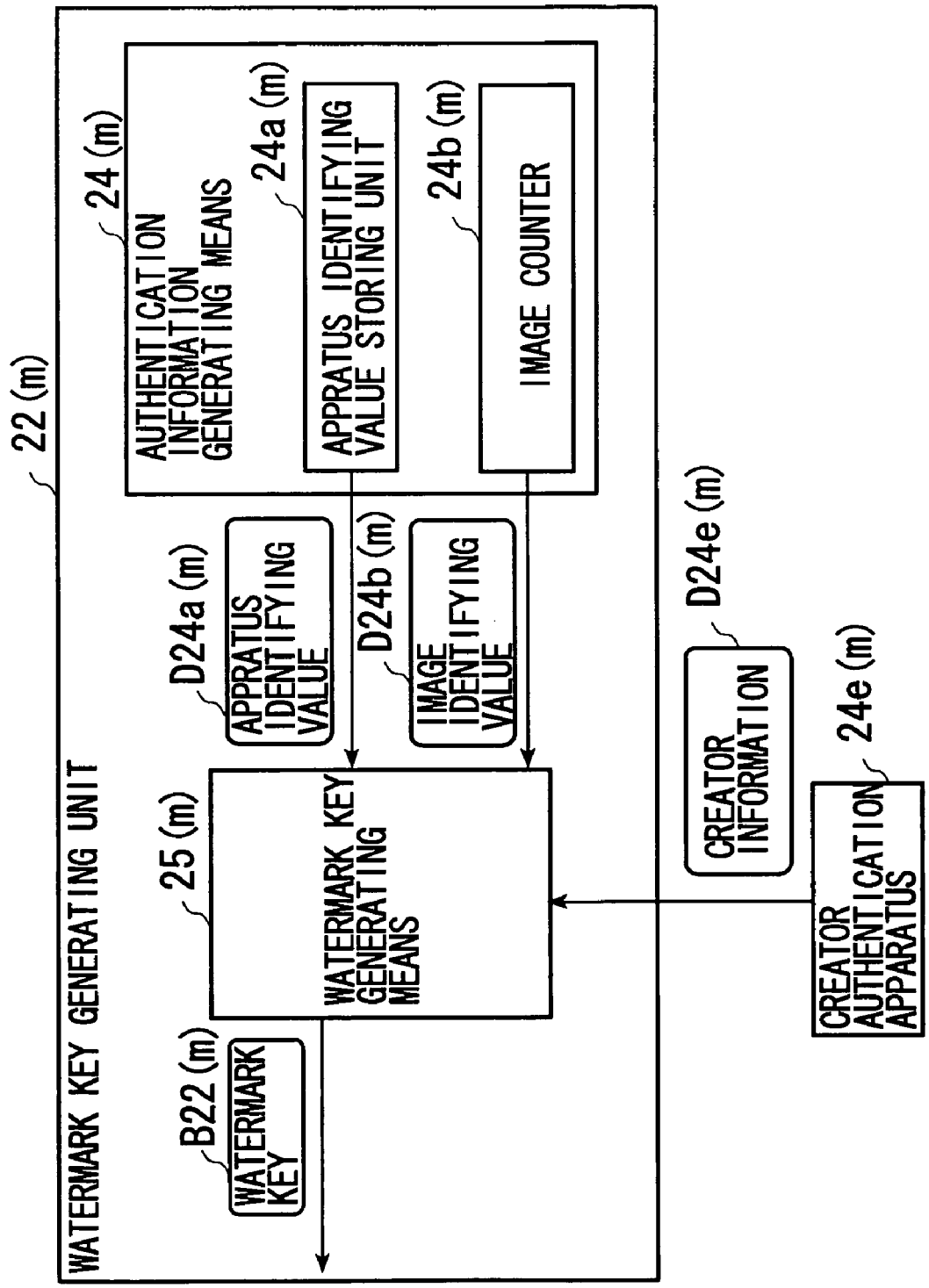
FIG. 12 shows a block diagram which shows the function of the watermark key generating unit in the image processing apparatus of the forth embodiment.

FIG. 12 shows a block diagram which shows the function of the watermark key generating unit in the image processing apparatus of the forth embodiment. The difference between the first embodiment and the forth embodiment will be explained in the following. The forth embodiment adds a creator information, which identifies the creator of the original image, to the authentication information included in the watermark key. The network of the image processing system used in the first embodiment is assumed for the forth embodiment so that the explanation of the network will be omitted.

This watermark key generating unit 22(*m*) has an authentication information generating means 24(*m*) and a watermark key generating means 25(*m*). The authentication information generating means 24(*m*) has a function of generating an authentication information which authenticates the image file that is provided by a valid provider. The watermark key generating means 25(*m*) is connected to a creator authentication apparatus 24*e*(*m*) which authenticates the creator of the original image A(m). The creator authentication apparatus 24*e* can be provided inside or outside the image processing apparatus. The authentication information to identify the provider of the forth embodiment has the provider identifying information, the image identifying information, and the creator information.

Here, an apparatus identifying value D24*a*(*m*) for identifying the image processing apparatus 102(*m*), which is a provider, and an image identifying value D24*b*(*m*) for identifying the original image A(m) are used. This creator information D24*e*(*m*) is added for the forth embodiment. As a creator information, there are a creator ID, creator name, fingerprint information, iris information, the image data of the creator's face, and soon. Therefore, the creator authentication apparatus 24*e*(*m*) has a function of authenticating a password, a fingerprint, an iris, and the photograph of the face. The creator information D24*e*(*m*) can be set beforehand at the starting of the operation of the system or the during the operation of the system.

The authentication information generating means 24(*m*) has an apparatus identifying value storing unit 24*a*(*m*) and an image counter 24*b*(*m*). The watermark key generating means 25(*m*) generates the watermark key B22(*m*) which includes the apparatus identifying value D24*a*(*m*), the image identifying value D24*b*(*m*), and the creator information D24*e*(*m*). The creator authentication apparatus 24*e*(*m*) which is connected to the authentication information generating means 24(*m*) of the watermark key generating unit 22(*m*) shown above can be provided on the image managing server 103 or the image inputting apparatus 101(M). Then, the image managing server 103 or the image inputting apparatus 101(M) can verify each other whether the watermark key is valid. Thus, the explanation for the image managing server 103 and the image inputting apparatus 101(M) will be omitted. The creator information D24*e*(*m*) can be set beforehand in the image managing server 103 and the image inputting apparatus 101(M) at the start of the operation of the system.

It is easier to identify the creator of the original image in the forth embodiment because the forth embodiment authenticates the creator when the image is processed in the image processing apparatus, in order to protect the image from forging when the image is input and identify the creator when the tamper is detected. It is also easier to identify the creator of the original image in the forth embodiment because the forth embodiment includes the creator information D24*e*(*m*) as the watermark key generating information.

Therefore, it is easier to track the creator after forgery has been detected. If the original image is generated iniquitously using the image processing apparatus, it is easier to identify the creator by the tracking investigation so that the effect of preventing and restraining forgery can increases.

Generally, in the system, which can identify the creator by authenticating the creator during the operation of the image processing apparatus and analyzing the authenticating log and the log of the image processing when the tamper is detected, the process of identifying the creator can be attacked by tampering with the logs. However, in the forth embodiment, it is possible to identify the tamperer when the tamper is detected as a result of verifying the digital watermark and the watermark key B22(*m*) because the creator information D24*e*(*m*) is added in the watermark key B22(*m*). Even the tamperer cannot embed the digital watermark without using the creator information D24*e*(*m*) of the tamperer himself.

When a plurality of people are allowed to create the images, it is easiest to generate the watermark keys B22(*m*) for each creator and use the verified watermark keys. Therefore, the table of the IDs of the creators and the information of the creators can be registered in the image managing server 103 and the image displaying apparatus 105(M). Then, the information such as the ID of the creator, instead of the creator information itself, can be transferred through the network. Next, the creator information can be retrieved using the ID of the creator, and then the creator information can be used for generating the watermark key B22(*m*). In this case, the creator information D24*e*(*m*) itself is preferable to be encoded and transferred through the network.

When the system is large, it is preferable to provide the database apparatus which registers the creators who have the permission to create the image inside the system to make the management of the creators easier. Then, the management of the creators can be centralized, and the security of the creator information can be easily preserved.

The creator information D24*e*(*m*) can differ in type depending on the types of the creator authentication apparatus 24*e*(*m*) and the consideration on the security. If the creator information D24*e*(*m*) is a data with a large size such as the image of the photograph of the face, and there is a limit in the data size of the watermark key, it is preferable to convert the large data to the hash value with a fixed size by using an one-way hash function. Then, it is preferable to use the watermark key B22(*m*) which includes the authentication information in which the hash value is added to the creator information D24*e*(*m*).

Figure 13:
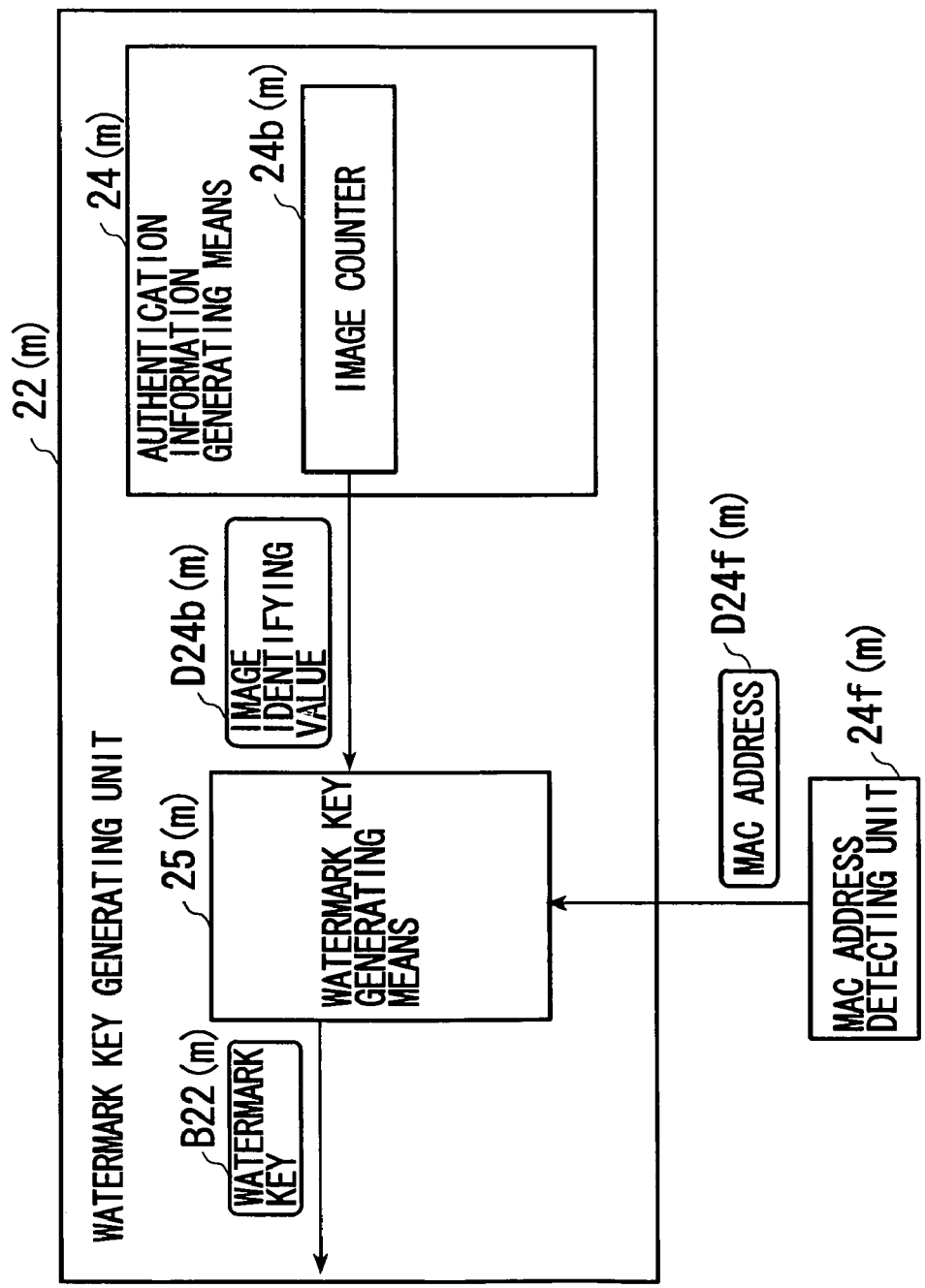
FIG. 13 shows a block diagram which shows the function of the watermark key generating unit in the image processing apparatus of the fifth embodiment.

FIG. 13 shows a block diagram which shows the function of the watermark key generating unit in the image processing apparatus of the fifth embodiment. The difference between the first embodiment and the fifth embodiment will be explained in the following. The fifth embodiment uses the MAC address for identifying the apparatus when LAN is constructed, instead of using the apparatus identifying value which identifies the apparatus in the authentication information included in the watermark key as shown in the first embodiment. The network of the image processing system used in the first embodiment is assumed for the fifth embodiment so that the explanation of the network will be omitted. The fifth embodiment especially assume the case that the image managing server 103 and the image processing apparatus 102(M) have the LAN boards and are connected by LAN.

This watermark key generating unit 22(*m*) has an authentication information generating means 24(*m*) and a watermark key generating means 25(*m*). The authentication information generating means 24(*m*) has a function of generating an image identifying value D24*b*(*m*) which is for identifying the original image A(m) in the authentication information that authenticates the image file provided by a valid provider. The watermark key generating means 25(*m*) is connected to a MAC address detecting unit 24*f*(*m*) which detects the MAC address D24*f*(*m*) of the MAC address detecting unit 24*f*(*m*) itself. The MAC address D24*f*(*m*) is used as the apparatus identifying value that identifies the image processing apparatus, which is a provider.

The MAC address detecting unit 24*f*(*m*) can be provided inside or outside the image processing apparatus. The MAC address D24*f*(*m*) is a number specific to the image processing apparatus. The authentication information generating means 24(*m*) has an image counter 24*b*(*m*). The image counter outputs the image identifying value D24*b*(*m*), which is for numbering the original image A(m), as a count number that counts the number of the times of processing of the original image A(m). The watermark key generating means 25(*m*) generates the watermark key B22(*m*) which includes the MAC address D24*f*(*m*) as an apparatus identifying value and the image identifying value D24*b*(*m*).

The storing unit, which stores the MAC address D24*f*(*m*) of the image processing apparatus, can be provided in the image managing server 103 and the image displaying apparatus 105(M) in the fifth embodiment. Then, the image managing server 103 and the image inputting apparatus 101(M) can verify each other whether the water mark key is valid as shown in the first embodiment. Thus, the explanation for the image managing server 103 and the image displaying apparatus 105(M) will be omitted. When the MAC address D24*f*(*m*) is used, the MAC address D24*f*(*m*) of the image processing apparatus, which sends the watermark key B22(*m*), can be recognized by the image managing server 103. Therefore, it is possible to compare the MAC address D24*f*(*m*) and the apparatus identifying value separated from the watermark key B22(*m*) without providing the storing unit for storing the MAC address D24*f*(*m*). This case will be explained in the seventh embodiment shown below.

The fifth embodiment does not need to set the apparatus identifying value because the fifth embodiment uses the watermark key B22(*m*) that includes the authentication information in which the MAC address D24*f*(*m*) is used as an apparatus identifying value.

Figure 14:
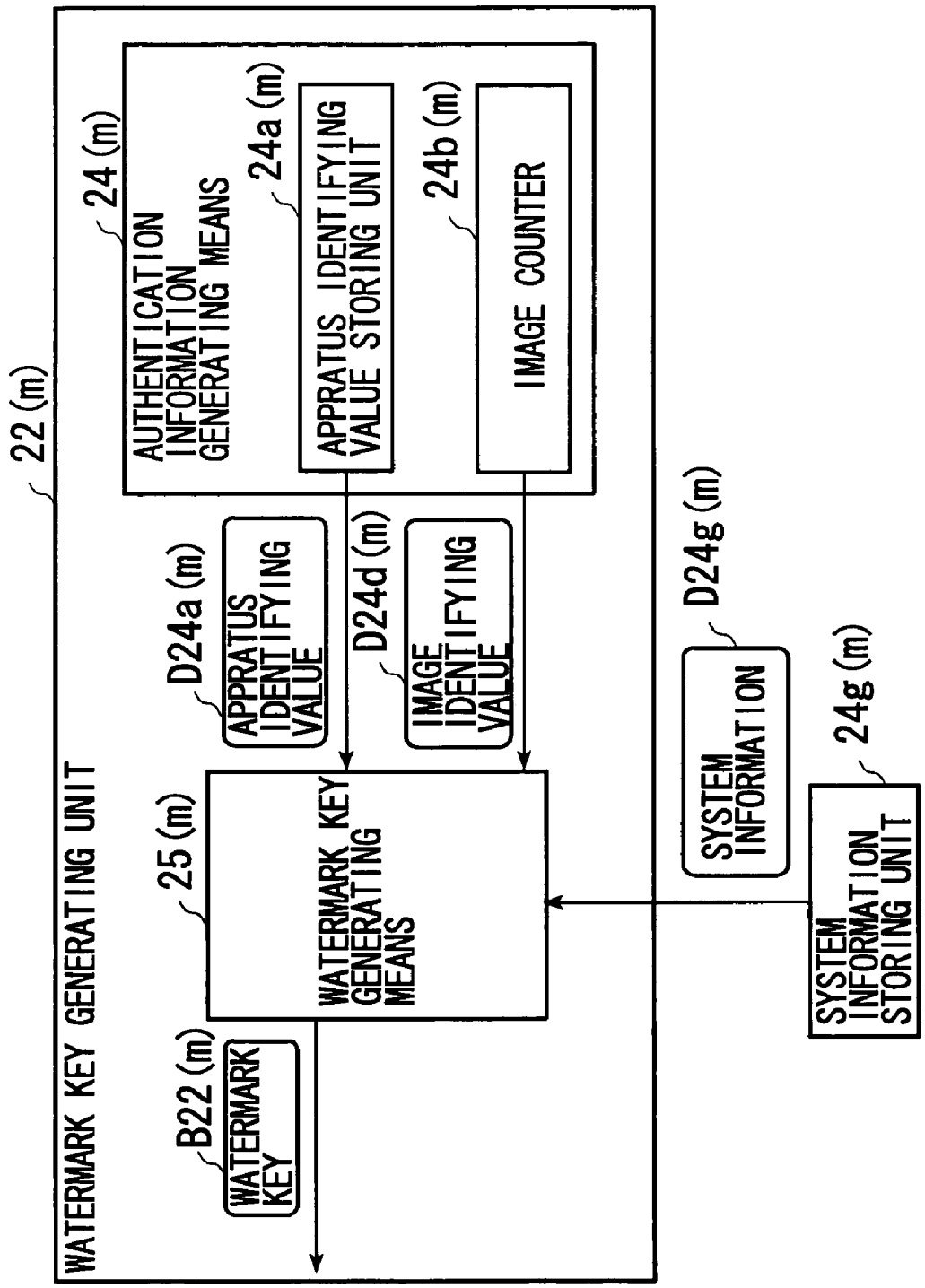
FIG. 14 shows a block diagram which shows the function of the watermark key generating unit in the image processing apparatus of the sixth embodiment.

FIG. 14 shows a block diagram which shows the function of the watermark key generating unit in the image processing apparatus of the sixth embodiment. The difference between the first embodiment and the sixth embodiment will be explained in the following. The sixth embodiment adds a system information, which identifies the system to which the image processing apparatus belongs, to the authentication information included in watermark key of the first embodiment. The network of the image processing system used in the first embodiment is assumed for the sixth embodiment so that the explanation of the network will be omitted.

This watermark key generating unit $22(m)$ has an authentication information generating means $24(m)$ and a watermark key generating means $25(m)$. The authentication information generating means $24(m)$ has a function of generating an authentication information which authenticates the image file that is provided by a valid provider. The watermark key generating means $25(m)$ is connected to a system information storing unit $24g(m)$ which stores the system information $D24g(m)$ that identifies the system to which the image processing apparatus belongs.

The system information storing unit $24g(m)$ can be provided inside or outside the image processing apparatus. The authentication information of the sixth embodiment has the provider identifying information, the image identifying information, and the system information. Here, an apparatus identifying value $D24a(m)$ for identifying the image processing apparatus $102(m)$, which is a provider, an image identifying value $D24b(m)$ for identifying the original image A(m), and the system information $D24g(m)$ are used.

This system information $D24g(m)$, which is added in the sixth embodiment, can be set beforehand the start of the operation of the system or during the operation of the system. If there are many image processing apparatus, it is easier and safer to embed the system information $D24g(m)$ in the software by adding the system information $D24g(m)$ when the software is complied so that the system information can be difficult to extract and the time and the cost for managing the system can be reduced.

The authentication information generating means $24(m)$ has an apparatus identifying value storing unit $24a(m)$ and an image counter $24b(m)$. The watermark key generating means $25(m)$ generates the watermark key $B22(m)$ which includes the apparatus identifying value $D24a(m)$, the image identifying value $D24b(m)$, and the system information $D24g(m)$.

The system information storing unit $24g(m)$, which is connected to the watermark key generating means $25(m)$ in the watermark key generating unit $22(m)$, can be provided in the image managing server 103 or the image inputting apparatus $101(M)$ in the sixth embodiment. Then, the image managing server 103 or the image inputting apparatus $101(M)$ can verify each other whether the water mark key is valid as shown in the first embodiment. Thus, the explanation for the image managing server 103 and the image inputting apparatus $101(M)$ will be omitted.

The sixth embodiment can prevent the iniquity from outside the system because the system information, which identifies the system, is included in the watermark key when the digital watermark is embedded in the image file. According to the sixth embodiment, it becomes easier not only to detect and take a countermeasure for iniquity inside the same system but also to detect forgery by using the apparatus or the tool in other systems with the same type. When the system information is implemented in the image processing apparatus or as the software process in the systems with the same system type, it is possible to discover the forged original image and watermark key because the system information is different for the each system. The iniquity thus can be prevented.

Figure 15:
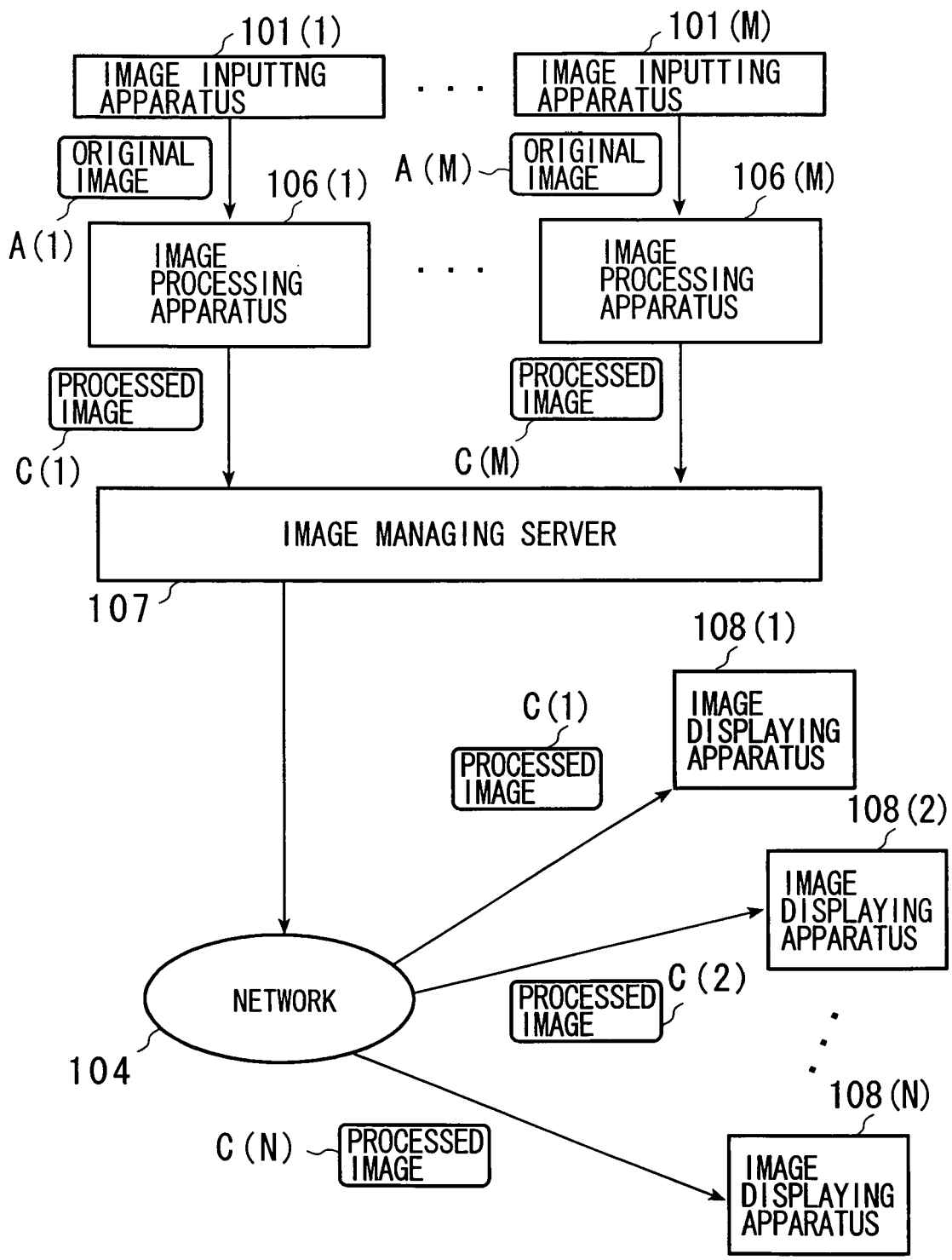
FIG. 15 shows the network structure of the image processing system of the seventh embodiments.

FIG. 15 shows the network structure of the image processing system of the seventh embodiments. In this image processing system, the images input by the image inputting apparatus 101(1) to 101(M) are transferred through an image processing apparatus 106(1) to 106(N), an image managing server 107, and a network 104 and displayed in each of the image displaying apparatus 108(1) to 108(N). In the following explanation, let $101(m)$ be the m-th image inputting apparatus among 101(1) to 101(M), and let $106(m)$ be the m-th image processing apparatus 106(1) to 106 (M), and let $108(n)$ be the n-th image displaying apparatus 108(1) to 108(N). The seventh embodiment especially assume the case that the image processing apparatus $106(m)$ and the image managing server 107 have the LAN board and are connected by LAN, not shown in the figure.

The image inputting apparatus $101(m)$ inputs an image and converts the input image to electronic data. The image inputting apparatus $101(m)$ may be a scanner or an digital camera. The image inputting apparatus $101(m)$ outputs the input image data as an original image A(m). The image processing apparatus $106(m)$ has a function of inputting the original image A(m) from the image inputting apparatus $101(m)$ and outputting a processed image C(m). The image processing apparatus $106(m)$ generates the processed image C(m) by embedding a digital watermark into the original image A(m).

Figure 16:
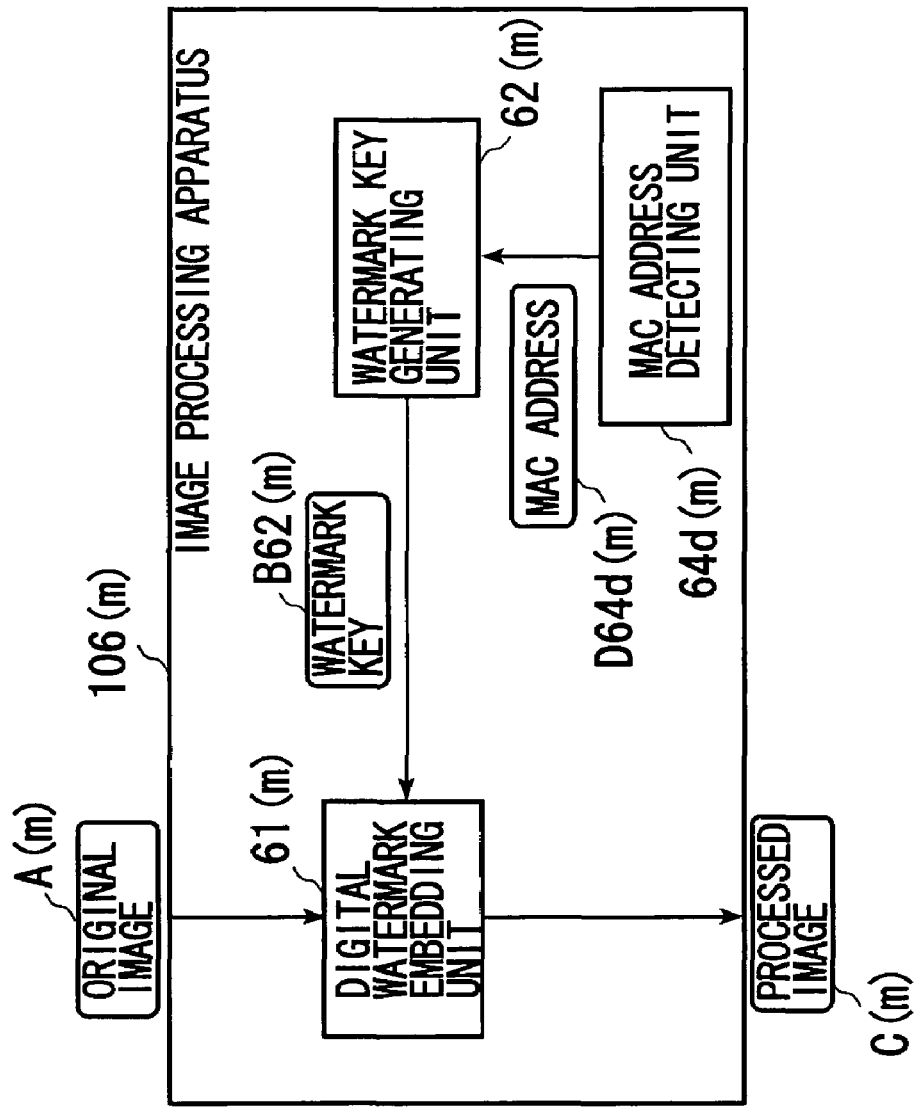
FIG. 16 shows a block diagram which shows the function of the image processing apparatus of the seventh embodiment.

FIG. 16 shows a block diagram which shows the function of the image processing apparatus of the seventh embodiment. This image processing apparatus $106(m)$ has a digital watermark embedding unit $61(m)$, a watermark key generating unit $62(m)$, and a MAC address detecting unit $64d(m)$. The digital watermark embedding unit $61(m)$ outputs the processed image C(m) by embedding an digital watermark, which is embedded for detecting tampering with the original image A(m), into the original image A(m) using the watermark key $B62(m)$. The watermark key generating unit $62(m)$ generates the watermark key $B62(m)$. Here, the watermark key $B62(m)$ is explained as a common key that can be used for both embedding and detecting the digital watermark, but the watermark key B62 for each of the embedding and the detecting can be different. Here in the seventh embodiment, the case is assumed that the watermark keys $B62(m)$ is generated and exchanged by a public key cryptosystem such as RSA.

Figure 17:
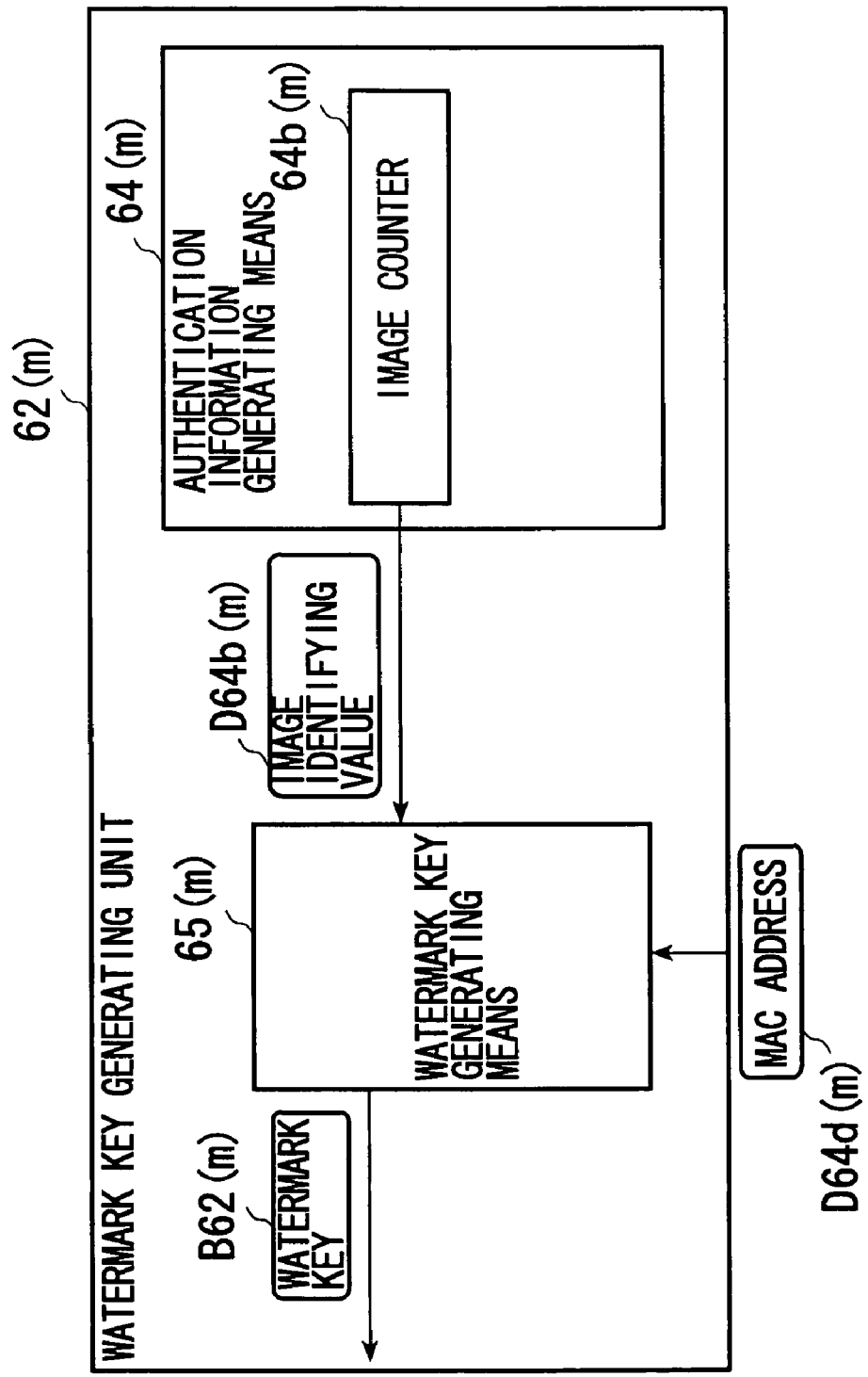
FIG. 17 shows a block diagram which shows the function of the watermark key generating unit in the image processing apparatus of the seventh embodiment.

FIG. 17 shows a block diagram which shows the function of the watermark key generating unit in the image processing apparatus of the seventh embodiment. This watermark key generating unit $62(m)$ has an authentication information generating means $64(m)$ and a watermark key generating means $65(m)$. The authentication information generating means $64(m)$ has a function of generating an authentication information which authenticates the image file that is provided by a valid provider. The authentication information has a provider identifying information to identify the provider of the image file and an image identifying information to identify the image file. Here, an MAC address $D64d(m)$ for identifying the image processing apparatus $106(m)$, which is a provider, and an image identifying value $D64b(m)$ for identifying the original image A(m) are used.

Furthermore, the authentication information generating means $64(m)$ has an image counter $64b(m)$. The image counter $64b(m)$ outputs the image identifying value $D64b(m)$, which is for numbering the original image A(m), as a count number that counts the number of the times of processing of the original image A(m). The watermark key generating means $65(m)$ generates the watermark key $B62(m)$ which includes the MAC address $D64d(m)$ and the image identifying value $D64b(m)$.

For example, let the MAC address $D64d(m)$ be "00:AB: 20:CD:40:EF" and the image identifying value $D64b(m)$ be "0x0000000". The watermark key generating means $25(m)$ generates the watermark key $B62(m)$ as "0x00AB20CD40EF00000001", which combines the MAC address D64d(m) and the image identifying value D64b(m). In the case of the watermark key B62(m) which includes the creator information D24e(m) as shown in forth embodiment, for example, the MAC address D64d(m) is set as "00:AB:20:CD:40:EF", the image identifying value D64b(m) as "0x01234567", and the hexadecimal number of the creator information D24e(m) as "0x89AB01BE9859", the watermark key generating means 25(m) generates the watermark key B62(m) as "0x00AB20CD40EF0123456789AB01BE9859", which combines the MAC address D64d(m), the image identifying value D64b(m), and the creator information D24e(m). If the hexadecimal number of the creator information D24e(m) is long, the watermark key generating means 25(m) converts the creator information D24e(m) to a hash value such as "0×FF0122CFAA234C5688FE0100EF0100EFA289EF" then generates the watermark key B62(m) that includes "0x00AB20CD40EF0123456789AB01BE9859FF0122CF-AA234C5688FE0100EF0100EFA289EF".

As shown in the FIG. 16, the MAC address detecting unit 64d(m) detects the MAC address D64d(m) of the image processing apparatus 106(m) itself. The image processing apparatus 106(m) then outputs the processed image C(m). As shown in the FIG. 15, the image managing server 107 is a server which stores and manages the processed image C(m) sent from the image processing apparatus 106(m). The image managing server 107 can be constructed as a usual database or a workflow system.

Figure 18:
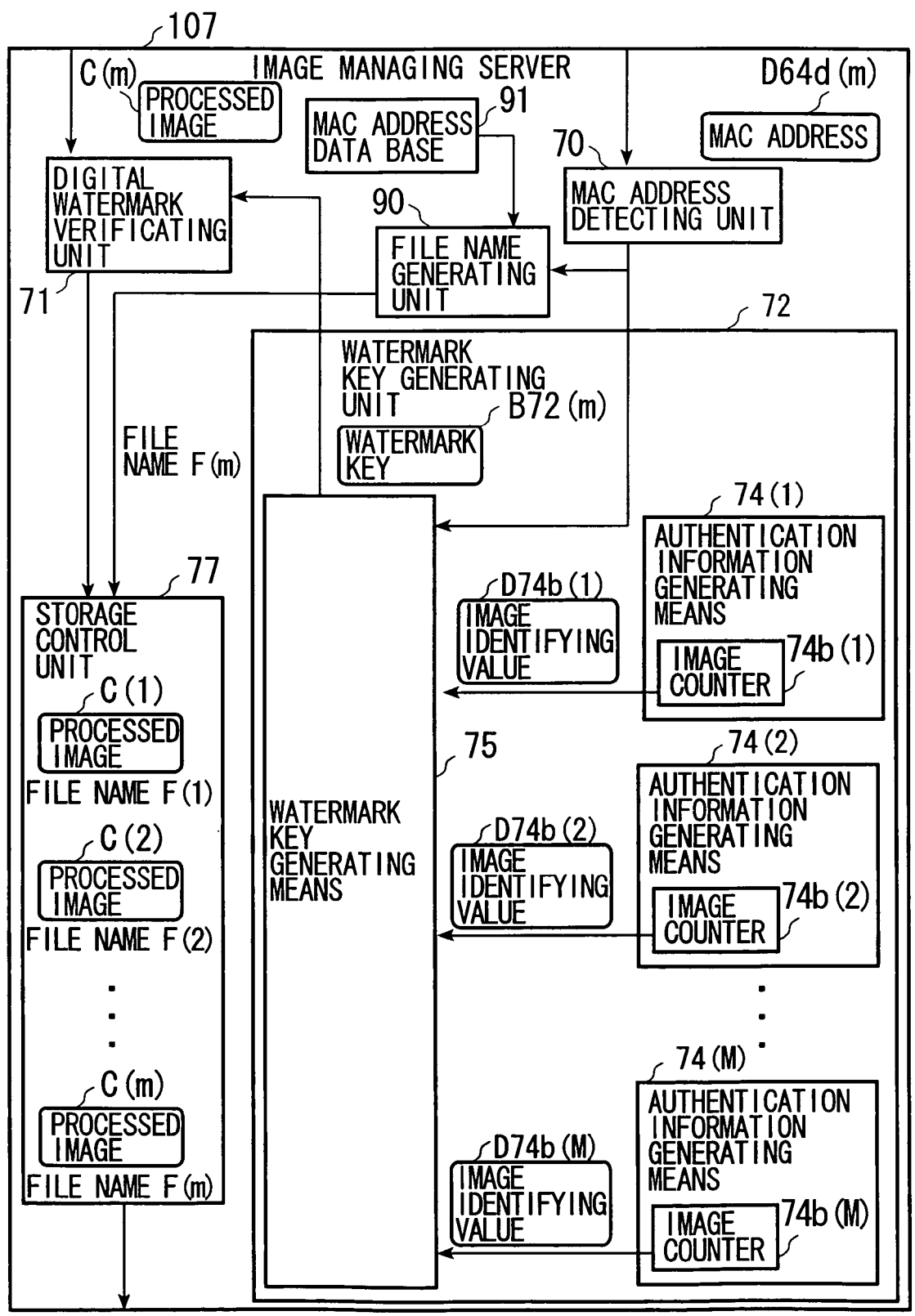
FIG. 18 shows a block diagram which shows the function of the image managing server of the seventh embodiment.

FIG. 18 shows a block diagram which shows the function of the image managing server of the seventh embodiment. The image managing server 107 has a MAC address detecting unit 70, a digital watermark verifying unit 71, a watermark key generating unit 72, an authentication information generating means 74(1) to 74(m), which are constructed inside the watermark key generating unit 72, a watermark key generating means 75, a storage control unit 77, a file name generating unit 90, and a MAC address database 91. The m-th authentication information generating means is called as the authentication information generating means 74(m) in the following. The MAC address detecting unit 70 detects the MAC address D64d(m) of the image processing apparatus 106(m) for identifying the image processing apparatus 106(m), which is a provider.

The digital watermark verifying unit 71 verifies whether the digital watermark can be extracted from the processed image C(m) provided by the image processing apparatus 106(m) by using the generated watermark key B72(m). If the digital watermark cannot be extracted from the processed image C(m), it can be recognized that the processed image C(m) has been tampered. If the digital watermark can be extracted from the processed image C(m), it can be recognized that the processed image C(m) has not been tampered. The watermark key generating unit 72 has a function of generating the watermark key B72(m).

The watermark key generating unit 72 has the authentication information generating means 74(m) and the watermark key generating means 75. The authentication information generating means 74(m) has an image counter 74b(m). The image counter 74b(m) outputs the image identifying value D74b(m), which is for numbering the original image A(m), as a count number that counts the number of the times of processing of the processed image C(m). The m-th image identifying value is called as image identifying value D74a(m) in the following. The image counter 74b(m) is set at the starting of the operation or during the operation of the system. The watermark key generating means 75(m) gener-ates the watermark key B72(m) which includes the MAC address D64d(m) and the image identifying value D74b(m).

The storage control unit 77 manages the processed image C(m) and the file name F(m) which is an information associated with the processed image C(m). The file name generating unit 90 generates the file name F(m) that is based on the MAC address D64d(m) of the image processing apparatus 106(m). The MAC address database 91 stores the table which defines the file name F(m) which is based on the MAC address D64d(m). Therefore, the file name generating unit 90 can obtain the file name F(m), which is based on the MAC address D64d(m), from the MAC address database 91. The file name generating unit 90 may generate the file name F(m) based on the predefined formula. The image managing server 107 sends the processed image C(m) with the file name F(m) to the image displaying apparatus 108(n) as processed image C(m) as shown in FIG. 15.

As shown in the FIG. 15, the network 104 is a network constructed by LAN or WAN. The image displaying apparatus 108(n) is an apparatus to display the processed image C(m).

Figure 19:
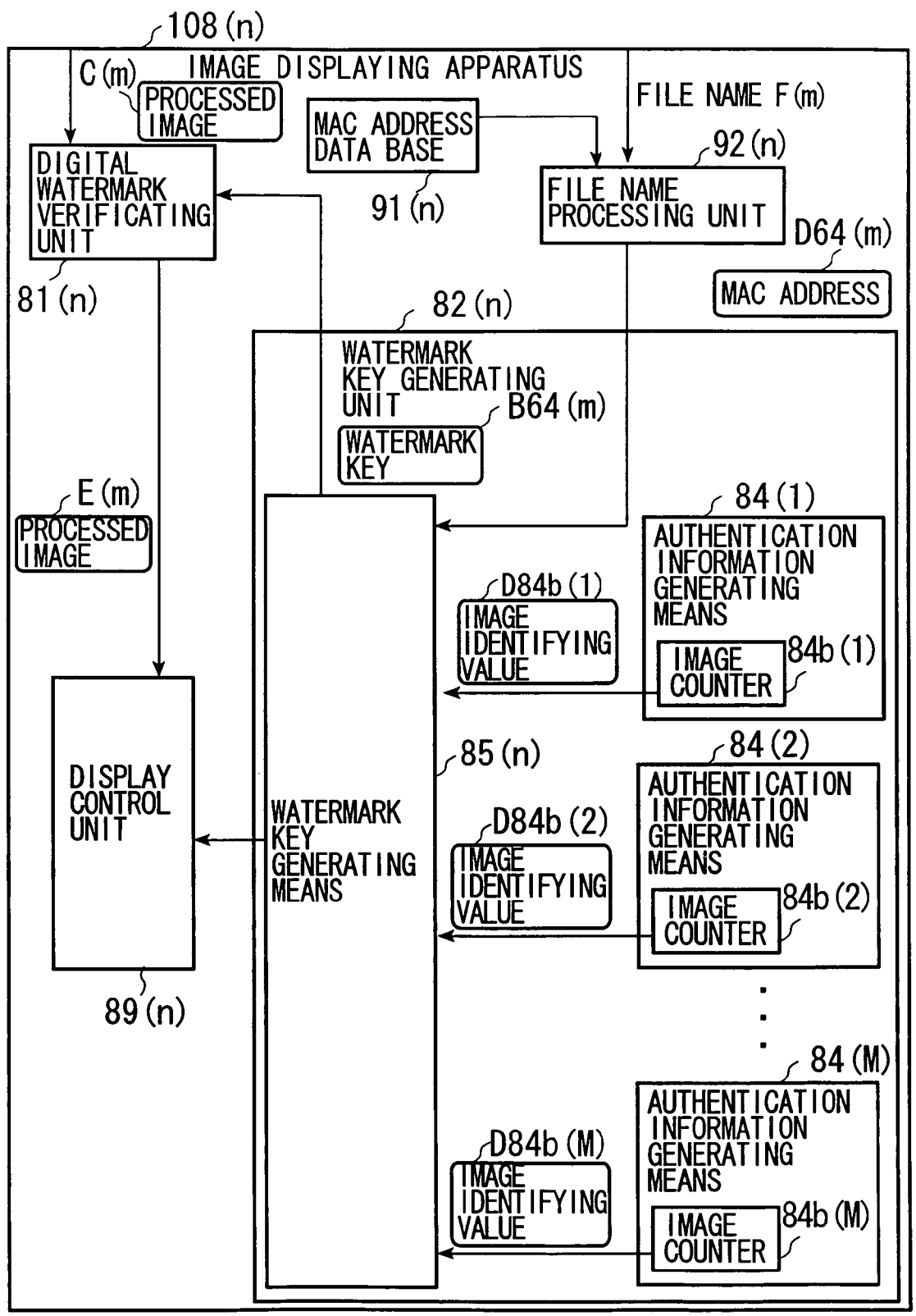
FIG. 19 shows a block diagram which shows the function of the image displaying apparatus of the seventh embodiment.

FIG. 19 shows a block diagram which shows the function of the image displaying apparatus of the seventh embodiment. This image displaying apparatus 108(n) has a digital watermark verifying unit 81(n), a watermark key generating unit 82(m), an authentication information generating means 84(1) to 84(M), which are constructed inside the watermark key generating unit 82(m), watermark key generating means 85(n), a display control unit 89(n), a MAC address database 91(n), and a file name processing unit 92(n). The m-th authentication information generating means is called as the authentication information generating means 74(m) in the following. The digital watermark verifying unit 81(n) verifies whether the digital watermark can be extracted from the processed image C(m) provided by the image managing server 107 using the generated watermark key B72(m).

If the digital watermark cannot be extracted from the processed image C(m), it can be recognized that the processed image C(m) has been tampered. If the digital watermark can be extracted from the processed image C(m), it can be recognized that the processed image C(m) has not been tampered. The watermark key generating unit 82(n) has a function of generating the watermark key B72(m). The watermark key generating unit 82(n) has the authentication information generating means 84(m) and the watermark key generating means 85(n).

The authentication information generating means 84(m) has an image counter 84b(m). The image counter 84b(m) outputs the image identifying value D74b(1) to D74b(M), which is for numbering the original image A(m), as a count number that counts the number of the times of processing of the processed image C(m). The m-th image identifying value is called as image identifying value D74b(m) in the following. The image counter 84b(m) is set at the start of the operation or during the operation of the system. The watermark key generating means 85(n) generates the watermark key B72(m) which includes the MAC address D64d(m) and the image identifying value D84b(m). The image identifying value D84b(m) is set to be identical with the image identifying value D74b(m).

The MAC address database 91(n) stores the table which defines the file name F(m) based on the MAC address D64d(m). The file name processing unit 92 obtains the MAC address D64d(m) of the image processing apparatus 106(m) from the file name F(m) by referring to the MAC address database 91(n). The file name processing unit 92(n) may obtain the MAC address D64d(m) of the image processing apparatus 106(*m*) from the file name F(m) based on the predefined formula by referring to MAC address database 91(*n*). The image managing server 107 sends the processed image C(m) with the file name F(m) to the image displaying apparatus 108(*n*) as the processed image C(m) as shown in FIG. 15. The display control unit 59(*n*) displays the provided processed image C(m) on the displaying unit, not shown in the figure, such as CRT.

The flow of the image processing of the image processing system shown above will be explained using FIG. 20 to FIG. 22. First, the original image A(m), which is input and converted to an electronic data by the image inputting apparatus 101(*m*), is input to image processing apparatus 106(*m*).

Figure 20:
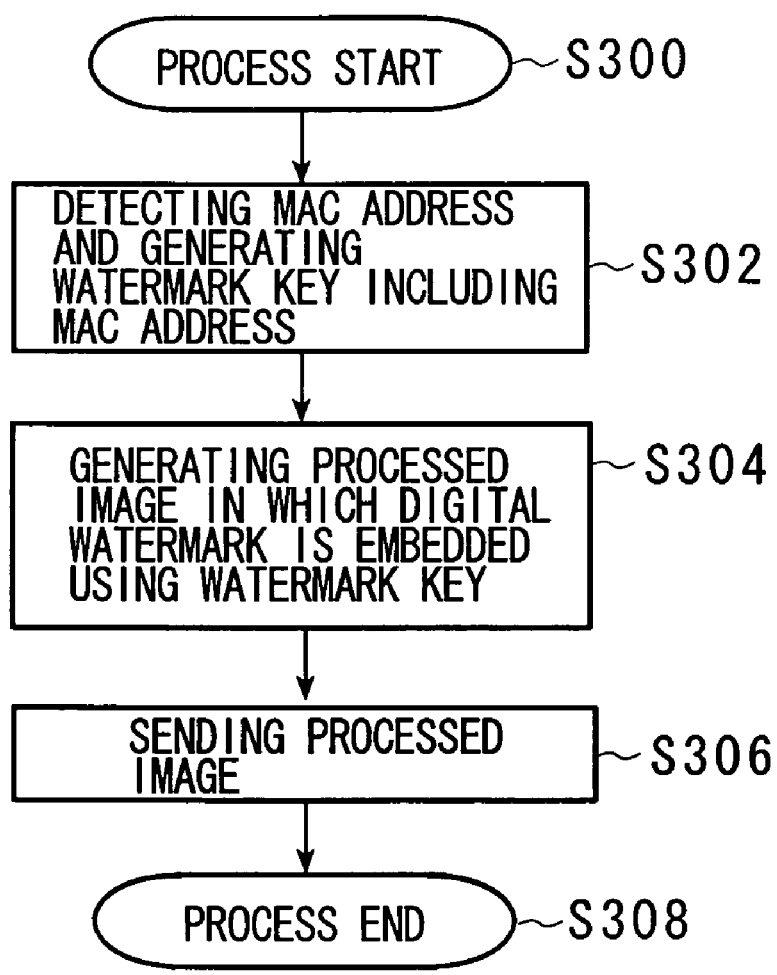
FIG. 20 shows a flow chart of the process of the image processing apparatus $106(m)$.

FIG. 20 shows a flow chart of the process of the image processing apparatus 106(*m*). The image processing apparatus 106(*m*) generates the watermark key B62(*m*) for embedding the digital watermark in the watermark key generating unit 62(*m*) (S302). The digital watermark embedding unit 61(*m*) then generates processed image C(m), in which a digital watermark is embedded, using the watermark key B62(*m*) (S304). In the image processing apparatus 106(*m*), the MAC address detecting unit 64*d*(*m*) detects the MAC address D64*d*(*m*) of itself and includes a part or all of the MAC address D64*d*(*m*) in the watermark key B62(*m*). The image processing apparatus 106(*m*) then sends the processed image C(m) to the image managing server 107 (S306).

Figure 21:
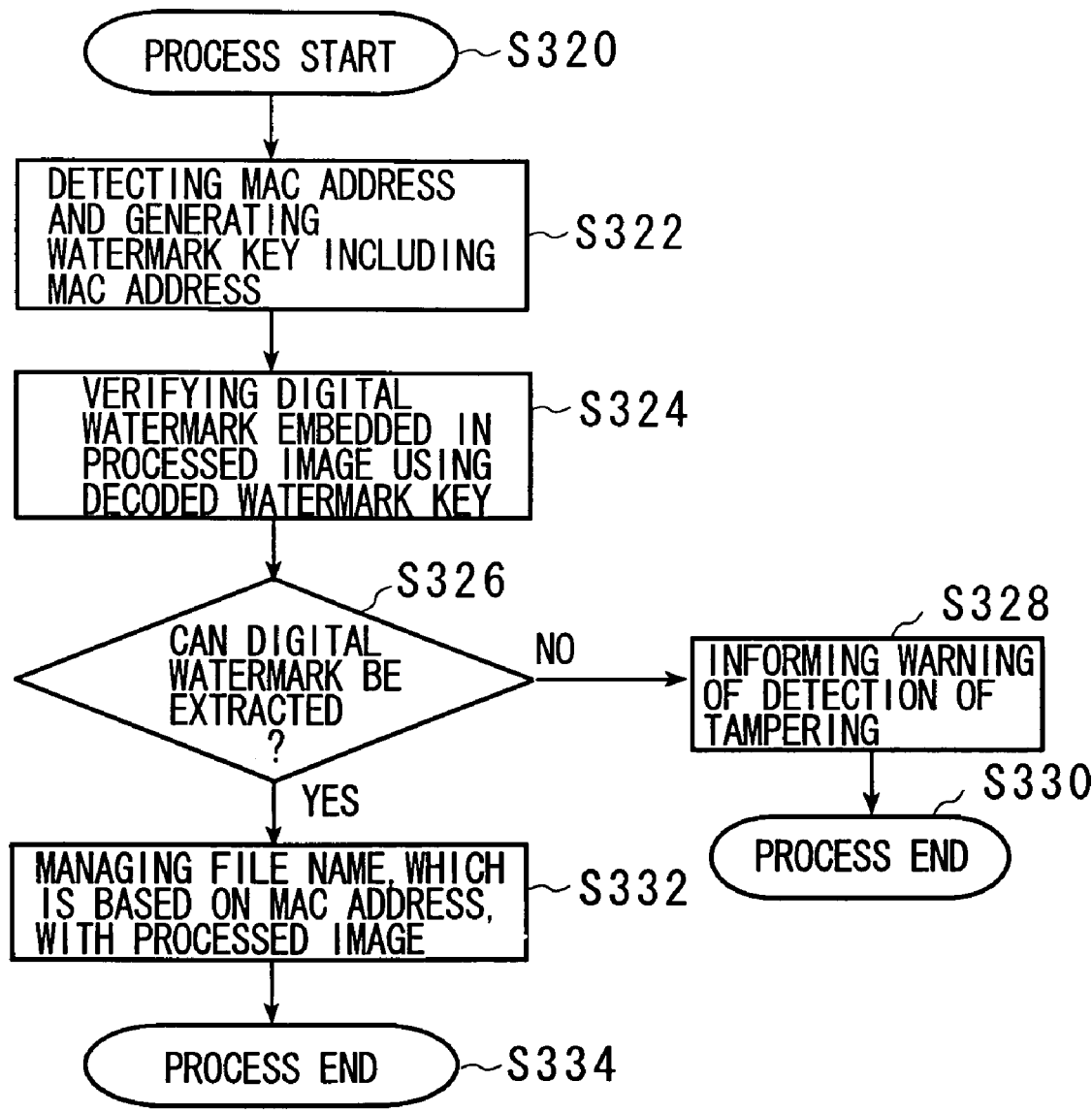
FIG. 21 shows a flow chart of the process of the image managing server 107.

FIG. 21 shows a flow chart of the process of the image managing server 107. In the image managing server 107, the MAC address detecting unit 70 detects the MAC address D64*d*(*m*) of the image processing apparatus 106(*m*). The watermark key generating means 75 generates the watermark key B72(*m*) which includes the MAC address D64*d*(*m*) (S322). The digital watermark verifying unit 71 verifies the digital watermark of the processed image C(m) by the generated watermark key B72(*m*) (S324). If the digital watermark can be extracted, it is confirmed that the processed image C(m), which is sent, is not tampered (S326). When the image displaying apparatus 108(*n*) is requested to transfer the processed image C(m) and the image managing server 103 transfers the processed image C(m) automatically, the image managing server 107 sends the processed image C(m) with the file name F(m), which is based on the MAC address D64*d*(*m*) of the image processing apparatus 106(*m*), to image displaying apparatus 108(*n*) (S328).

Figure 22:
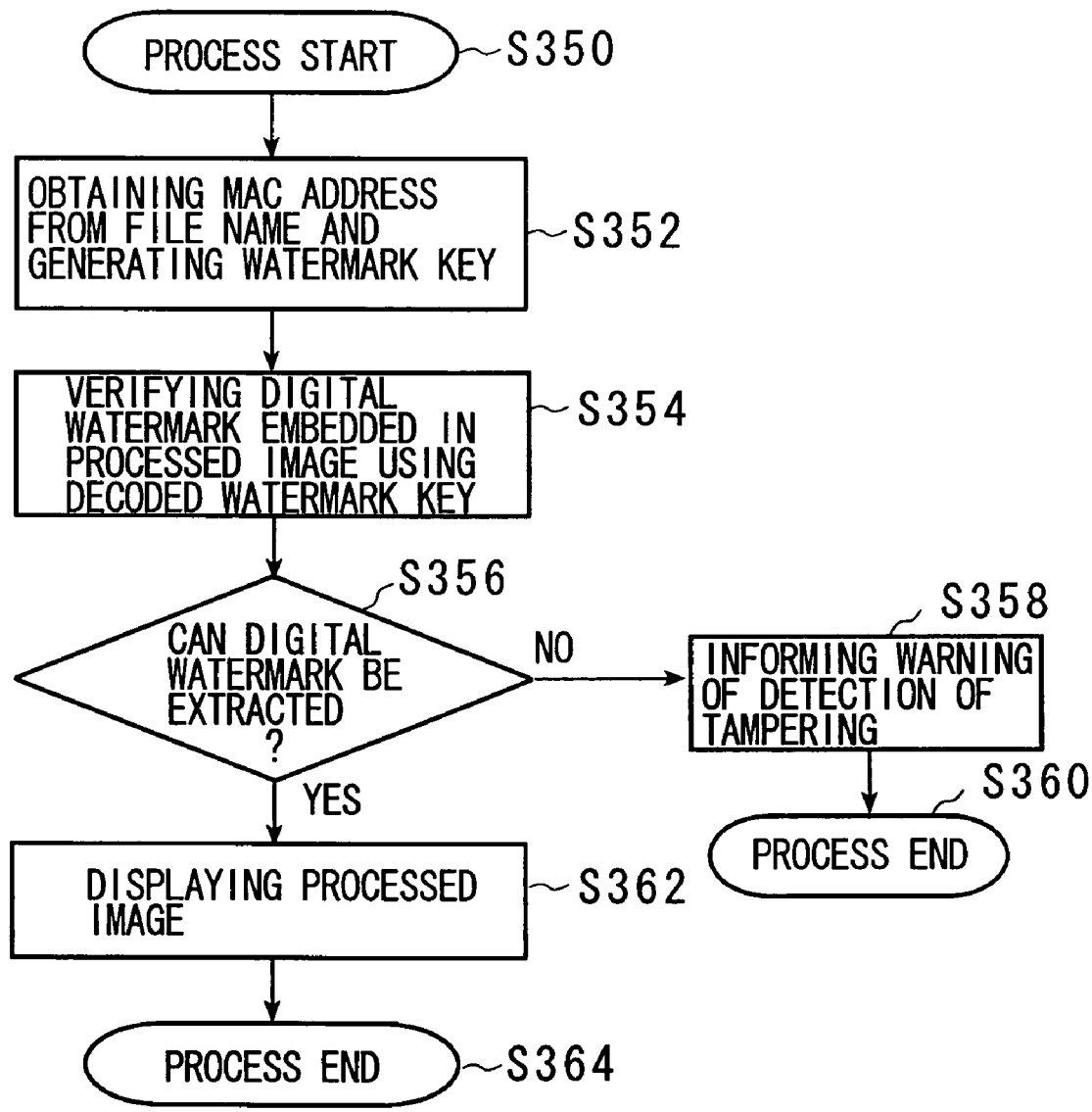
FIG. 22 shows a flow chart of the process of the image displaying apparatus $108(n)$.

FIG. 22 shows a flow chart of the process of the image displaying apparatus 108(*n*). In the image displaying apparatus 108(*n*), the file name processing unit 92(*n*) obtains the MAC address D64*d*(*m*) of the image processing apparatus 106(*m*) from the file name F(m) sent from the image managing server 107. The watermark key generating means 85(*n*) generates the watermark key B72(*m*) which includes the MAC address D64*d*(*m*) (S352). The digital watermark verifying unit 81(*n*) verifies the digital watermark of the processed image C(m) by the generated watermark key B72(*m*) (S354). If the digital watermark can be extracted, it is confirmed that the processed image C(m), which is sent, is not tampered (S356). The display control unit 59(*n*) displays the processed image C(m) on the displaying unit, not shown in the figure, such as CRT (S362).

Therefore, when the digital watermark cannot be extracted, and when the tamper is detected although the digital watermark can be extracted, because the processed image C is not valid, the image displaying apparatus 108(*n*) informs by displaying a warning that the tamper has been detected and does not display the processed image C(m) to prevent the iniquity by using the tampered image.

According to the seventh embodiment, the watermark key can be generated in the image displaying apparatus 108(*n*) because the additional information, which is based on the authentication information, is transferred with the image file from the image managing server 107 to the image displaying apparatus 108(*n*). The additional information, which is based on the authentication information, can also be transferred with the image file from the image processing apparatus 106(*m*) to the image managing server 107. Because the case is assumed that the image processing apparatus 106(*m*) and the image managing server 107 are connected by the LAN, the image managing server 107 can receive the MAC address D64*d*(*m*) through LAN without changing the system if the MAC address D64*d*(*m*) is used as an authentication information for the watermark key.

Figure 23:
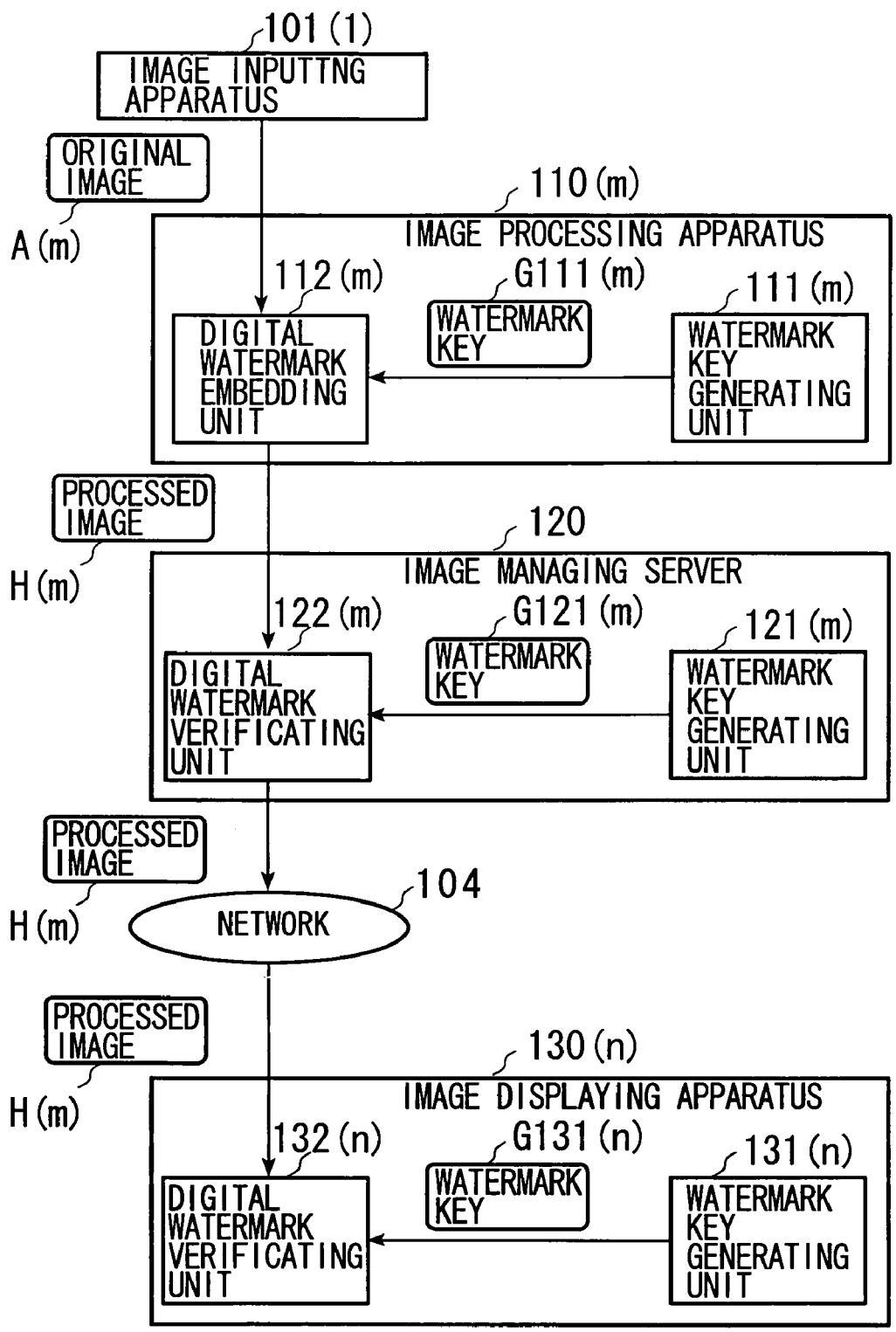
FIG. 23 shows the network structure of the image processing system of the eighth embodiment.

FIG. 23 shows the network structure of the image processing system of the eighth embodiment. In this image processing system, the images input by the image inputting apparatus 101(*m*) are transferred through an image processing apparatus 110(*m*), image managing server 120, and a network 104 and displayed in each of the image displaying apparatus 130(*n*). In the following explanation, let 101(*m*) be the m-th image inputting apparatus among 101(1) to 101 (M), and let 110(*m*) be the m-th image processing apparatus 110(1) to 102 (*m*), and let 130(*n*) be the n-th image displaying apparatus 130(1) to 130(*n*).

The image inputting apparatus 101(*m*) inputs an image and converts the input image to electronic data. The image inputting apparatus 101(*m*) may be a scanner or a digital camera. The image inputting apparatus 101(*m*) outputs the input image data as an original image A(m). The image processing apparatus 110(*m*) has a function of inputting each of the original images A(m) from the image inputting apparatus 101(*m*) and outputting a processed image H(m). The image processing apparatus 110(*m*) generates the processed image H(m) by embedding a digital watermark into the original image A(m).

This image processing apparatus 110(*m*) has a digital watermark embedding unit 112(*m*) and a watermark key generating unit 111(*m*). The digital watermark embedding unit 112(*m*) outputs the processed image H(m) by embedding an digital watermark, which is embedded for detecting tampering with the original image A(m), into the original image A(m) using the watermark key G111(*m*). The watermark key generating unit 111(*m*) generates the watermark key G111(*m*) which includes the authentication information that is explained in the embodiments shown above.

Here, the watermark key G111(*m*) is explained as a common key that can be used for both embedding and detecting the digital watermark, but the watermark keys G111 for each of the embedding and the detecting can be different in this eighth embodiment. Here, the case is assumed that the watermark key G111(*m*) is generated and exchanged by a public key cryptosystem such as RSA. The image managing server 120 is a server which stores and manages the processed image H(m) sent from the image processing apparatus 110(*m*). The image managing server 120 can be constructed as a usual database or a workflow system.

The image managing server 120 has a digital watermark embedding unit 122(*m*) and a watermark key generating unit 121(*m*). The digital watermark embedding unit 112(*m*) extracts the digital watermark by using watermark key G121(*m*), which is for detecting tampering with the processed image H(m), and verifies the extracted digital watermark. The watermark key generating unit 121(*m*) generates the watermark key G121(*m*) which is identical with the watermark key G111(*m*). The storing of the apparatus identifying value in the apparatus identifying value storing unit, not shown in the figure, and the setting of the image counter, not shown in the figure, is made beforehand at the start of the operation or during the operation of the system.

The network 104 is a network constructed by LAN or WAN.

The image displaying apparatus 130(*n*) is an apparatus to display and utilize the processed image H(m). The image displaying apparatus 130(*n*) has a digital watermark embedding unit 132(*n*) and a watermark key generating unit 131(*n*). The digital watermark embedding unit 132(*n*) extracts the digital watermark by using watermark key G131(*m*), which is for detecting tampering with the processed image H(m), and verifies the extracted digital watermark. The watermark key generating unit 131(*n*) generates the watermark key G131(*m*) which is identical with the watermark key G111(*m*). The storing of the apparatus identifying value in the apparatus identifying value storing unit inside the watermark key generating unit 131(*n*), not shown in the figure, and the setting of the image counter, not shown in the figure, is made beforehand at the start of the operation or during the operation of the system.

The image managing server 120(*m*) generates the watermark key G121(*m*), which is identical with the watermark key G111(*m*) that includes the authentication information, by itself by the watermark key generating unit 121(*m*). The digital watermark verifying unit 122(*m*) extracts the digital watermark from the processed image H(m) by the watermark key G121(*m*). The digital watermark verifying unit 122(*m*) then verifies whether the digital watermark has been tampered and stores the processed image H(m) in the storage control unit, not shown in the figure.

The image displaying apparatus 130(*n*) generates the watermark key G131(*m*), which is identical with the watermark key G111(*m*) that includes the authentication information by the watermark key generating unit 131(*m*). The digital watermark verifying unit 132(*m*) extracts the digital watermark from the processed image H(m) by the watermark key G131(*m*). The digital water mark verifying unit 132(*m*) then verifies whether the digital watermark has been tampered and displays the processed image H(m) in the display unit, not shown in the figure.

Therefore, according to the eighth embodiment, the processed image can be sent from the image managing server to the image displaying apparatus and displayed in the image displaying apparatus only by registering the apparatus identifying value such as the MAC address of the image processing apparatus and the apparatus serial number in the image displaying apparatus at the start of the system operation. It is because the watermark key does not have to be sent from the image processing apparatus to the image managing server, or from the image managing server to the image displaying apparatus.

In the case that the processed image is sent from the image inputting apparatus to the image managing server and then to the image displaying apparatus as a series of the workflow, or the case that the image displaying apparatus requests the specific image to the image managing server and displays the specific image, the processed image can be displayed in the image displaying apparatus only by transferring the processed image. Thus, the time for transferring the processed image can be reduced.

The watermark key generating unit as shown in each of the above embodiments can be constructed by the reduced number of the software and the hardware. By reducing the possible points where the watermark key is stolen, the security level of the system can increase.

The system having a single image managing server is assumed in the each of the above embodiments, but the system having a plurality of the image managing servers corresponding to a plurality of the image processing apparatus also can be applied to the above embodiments. The system having a plurality of the image managing servers can be realized in the above embodiments by providing a server that manages the number of the image processing collectively inside the system. If the number of the image processing for each of the image processing apparatus is known, the above embodiments can be applied even in the system having a plurality of the image managing servers.

If the image is sent from the image processing apparatus to the image managing server, the image managing server may ask the number of the times of the image processing to the image processing apparatus. The image managing server may then generate the image identifying value, which is a hash value, using the number of the times of the image processing. The image managing server may then generates the watermark key using the image identifying value and verifies the water mark key. The image managing server may stores a pair of the processed image and the watermark key if the verification succeeds.

Figure 24:
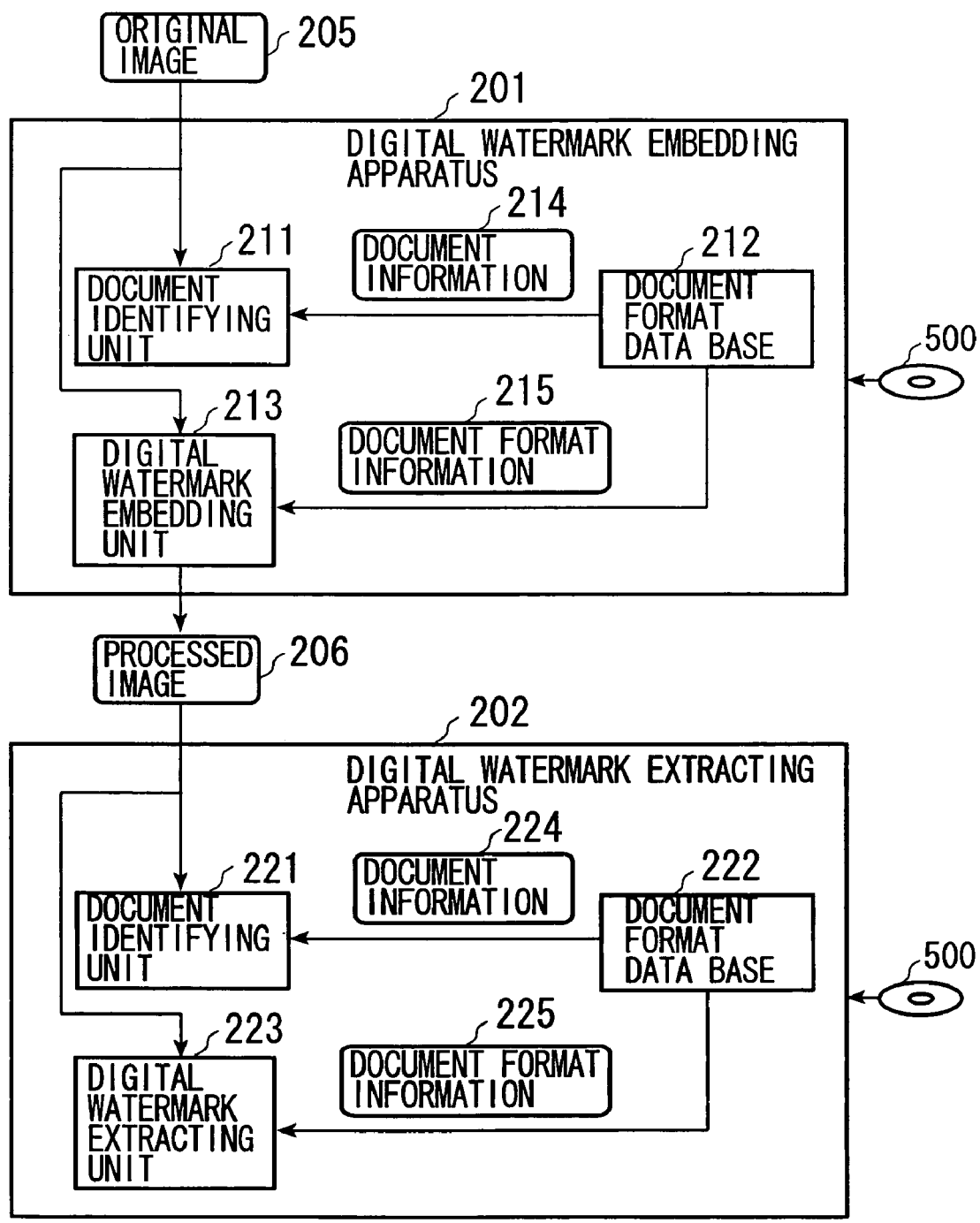
FIG. 24 shows the network structure of the image processing system of the ninth embodiment.

FIG. 24 shows the block diagram of the image processing system of the ninth embodiment. In this image processing system, a digital watermark embedding apparatus 201, which is one example of an image providing apparatus, embeds a digital watermark in an original image 205 partially according to a document format information 215, which is based on a document information 214. The digital watermark embedding apparatus 201 then sends the original image 205, in which a digital watermark is embedded, as a processed image 206 to a digital watermark extracting apparatus 202, which is one example of an image utilizing apparatus. Each of CD-ROMs 500 as an example of a recording medium can store a computer program to be executed on the digital watermark embedding apparatus 201 and the digital watermark extracting apparatus 202 respectively. The stored program is read from each of CD-ROMs 500 and installed and executed on the corresponding apparatus as shown in FIG. 24.

The digital watermark extracting apparatus 202 extracts a digital watermark from the processed image 206 according to a document format information 225, which is based on a document information 224. The document information 224 is identical with the document information 214, and the document format information 225 is identical with the document format information 215. A plurality of the necessary specific information is dispersed in the original image 205. The processed image 206 is created by embedding the digital watermark only in the part of the regions where the necessary specific information are dispersed in the original image 205.

The digital watermark embedding apparatus 201 comprises a document identifying unit 211, a document format database 212, and a digital watermark embedding unit 213. The document identifying unit 211 has a function of identifying a document by identifying the feature of the original image 205 or by OCR, not shown in the figure. The document identifying unit 211 also has the function of sending the document information 214 to the document format database 212. The document information 214 shows the identification of the document classification identified from the specific part. The document format database 212 manages the information, such as the coordinates of the region which holds the specific information necessary for embedding the digital watermark for each document classification, as a document format information table so that the information can be retrieved by using the document information 214.

The document format database 212 has the function of providing the information such as the coordinates to the digital watermark embedding unit 213 as the document format information 215, when the document information 214 is sent from the document identifying unit 211. The digital watermark embedding unit 213 has the function of embedding the digital watermark only in the specific region in the image according to the document format information 215 provided by the document format database 212. The digital watermark embedding apparatus 201 thus provides the processed image 206, in which the digital watermark is embedded only in the necessary part in the original image 205, to the digital watermark extracting apparatus 202.

The digital watermark extracting apparatus 202 comprises a document identifying unit 221, a document format database 222, and a digital watermark extracting unit 223. The document identifying unit 221 has a function of identifying a document by identifying the feature of the processed image 206 or by OCR. The document identifying unit 221 also has the function of sending the document information 224 to the document format database 222. The document information 224 is identical with the document information 214, which shows the identification of the document classification identified from the specific part. The document format database 222 is identical with the document format database 212. The document format database 222 manages the information, such as the coordinates of the necessary part where the digital watermark is embedded for each document classification, as document format information table so that the information can be retrieved by using the document information 224.

The document format database 222 has the function of providing the information such as coordinates, which is identical with the document format information 215, to the digital watermark extracting unit 223 as the document format information 225, when the document information 224 is sent from the document identifying unit 221. The digital watermark extracting unit 223 extracts the digital watermark from the part where the digital watermark is embedded in the processed image 206, according to the document format information 225 provided by the document format database 222. Therefore, the digital watermark, which is extracted by the digital watermark extracting unit 223 according to the document format information 225, is identical with the digital watermark, which is embedded by the digital watermark embedding unit 213 in the digital watermark embedding apparatus 201 according to the document format information 215.

FIG. 25 shows an example of the document formats in which the necessary specific information is dispersed. The necessary specific information is dispersed in the document, and the digital watermark is embedded in the part of the necessary specific information. This form X shows the regions where a date, a certificate number, a name, a sex, a birth date, an address, a telephone number, a sick name, a medical examination starting date, an amount, and a postscript are printed.

The information written in each of regions should not be tampered, and the information written in each of regions is the necessary specific information dispersed in the document. For example, the region R1 is the region to write the certificate number "0123456789", the region R2 is the region to write the name "YAMADA TARO", the region R3 is the region to write the amount "50,000 YEN". Here, the above three regions R1 to R3 will be used for example in the following explanation. The other regions such as the region to print the date are similar to the region R1 to R3 so that the explanation of the regions other than above three regions will be omitted. The identification number R4 is written in the form as a document classification information to identify the document classification. In this figure, the identification number R4 is the identification number corresponding to document classification written or printed in the specific part of the form X, which is at the upper right of the form X. The form X input as an image, is used as the original image 205 in the following explanation.

The case of inputting the form X as the original image 205 will be considered. The part where the character "date" and "name" are printed will not change for all the time from the initial setting. The information, which is printed in these parts, is the fixed description information, which is not the necessary specific information after the inputting of the information as an image. Usually the information of these parts does not need to be recognized by OCR and inspected by a human. Therefore, for the original image 205 of the form X, in which the fixed description information is printed and the specific information is hand written in the predefined region, only the specific information written by hand must be protected.

Even in the case of preserving the form as an imaged data, the digital watermark is embedded in the region where the specific information is written by hand, and tamper can be verified by verifying these regions written by hand. The ninth embodiment thus embeds the digital watermark in the region where the necessary specific information is dispersed, such as the region R1 of the certificate number "0123456789", the region R2 of the name "YAMADA TARO", and the region R3 of the amount "50000 YEN" as the specific information. The ninth embodiment then verifies tamper by extracting the digital watermark when these regions having the specific information have bee.

As shown in FIG. 24, the form X is input to the document identifying unit 211 as the original image 205 in which a digital watermark is embedded. The document identifying unit 211 extracts a part including the identification number R4 which is shown in upper right of the original image 205. The document identifying unit 211 then recognizes the extracted part as characters by OCR and identifies the document classification as a number and sends the number to the document format database 212 as the document information 214.

Here, in order to distinguish the document classification, the case of recognizing the identification number as characters, which represents the document classification, by the OCR which is not shown in the figure, is assumed. The document classification can be distinguished also by analyzing and identifying the format of the layout or style of the characters and the frames. In other words, the document classification can be automatically distinguished by using the format identification technology and the format analysis technology, which identifies the structure of the frame format in the document and analyzes the format and recognizes the characters in the frames to identify the document classification.

The document format database 212 inputs the document information 214 and outputs the document format information 215 to the digital watermark embedding unit 213. The document format information 215 has the information of the region where the digital watermark corresponding to the document information 214 is embedded.

FIG. 26 shows an example of the document format information table. The document format information table includes the document format information 215 as a data, which represents the coordinates of the region where the digital watermark is embedded on the image, for each document classification. The document format information 215 is expressed as a pair of the coordinates such as the upper left corner coordinates (X11, Y11) and the lower right corner coordinates (X11, Y11) which represent the region of the rectangular part where the characteristic information exists. Here, the document format information 215 for the identification number "0123456789" of the region R1 of the form X is represented as the upper left corner coordinates (X11, Y11) and the lower right corner coordinates (X21, Y21). Similarly, the document format information 215 for the name "YAMADA TARO" of the region R2 of the form X is represented as the upper left corner coordinates (X12, Y12) and the lower right corner coordinates (X22, Y22). The document format information 215 for the amount "50,000 YEN" of the region R3 of the form X is represented as the upper left corner coordinates (X13, Y13) and the lower right corner coordinates (X23, Y23). The document format information 215 can be expressed in a style such as a pair of the upper left corner coordinates (X11, Y11) and the width and the height (width 1, height 1).

The digital watermark method, which embeds the digital watermark in the style other than rectangular form can be used. When the shape of the region, in which the digital watermark is embedded, is not rectangular, the data format, which can represent the non-rectangular shape, can be used.

The embedding process of the digital watermark in the digital watermark embedding apparatus 201 will be explained using FIG. 24. The document identifying unit 211 recognizes the characters of the identification number R4 by OCR when the forms X as shown in FIG. 25 is input as the original image 205. The document identifying unit 211 sends the recognized characters to the document format database 212 as the document information 214. The document format database 212 retrieves the document format information 215, such as coordinate values to embed the digital watermark, from the document format information table of the document information 214 such as the identification number R4. The document format database 212 then provides the document format information 215 to the digital watermark embedding unit 213. The digital watermark embedding unit 213 inputs the document format information 215 and embeds the digital watermark in the designated region. As a result, the digital watermark embedding unit 213 outputs the image, in which the digital watermark is embedded, as the processed image 206.

Next, The extracting process of the digital watermark in the digital watermark extracting apparatus 202 will be explained. The digital watermark is extracted from the processed image 206 in a similar way. First, the document identifying unit 221 recognizes the characters of the identification number R4 by OCR when the form X as shown in FIG. 25 is input as the processed image 205. The document identifying unit 221 sends the recognized characters to the document format database 222 as the document information 224.

The document format database 222 retrieves the document format information 225, such as coordinate values to embed the digital watermark, from the document format information table of the document information 224 such as the identification number R4. The document format database 222 then provides the document format information 225 to the digital watermark extracting unit 223. The digital watermark extracting unit 223 inputs the document format information 225 and extracts the digital watermark in the designated region. As a result, if the digital watermark cannot be extracted, there is a possibility that the processed image 206 has been tampered. Even if the digital watermark can be extracted, there is a possibility that the data of designated region has been tampered, so that the tamper can be verified.

FIG. 27 shows the form X in which the digital watermark is embedded. The digital watermark is embedded in the shaded parts of the figure, and the shaded parts are designated by the document format information 215. The digital watermark cannot be recognized visually in practice, but here the region is shaded for explanation. For example, the part of the certificate number "0123456789" of the region R1, the part the name "YAMADA TARO" of the region R2, and the part the amount "50,000 YEN" of the region R3 are shaded.

According to the ninth embodiment, the location information, which shows the region where the characteristic information exists, is defined beforehand for the image in which the necessary characteristic information is dispersed. The digital watermark is embedded and extracted based on this definition, so that tampering with the hand writing part of the image in the document format, in which the specific information is hand written in the prescribed region, can be detected. Therefore, the digital watermark does not need to be embedded in the unnecessary information, so that the image can be smaller in size than the image in which the digital watermark is embedded by conventional methods. The time for processing the image thus can be reduced.

Generally, when the digital watermark is embedded in the original image, the quantity of the information increases. Because the digital watermark is embedded in the image in a dispersed form not to be recognized visually, and also because the watermark is mixed in the image as a noise component, the compression ratio of the image may reduce when the image is stored. Therefore, the compressed image, in which the digital watermark is embedded, usually becomes larger in size than the compressed original image. The ninth embodiment can increase the efficiency of storing of the image data by reducing the part of embedding the digital watermark and minimizing the image alteration. The influence on the size after the compression can be also reduced. Furthermore, the time of embedding the digital watermark can be reduced by minimizing the region where the digital watermark is embedded.

The one common document format database is preferable to be set within the system from the view point of the efficiency when the many apparatus are dispersed in the system, and when the document format database becomes larger due to the increase of the document types. The one common document format database is also preferable because the apparatus and the document types can be easily added. As shown above, because the document format information indicates the location of embedding the digital watermark, the document format information is preferable not to be visible for a security reason. Therefore, the document format information is preferable to be encoded when it is exchanged.

Figure 28:
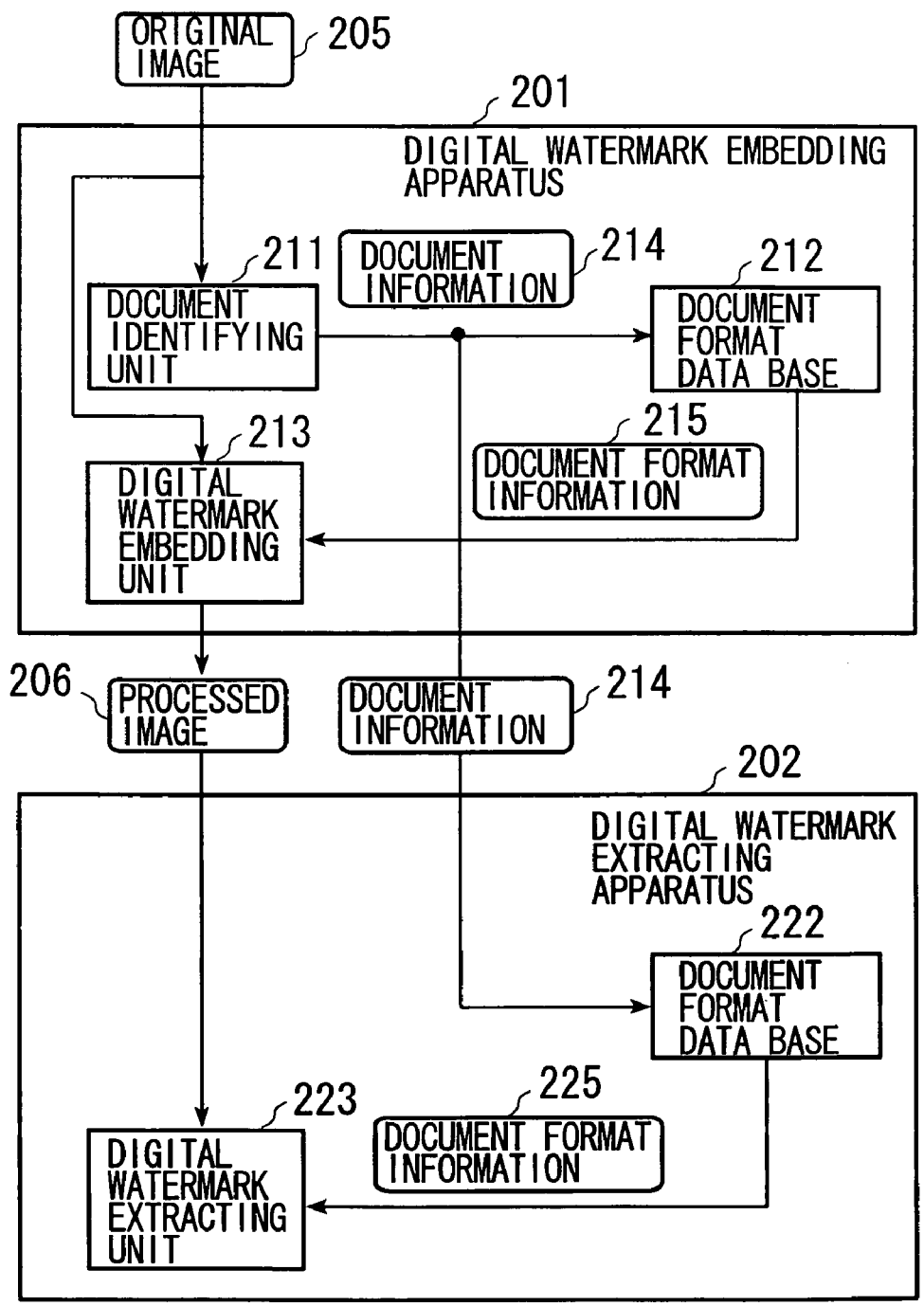
FIG. 28 shows the block diagram of the image processing system of the tenth embodiment.

FIG. 28 shows the block diagram of the image processing system of the tenth embodiment. The difference between the ninth embodiment and the tenth embodiment will be explained in the following. The same reference characters are used for the same constituent as the ninth embodiment.

In this image processing system, a digital watermark embedding apparatus 201 embeds a digital watermark in an original image 205 partially according to a document format information 215, which is based on a document information 214. The digital watermark embedding apparatus 201 then sends the original image 205, in which a digital watermark is embedded, as a processed image 206 to a digital watermark extracting apparatus 202.

The digital watermark extracting apparatus 202 extracts a digital watermark, which is partially embedded in the processed image 206, according to a document format information 225, which is identical with the document information 215 that is based on a document information 224 sent from the digital watermark embedding apparatus 201. A plurality of the necessary specific information is dispersed in the original image 205. The processed image 206 is made by embedding the digital watermark only in the part of the regions where the necessary specific information is dispersed in the original image 205.

The digital watermark embedding apparatus 201 comprises a document identifying unit 211, a document format database 212, and a digital watermark embedding unit 213. The document identifying unit 211 identifies a document by identifying the feature of the original image 205 or by OCR, not shown in the figure. The document identifying unit 211 also sends the document information 214 to the document format database 212 and the digital watermark extracting apparatus 202. The document information 214 shows the identification of the document classification identified from the specific part. The document format database 212 and the digital watermark embedding unit 213 are the same as the document format database 212 and the digital watermark embedding unit 213 of the ninth embodiment shown above, and the explanation of them will be omitted.

The digital watermark extracting apparatus 202 comprises a document format database 222 and a digital watermark extracting unit 223. The document format database 222 is identical with the document format database 212. The document format database 222 manages the information, such as the coordinates of the necessary part where the digital watermark is embedded for each of document classification, as a document format information table so that the information can be retrieved by using the document information 224, which is sent from the digital watermark embedding apparatus 201.

The document format database 212 provides the information such as the coordinates, which is identical with the document format information 215, to the digital watermark extracting unit 223 as a document format information 225. The explanation of the digital watermark embedding unit 223 will be omitted because the digital watermark embedding unit 223 of the ninth embodiment is used. The explanation of the document example, in which the digital watermark is embedded in the region where the necessary specific information is dispersed in the document, will be omitted. The explanation of how the document format information table and the digital watermark are embedded also will be omitted because it is the same as in the ninth embodiment.

The embedding process of the digital watermark in the digital watermark embedding apparatus 201 will be explained. The document identifying unit 211 recognizes the characters of identification number R4 by OCR when the form X as shown in FIG. 25 is input as the original image 205. The document identifying unit 211 sends the recognized characters to the document format database 212 as the document information 214. The document format database 212 retrieves the document format information 215, such as coordinate values to embed the digital watermark, from the document format information table of the document information 214 such as the identification number R4.

The document format database 212 then provides the document format information 215 to the digital watermark embedding unit 213. The digital watermark embedding unit 213 inputs the document format information 215 and embeds the digital watermark in the designated region. As a result, the digital watermark embedding unit 213 outputs the image, in which the digital watermark is embedded, as the processed image 206. The document identifying unit 211 also sends the document information 214 corresponding to the processed image 206 to the document format database 222 in the digital watermark extracting apparatus 202.

Next, the extracting process of the digital watermark in the digital watermark extracting apparatus 202 will be explained. The digital watermark is extracted from the processed image 206 in a similar way. First, the document information 214 is input to the document format database 222. The document format database 222 retrieves the document format information 225, such as coordinate values to embed the digital watermark, from the document format information table of the document information 214 such as the identification number R4.

The document format database 222 then provides the document format information 225 to the digital watermark embedding unit 223. The digital watermark extracting unit inputs the document format information 225 and extracts the digital watermark from the designated region. If the digital watermark cannot be extracted from the designated region, there is a possibility that the processed image 206 has been tampered. Even if the digital watermark can be extracted, there is a possibility that the data in the designated region has been tampered, so that tamper can be detected.

With the advantages of the ninth embodiment, the image processing system of the tenth embodiment does not have to comprise the document identifying unit in the digital watermark extracting apparatus because the document information is sent from the digital watermark embedding apparatus to the digital watermark extracting apparatus so that the number of the components used for the system can be reduced.

When there are many digital watermark embedding apparatus and many types of the documents, the time for retrieving the document can be reduced as follows. The retrieving time can be reduced by corresponding each of the digital watermark embedding apparatus to the document format information used in the digital watermark embedding apparatus and managing many types of the document format information by identifying the digital watermark embedding apparatus and retrieving the corresponding document format information.

As a network that can identify the apparatus, there are LAN and the telephone line. To identify the apparatus corresponding to the document format information, the MAC address of the LAN card can be used for the LAN, and the dial telephone number can be used for the telephone line.

Figure 29:
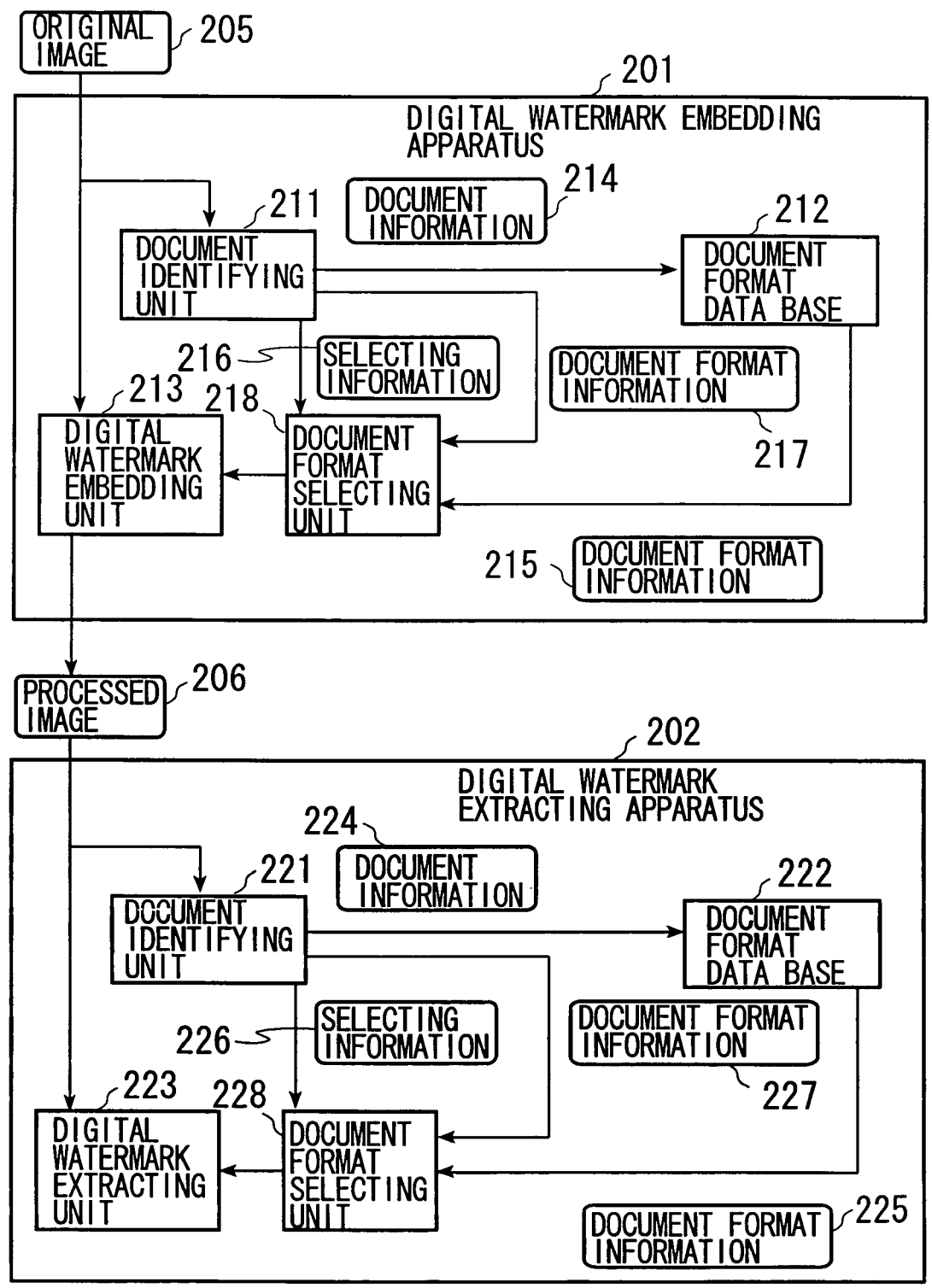
FIG. 29 shows the block diagram of the image processing system of the eleventh embodiment.

FIG. 29 shows the block diagram of the image processing system of the eleventh embodiment. The difference between the ninth embodiment and the eleventh embodiment will be explained in the following. The same reference characters are used for the same constituent as the ninth embodiment, and the explanation for the same constituent will be omitted in the following.

In this image processing system, a digital watermark embedding apparatus 201 embeds a digital watermark in an original image 205 partially according to a document format information 215 or a document format information 217, both of which are based on a document information 214. The document identifying unit 211 obtains the document format information 217 by recognizing the format of the original image 205 and identifying the region where the necessary specific information exists when the form of the original image 205 is not typical so that the form is not registered in the document format database 212.

When the form of the original image 205 is not typical, the document format information 215 will not be sent from the document format database 212, then the document identifying unit 211 recognizes the original image 205 by using the format recognizing technology and the format identifying technology used in the OCR technology. The document identifying unit 211 sends the document format information 217, which is to identify the region where the necessary specific information exists, to the document format selecting unit 218.

When the document format information 215 is not sent from the document format database 212, the document identifying unit 211 sends the selecting information 216 to the document format selecting unit 218. The selecting information 216 makes the document format selecting unit 218 to select the document format based on the document format information 217 provided from the document identifying unit 211.

The digital watermark embedding apparatus 201 then sends the original image 205, in which a digital watermark is embedded, as a processed image 206 to a digital watermark extracting apparatus 202.

The digital watermark extracting apparatus 202 extracts a digital watermark, which is partially embedded in the processed image 206, according to a document format information 225 or a document format information 227, both of which are based on a document information 214. The document identifying unit 221 obtains the document format information 227 by recognizing the format of the processed image 206 and identifying the region where the necessary specific information exists when the form of the processed image 206 is not typical so that the form is not registered in the document format database 222.

When the form of the processed image 206 is not typical, the document format information 225 will not be sent from the document format database 222, then the document identifying unit 221 recognizes the processed image 206 by using the format recognizing technology and the format identifying technology used in the OCR technology. The document identifying unit 221 sends the document format information 227, which is to identify the region where the necessary specific information exists, to the document format selecting unit 228.

When the document format information 225 is not sent from the document format database 222, the document identifying unit 221 sends the selecting information 226 to the document format selecting unit 228. The selecting information 226 makes the document format selecting unit 228 to select the document format based on the document format information 227 provided from the document identifying unit 221. The digital watermark extracting apparatus 202 extracts the digital watermark from the processed image 206 by the digital watermark extracting unit 223.

According to the eleventh embodiment, even when the location information where the digital watermark is embedded is not registered in the document format database, the image processing system can analyze the format of the image and identify the region where the necessary specific information exists, and then embed and extract the digital watermark.

Figure 30:
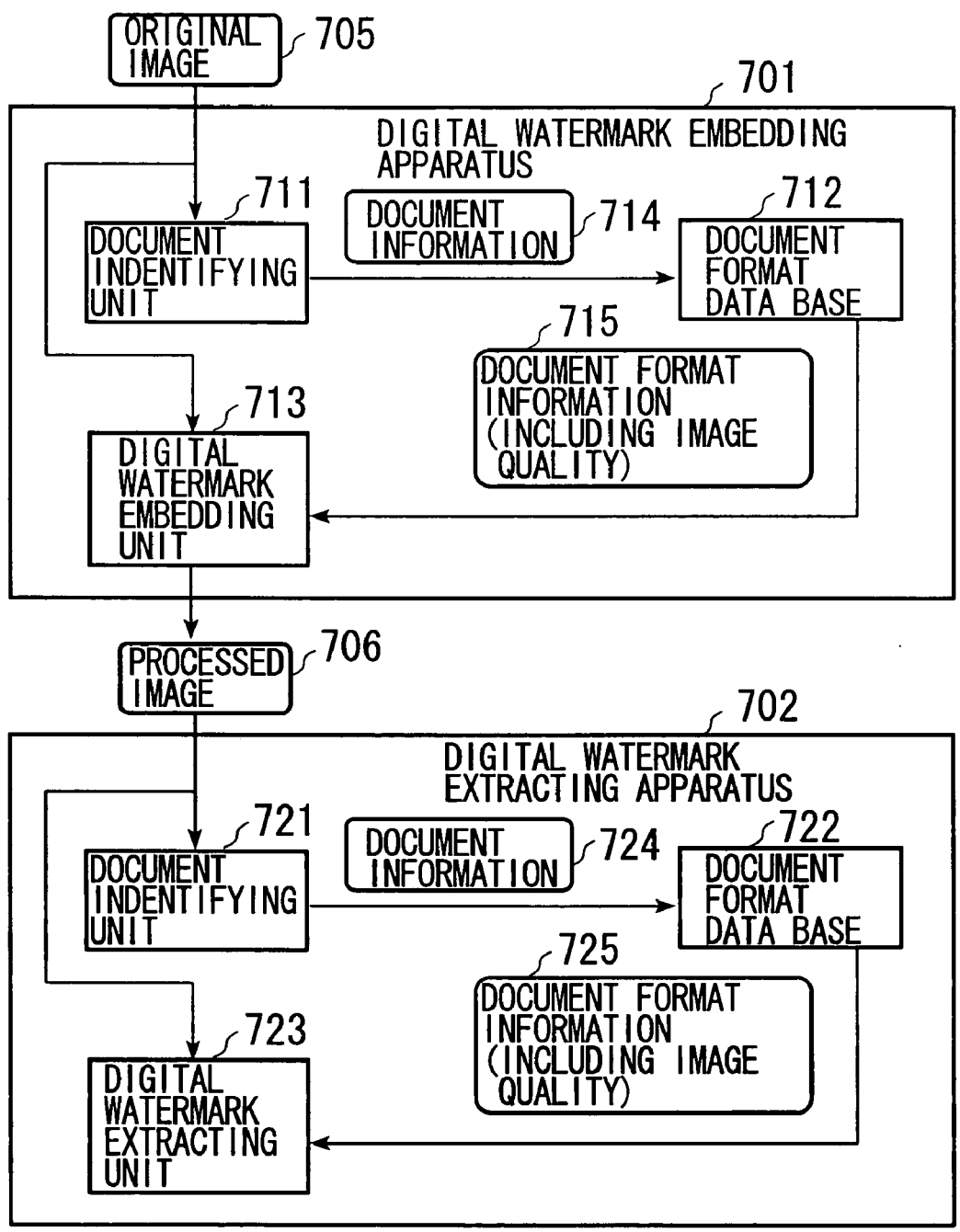
FIG. 30 shows the block diagram of the image processing system of the twelfth embodiment.

FIG. 30 shows the block diagram of the image processing system of the twelfth embodiment. In this embodiment, the digital watermark differs depending on the location of the image that includes different qualities of information such as characters or a photograph in an image. As an example of such an image, there are a document including a portrait image, a form including an image of a seal, an image of a driver license, and so on. Here, the form shown in the FIG. 31, which has characters with different size and a photograph of a portrait, is used as an example.

In this image processing system, a digital watermark embedding apparatus 701 embeds a digital watermark in an original image 705 partially according to a document format information 715, which is based on a document information 714. The digital watermark embedding apparatus 701 then sends the original image 205, in which a digital watermark is embedded, as a processed image 706 to a digital watermark extracting apparatus 702.

The digital watermark extracting apparatus 702 extracts a digital watermark, which is partially embedded in the processed image 706, from the processed image 706 according to a document format information 725, which is based on a document information 724. The document information 724 is identical with the document information 714, and the document format information 725 is identical with the document format information 715. The regions with different image quality exist in the original image 705. The processed image 706 is created by embedding different types of digital watermarks in each of the regions with different image quality.

The digital watermark embedding apparatus 701 comprises a document identifying unit 711, a document format database 712, and a digital watermark embedding unit 713. The document identifying unit 711 outputs the document information 714 by identifying the document format of the image by the characteristic of the image or OCR. The document format database 712 outputs the document format information 715, which provides the information on the region where the digital watermark is embedded and the information on the image quality of the region. The digital watermark embedding unit 713 embeds the digital watermark, which matches with the information on the image quality, in the designated region according to the information on the region and the image quality included in the document format information 715.

The document identifying unit 711 has a function of identifying a document by identifying the feature of the original image 705 or by OCR, not shown in the figure. The document identifying unit 211 also has the function of sending the document information 714 to the document format database 712. The document information 714 shows the identification of the document classification identified from the specific part. The document format database 712 manages the information, which is based on the coordinates of the region where the specific information necessary for embedding the digital watermark for each of document classification and the image quality type of the region, as a document format information table so that the information can be retrieved by using the document information 714.

The document format database 712 has the function of providing the information, which includes the coordinates and the image quality, to the digital watermark embedding unit 713 as the document format information 715, when the document information 714 is sent from the document identifying unit 711. The digital watermark embedding unit 713 has the function of embedding the different kinds of the digital watermark depending on the image quality of each specific region in the image according to the document format information 715 provided by the document format database 712. The digital watermark embedding apparatus 701 thus provides the processed image 706, in which the different kinds of the digital watermark are embedded corresponding to the difference of the image quality in the original image 705, to the digital watermark extracting apparatus 702.

The digital watermark extracting apparatus 702 comprises a document identifying unit 721, a document format database 722, and a digital watermark extracting unit 723. The document identifying unit 721 has a function of identifying a document by identifying the feature of the processed image 706 or by OCR. The document identifying unit 721 also has the function of sending the document information 724 to the document format database 722. The document information 724 is identical with the document information 714, which shows the identification of the document classification identified from the specific part. The document format database 722 is identical with the document format database 712. The document format database 722 manages the information, which is based on the coordinates of the necessary part where the digital watermark is embedded for each document classification and image quality type of the regions, as document format information table so that the information can be retrieved by using the document information 724.

The document format database 722 has the function of providing the information that includes the coordinates and the image quality, which is identical with the document format information 715, to the digital watermark extracting unit 723 as the document format information 725, when the document information 724 is sent from the document identifying unit 721. The digital watermark extracting unit 723 extracts different kinds of digital watermarks, which are embedded in the processed image 706 according to the difference of the image quality in the processed image 706.

Figure 31:
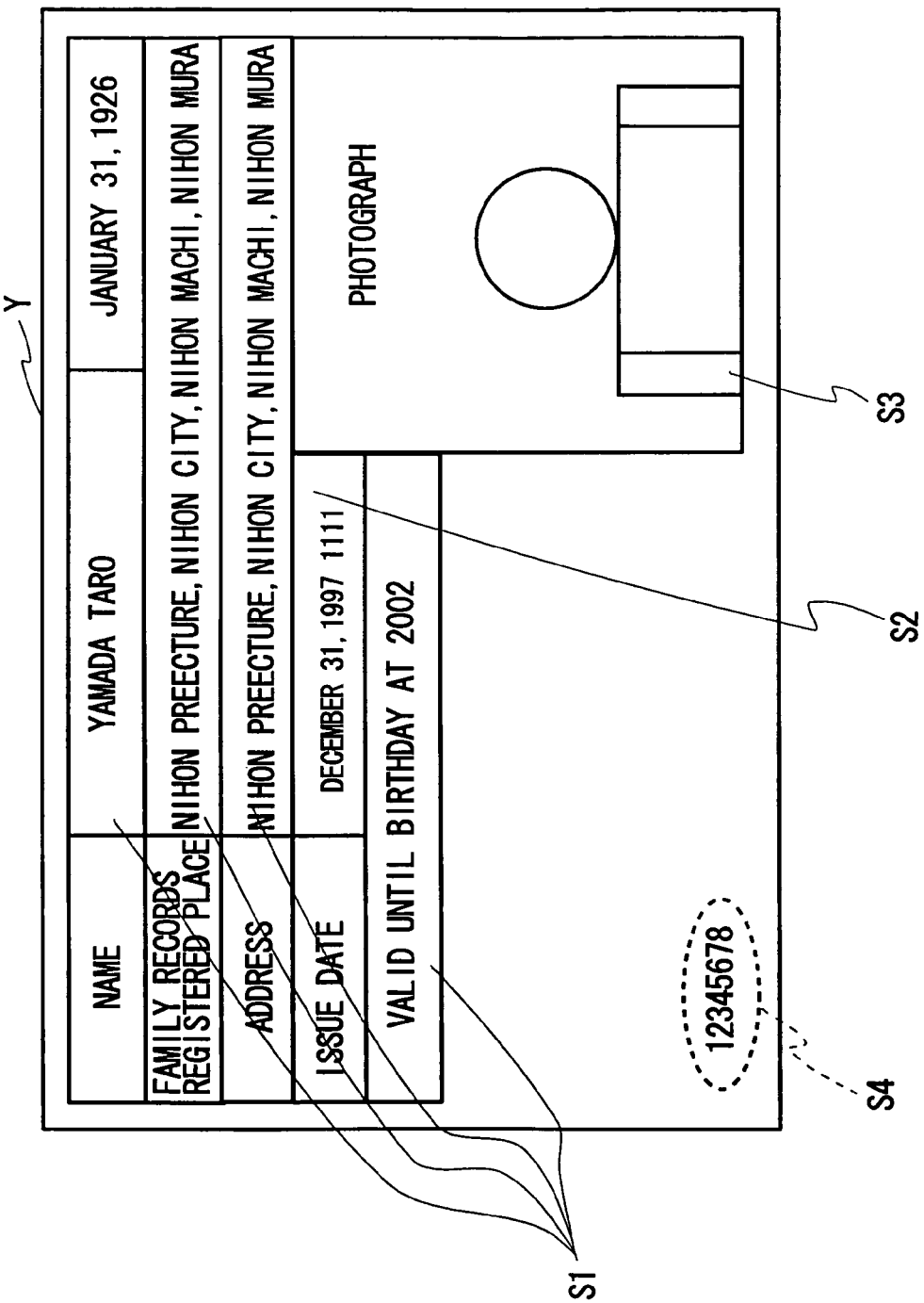
FIG. 31 shows an example of the document formats in which different kinds of the images such as characters and a photograph are mixed.

FIG. 31 shows an example of the document formats in which different kinds of the images such as characters and a photograph are mixed. This form Y shows the regions where a name, a date, a family records registered place, an address, an issue data, a validity of the license, and so on, are printed.

The information written in each of regions should not be tampered, and it is preferable to embed the digital watermark in these written information so that the tamper can be detected. However, in the case of embedding the digital watermark in an image including different kinds of the images such as characters and a photograph, the image quality may deteriorate if the partial difference in the image is not considered.

As an example of the difference in the region, for example, the difference exists in the region S1, which shows the name, "YAMADA TARO", the family records registered place, "NIHON PREFECTUREE, NIHON CITY, NIHON MACHI, NIHON MURA", the address "NIHON PREFECTUREE, NIHON CITY, NIHON MACHI, NIHON MURA", and the validity of the license, "VALID UNTIL BIRTHDAY AT 2002", the region S2, which shows the issue date, "Dec. 31, 1997", and the region S3, which shows the photograph.

Here, the difference between the region S1 and the region S2 is character size. The identification number S4 is a document classification information to identify the classification of the document. Here, the identification number S4, corresponding to the document classification, is written or printed on the designated part, at the lower left in the figure, of the form Y. In the following, the image, which is input this form Y as an image, is explained as the original image 705.

As shown in the FIG. 30, the document identifying unit 711 identifies the document classification by recognizing the identification number of the document classification by OCR or by recognizing the layout or style of the characters and the frames automatically. The document identifying unit 711 then sends the document information 714 to the document format database 712. In the case of the form Y shown in the FIG. 31, the document information will be sent by identifying the identification number S4 at the lower left of the form Y.

FIG. 32 shows an example of the document format information table. The document format information table defines the embedding region information such as the coordinates of the location where the digital watermark is embedded, the image quality information such as characters and photographs, the identification parameter which identifies whether the image is in gray scale or color scale, and the density of the digital watermark embedded corresponding to the image quality, for each of the regions.

As an example of the application of the digital watermark, which matches with the image quality, the case is assumed that the digital watermark is embedded in gray scale if the characters are expressed in gray scale. Especially, the case is assumed that the density of embedding the digital watermark changes according to the character size. For example, the digital watermark is embedded coarsely when the character size is small, and the digital watermark is embedded densely when the character size is large. If the digital watermark is embedded in an uniform density, the small character becomes difficult to see. In the case of the image that is mixed with characters in gray scale and color photographs, the color photograph becomes difficult to see if the digital watermark in gray scale is used for the color photograph, instead of the digital watermark in appropriate color scale.

The image quality information is the information, which represents the quality of the images such as a character, the character size, a monochrome photograph, a color photograph, a paint, a seal, and a mark. The image quality information shows the difference in the color pattern and density.

As shown in the FIG. 30, the digital watermark embedding unit 713 inputs the embedding region information and embeds the digital watermark in the designated region in the original image 705. During the embedding, the digital watermark embedding unit 713 uses the image quality information and applies the digital watermark method, which matches with the image quality. The digital watermark embedding unit 713 then outputs the image in which the digital watermark is embedded as the processed image 706.

Figure 33:
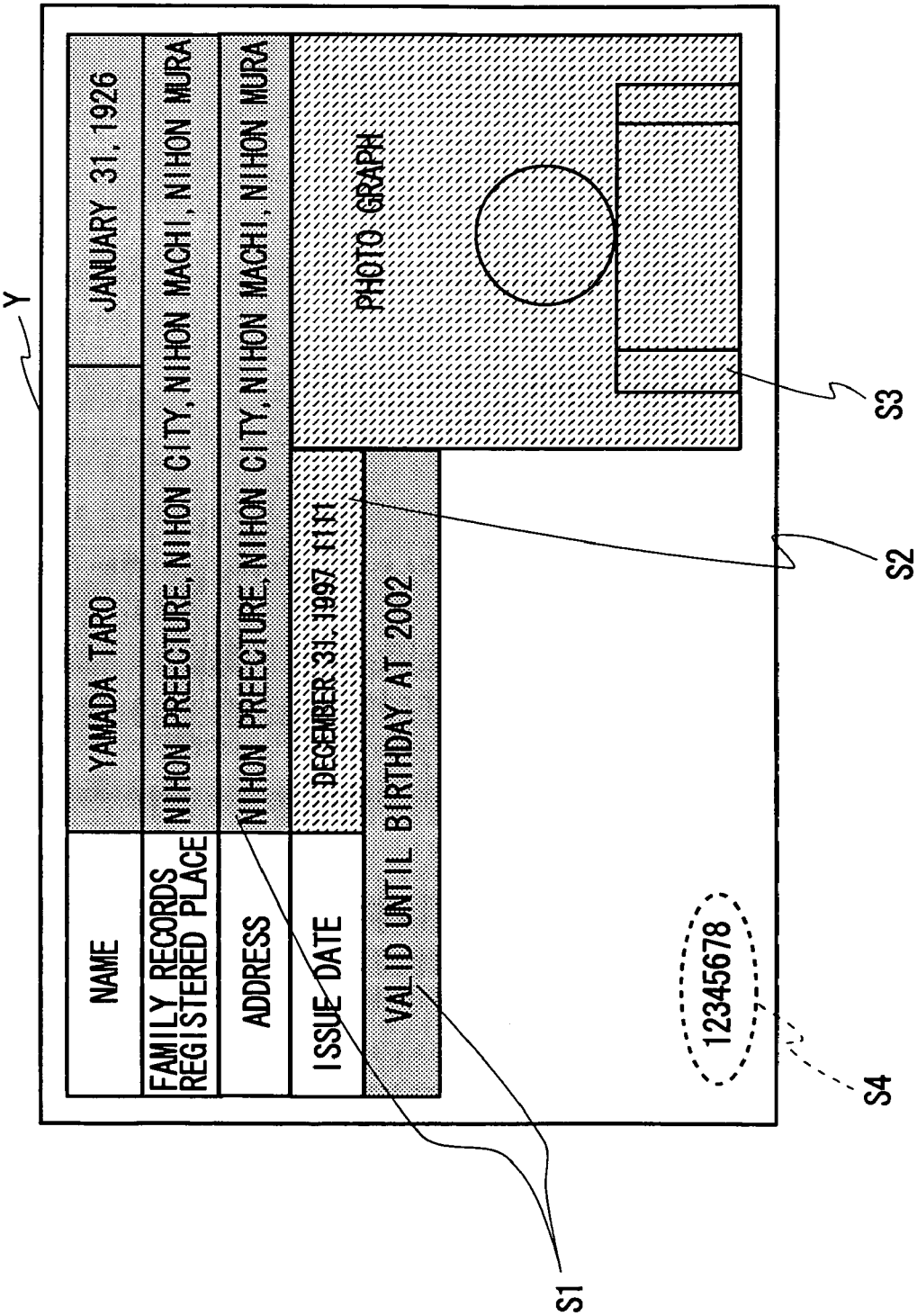
FIG. 33 shows how the digital watermark is embedded in the form Y.

FIG. 33 shows how the digital watermark is embedded in the form Y. The digital watermark is embedded in the shaded part of the figure, which is designated by the document format information 715. The invisible digital watermark cannot be clearly recognized visually in practice, but here, the digital watermark is shaded for an explanation. For example, different kinds of digital watermarks are embedded for each of the region S1 and the region S2 because the character size is different between the region S1 and the region S2. Especially, because the character size in the region S2 is smaller than the character size in the region S1, the image in the region S2 changes less than in the region S1 when the digital watermark is embedded. Furthermore, because the region S3 is a photograph, the digital watermark, which is different from in the region S1 and the region S2, is embedded in the region S3.

As a method of embedding the digital watermark that can reduce the change in the image, there is a method that reduces the quantity of the data or increases the size of the embedding unit, because the change in the image can be reduced if the quantity of the data to be embedded in the same region is reduced.

For the part where the characters are recognized by OCR after the digital watermark is embedded, the influence caused by the digital watermark on the OCR can be reduced by using the digital watermark method that does not influence the recognition rate of the OCR or by applying the digital watermark to make the change from the original image as small as possible.

The digital watermark is extracted from the original image 706 in a similar way. The document identifying unit 711 inputs the processed image 706 and outputs the document information 724 to the document format database 722. The document format database 722 outputs the document format information 725, which is based on the document information 724 and includes the embedding region information and the image quality information, to the digital watermark extracting unit 723. The digital watermark extracting unit 723 extracts the digital watermark from the region which is specified by the embedding region information, by using the digital watermark method that can be identified by the image quality information.

Therefore, when the image quality is different between the part of the characters and the part of the photograph such as the image of the document that includes a photograph, the image processing system of the twelfth embodiment changes the method of the digital watermark according to the image quality by changing the method of the digital watermark between the part of the characters and the photograph. Both the image quality of the characters and the photograph will thus be maintained.

The image processing system of the twelfth embodiment thus can minimize the deterioration of the image quality of the whole image, which is caused by embedding the digital watermark by using the image quality information and applying the most suitable digital watermark method depending on the image quality. Therefore, the image processing system of the twelfth embodiment can utilize the different digital watermarks according to the partial difference in the image so that the image processing system can used for an image which is mixed with the different kinds of images. The image quality thus does not deteriorate depends on the place. Moreover, the image processing system of the twelfth embodiment can deal with not only the influence on the human vision but also the influence on the character recognition by OCR.

The digital watermark method, which minimizes the change in the image by reducing the quantity of the data and increasing the size of the embedding region depending on the character size and color, may be used. The digital watermark method, which changes the size of the embedding region depending on the degree of the importance, may be also used. For example, for the case of the digital watermark used for detecting tamper, the degree of detecting tamper can increase by reducing the size of the tamper detecting region. Furthermore, the digital watermark method, which does not reduce the recognition ratio by using the digital watermark method that matches with the OCR method for the location where the OCR recognizes the characters, also can be used.

Figure 34:
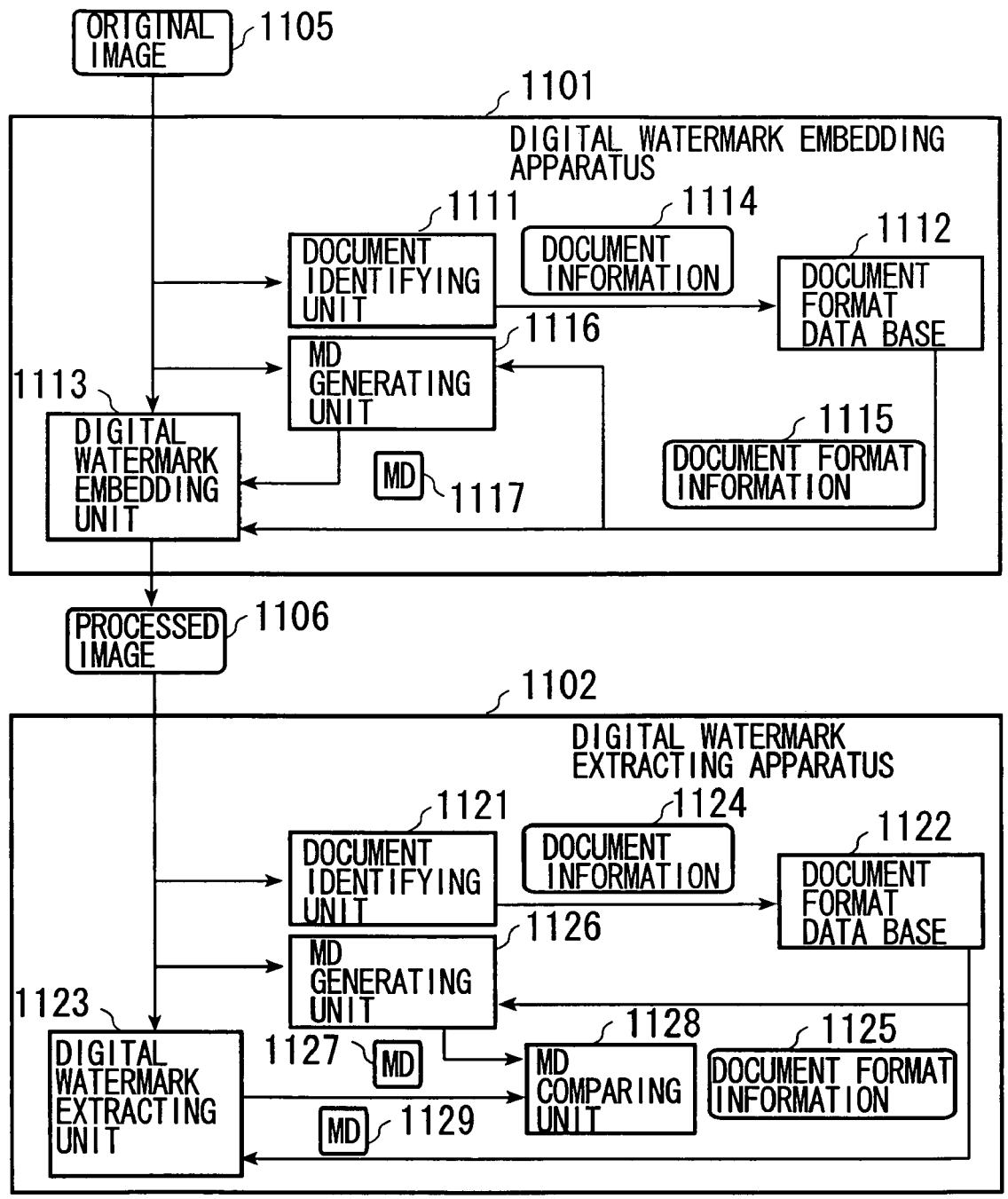
FIG. 34 shows the block diagram of the image processing system of the thirteenth embodiment.

FIG. 34 shows the block diagram of the image processing system of the thirteenth embodiment. In this image processing system, a digital watermark embedding apparatus 1101 embeds a prescribed digital watermark in the region where the specific information in the original image 1105 is displayed, for which tamper is required to be detected. The digital watermark embedding apparatus 1101 also embeds a message digest (MD) 1117 partially, which is generated corresponding to the specific information as a digital watermark. The digital watermark embedding apparatus 1101 then sends the original image 1105, in which the digital watermark and the message digest are embedded, to the digital watermark extracting apparatus 1102 as a processed image 1106.

The digital watermark extracting apparatus 1102 then extracts the prescribed digital watermark and the MD 1129 from the processed image 1106 according to a document format information 1125, which is based on a document information 1124. The document information 1124 is identical with the document information 1114, and the document format information 1125 is identical with the document format information 1115. The tamper can be detected by comparing the extracted MD 1129 with the generated MD 1127.

The digital watermark embedding apparatus 1101 comprises a document identifying unit 1111, a document format database 1112, a digital watermark embedding unit 1113, and a MD generating unit 1116. The document identifying unit 1111 has a function of identifying a document by identifying the feature of the original image 1105 or by OCR, not shown in the figure. The document identifying unit 1111 also has the function of sending the document information 1114 to the document format database 1112. The document information 1114 shows the identification of the document classification identified from the specific part. The document format database 1112 manages the information, such as the coordinates of the region, where the specific information necessary for embedding the digital watermark exists for each document classification, as a document format information table so that the information can be retrieved by using the document information 1114.

The document format database 1112 has the function of providing the information such as the coordinates to the digital watermark embedding unit 1113 as the document format information 1115, when the document information 1114 is sent from the document identifying unit 1111. The digital watermark embedding unit 1113 has a function of embedding the prescribed digital watermark in the region where the specific information in the original image 1105 is displayed, for which tamper is required to be detected, according to the document format information 1115 provided by the document format database 1112. The digital watermark embedding unit 1113 also has a function of embedding the message digest (MD) partially, which is generated corresponding to the specific information.

The MD generating unit 1116 generates the MD 1117 from the data of the object region in the original image 1105, which will be described below, defined by the document format information 1115. The MD generating unit 1116 then sends the MD 1117 to the digital watermark embedding unit 1113. The digital watermark embedding apparatus 1101 thus provides the processed image 1106, in which the prescribed digital watermark and the MD 1117 are embedded, to the digital watermark extracting apparatus 1102.

The digital watermark embedding apparatus 1102 comprises a document identifying unit 1121, a document format database 1122, a digital watermark embedding unit 1123, an MD generating unit 1126, and an MD comparing unit 1128. The document identifying unit 1121 has a function of identifying a document by identifying the feature of the original image 1106 or by OCR. The document identifying unit 1121 also has the function of sending the document information 1124 to the document format database 1122. The document format database 1122 is identical with the document format database 1112. The document format database 1122 manages the information, such as the coordinates of the necessary part, in which digital watermark is embedded for each document classification as a document format information table so that the information can be retrieved by the document information 1124.

The document format database 1122 has the function of providing the information such as the coordinates, which is identical with document format information 1115, to the digital watermark embedding unit 1123 as the document format information 1125, when the document information 1124 is sent from the document identifying unit 1121. The digital watermark extracting unit 1123 has a function of extracting the prescribed digital watermark from the region where the specific information in the original image 1106 is displayed, for which tamper is required to be detected, according to the document format information 1125 provided by the document format database 1122. The digital watermark embedding unit 1123 also has a function of extracting the MD 1129, which is embedded as a digital watermark corresponding to the specific information, from the embedding region, which is defined by the document format information 1125 and will be described below. The digital watermark embedding unit 1123 also has a function of sending the MD1129 to the MD comparing unit 1128.

The MD generating unit 1126 has the same function with the MD generating unit 1116. The MD generating unit 1126 generates the MD 1127, which is identical with the MD 1117, from the data of the object region in the original image 1106, which will be described below, defined by the document format information 1125. The MD generating unit 1126 then sends the MD 1127 to the MD comparing unit 1128. The MD comparing unit 1128 compares the MD 1127 with the MD1129. If the MD 1127 and the MD1129 are different, tampering with the processed image 1106 can be detected.

FIG. 35 shows an example of the form Z in which the digital watermark is embedded. The case is assumed that the digital watermark is used for detecting tampering with the form Z.

FIG. 36 shows an example of the document format information table. The document format information table defines the document format information that has an object region Tn, in which the prescribed digital watermark is embedded in the region where the specific information in the image is displayed, for which tamper is required to be detected, and an embedding region Un, in which the message digest corresponding to the specific information is embedded as the digital watermark.

Here, in case of the form Z shown in FIG. 35, for example, let the object region T1 be a rectangular part which encloses the "Jan. 31, 1999", and let the embedding region U1 be an rectangular part which encloses the "DATE", which corresponds to the object region T1. Similarly, let the object region T2 be a rectangular part which encloses the "0123456789", and let the embedding region U2 be an rectangular part which encloses the "CERTIFICATE NUMBER", which corresponds to the object region T2. The other regions also can be defined similarly, thus the explanation for the other regions will be omitted. The identification number W has the same function with the identification number R4 described in the ninth embodiment, thus the explanation of the identification number W will be omitted.

Figure 37:
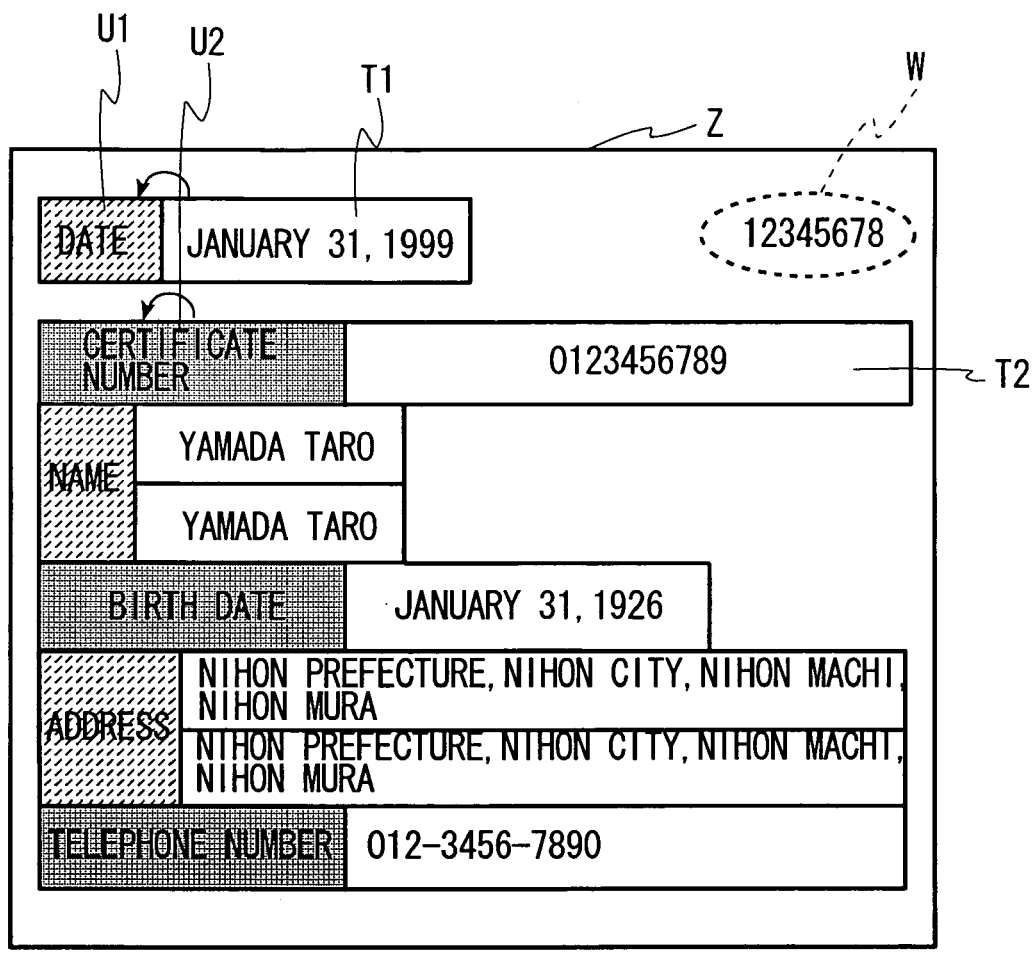
FIG. 37 shows how the digital watermark is embedded in the form Z.

FIG. 37 shows how the digital watermark is embedded in the form Z. The digital watermark is embedded in the shaded part of the figure. For example, in case of the form Z, the message digest is embedded in the shaded embedding region U1. Similarly, the message digest is embedded in the shaded embedding region U2. When these message digests are different from the message digests that are generated during the comparison, it can be verified that the object region Tn itself has been tampered.

According to the thirteenth embodiments, when the digital watermark cannot be extracted, it can be verified that the whole image or the part where the digital watermark is embedded has been tampered. Especially, it can be verified that the object region has been tampered when the extracted message digest and the generated message digest are different.

In the above explanation, the prescribed digital watermarks are embedded in the object regions T1, T2, . . . , Tn and the message digests for the object regions are generated. There can be another method that the digital watermarks are not embedded in the object regions, and the message digests are generated for the object regions, and the message digests are embedded in the embedding regions U1, U2, . . . , Un as digital watermarks.

FIG. 38 shows another example of the document format information table. The document format information table defines only the object regions T1, T2, . . . , Tn, for which tamper is required to be detected in the image and does not defines the embedding regions U1, U2, . . . , Un in which the message digests corresponding to the object regions are embedded as digital watermarks.

In this case, the information on the embedding region is embedded in the object region as a digital watermark, and the message digest corresponding to the object region is generated. Then, the generated message digest is embedded in the embedding region as a digital watermark. Therefore, it is difficult to find out the location where the message digest hides, because the embedding region cannot be known unless the digital watermark is extracted. Moreover, the size of the document format information table can be reduced.

Finally, another example of embedding the message digest will be explained. For example, it becomes difficult to find out the location where the message digest hides, which is an important information, by providing and selecting a plurality of the embedding regions in which the message digests are embedded or by selecting an embedding region among the regions other than the object regions by calculation.

Figure 39:
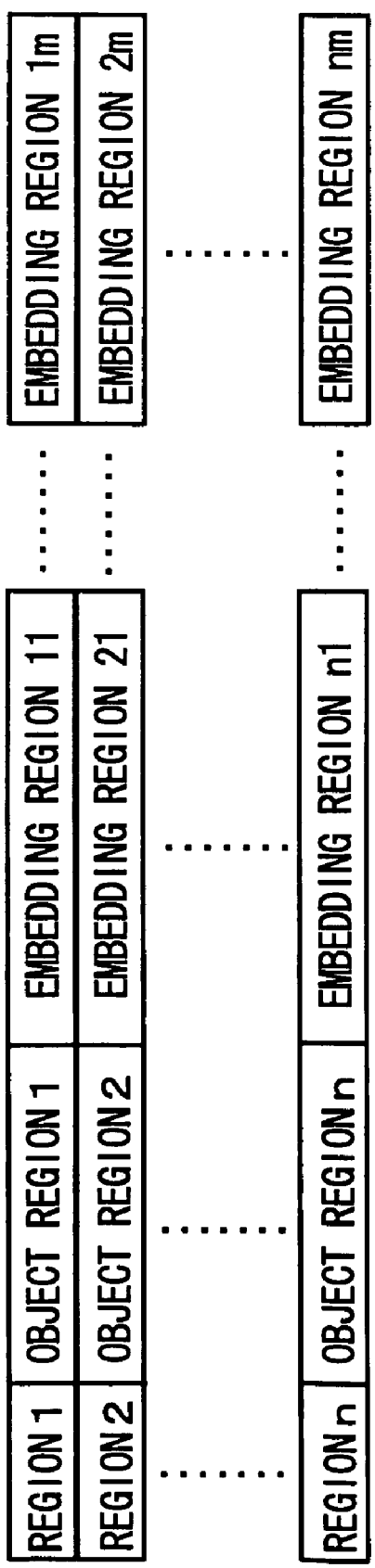
FIG. 39 shows another example of the document format information table.

FIG. 39 shows another example of the document format information table. As a document format information, a plurality of embedding regions nm is provided for one object region n, and one of the embedding regions is selected based on the values which will not change without tamper such as the message digest value, the file size, and the created date. For example, the embedding region can be selected by providing the embedding regions n0, n1, . . . , n8, n9 and generating the value from 0 to 9 by a calculation using the message digest value or the file size. During the extraction of the digital watermark, the digital watermark is also extracted by the same calculation using the message digest and the file size and selecting the embedding region based on the generated value. If the digital watermark cannot be extracted or the message digest value is different, it can be verified that the image has been tampered.

The image size is known when the original image is input. If the designated location in the object region n is known, the other location in the original image, non-object regions, can be also known. The message digest can be embedded anywhere in the non-object regions. Using a method that can determine the embedding location uniquely, the embedding region can be determined by a calculation. Then, the embedding regions does not have to be registered in the document format information. For example, the non-object region can be divided into the regions, the size of which is large enough to embed the digital watermark, and the divided non-object regions may be numbered and selected by the calculation using the message digest and the file size.

Figure 41:
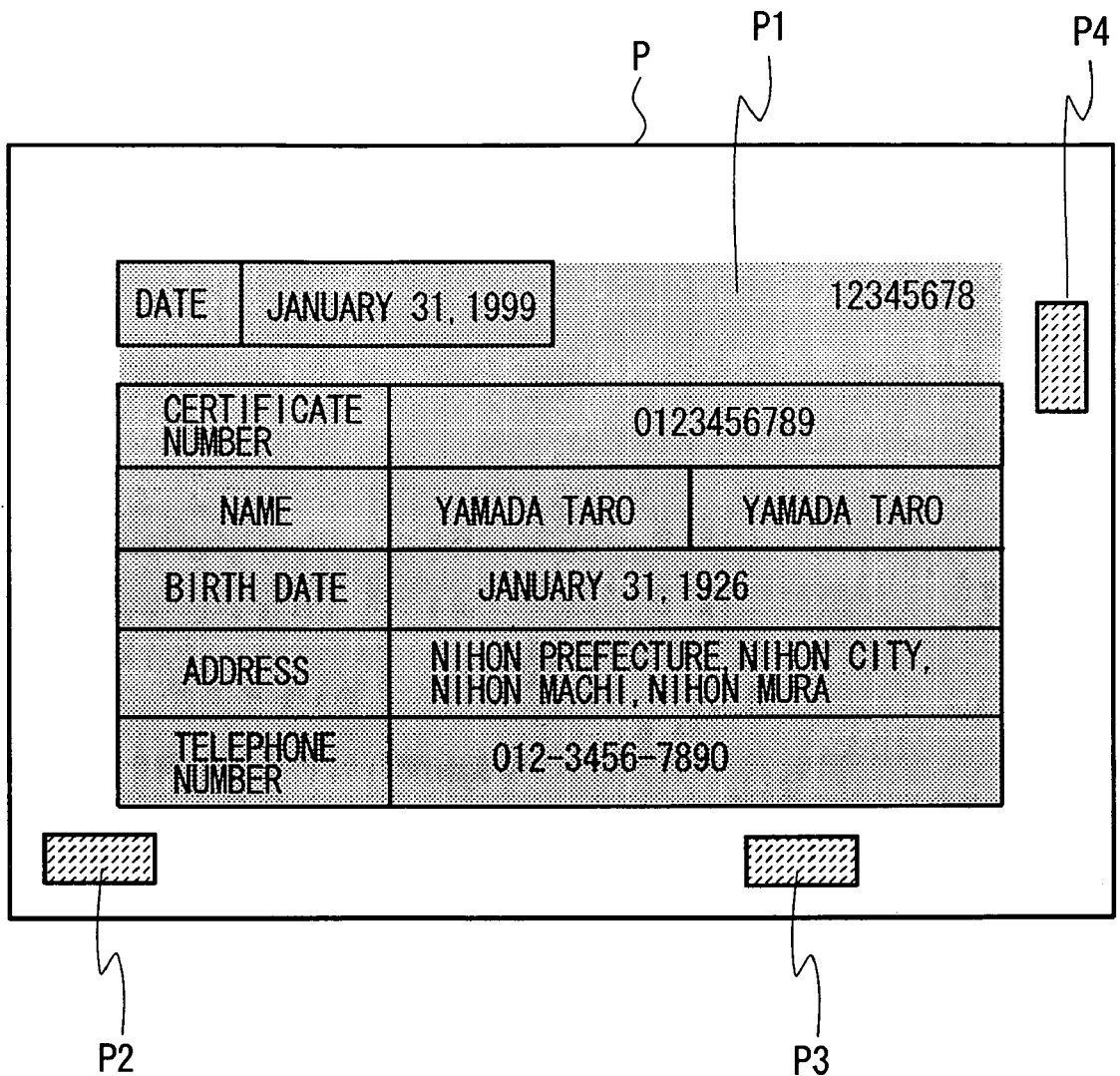
FIG. 41 shows how the message digest is embedded in the form P.

FIG. 40 shows the example of the form P. FIG. 41 shows how the message digest is embedded in the form P. In FIG. 41, let the shaded part in the center of the image of the form P be an object region P1. The message digest is embedded in the embedding region P2 with in the non-object region, which exists around the shade part as a digital watermark. The message digest can be embedded not only in the embedding region P2 but also in the other embedding regions P3 and P4. The embedding region, in which the message digest is embedded, may be selected by a calculation from the location that is registered in the document format information.

Therefore, it is impossible to find the place where the message digest is embedded as a digital watermark in the image of the form P. Tamper thus can be detected by using one image file without managing another file for the message digest. Furthermore, there is no deterioration in the image quality and no influence on the OCR because the digital watermark is not embedded in the unnecessary part.

A floppy disk or a CD-ROM 500 shown in FIG. 1 and FIG. 24, as an example of the recording medium, can store as a computer executable program a portion or all of the functions of the operation flow of the image processing apparatus 102, the image managing server 103, and the image displaying apparatus 105 shown in FIG. 1; the image processing apparatus 106, the image managing server 107, and the image displaying apparatus 108 shown in FIG. 15; the image processing apparatus 110, the image managing server 120, and the image displaying apparatus 130 shown in FIG. 23; the digital watermark embedding apparatus 201 and the digital watermark extracting apparatus 202 shown in FIGS. 24, 28, and 29; the digital watermark embedding apparatus 701 and the digital watermark extracting apparatus 702 shown in FIG. 30; and the digital watermark embedding apparatus 1101 and the digital watermark extracting apparatus 1102 shown in FIG. 34. The stored program may be read out from the recording medium directly to a RAM in a computer for execution, or may be installed in the hard disk drive in the computer first, and then read out to the RAM for execution.

In addition to floppy disks and CD-ROM, the recording media used in the invention may include hard disk drives, ROM, RAM, optical recording media, such as DVDS, magnetic recording media, such as MDs, magneto-optical recording media, such as PDs, tape media, and semiconductor memory, such as IC cards and miniature cards.

In addition, the program may be stored in a single recording medium, or in a plurality of recording media, such as several floppy disks, CD-ROMS, or the like. Such multiple recording media are comprehensively referred to as "a recording medium" in this specification and covered by the term, "a recording medium".

Furthermore, the recording medium may store the program to be supplied to the computer by a host computer via a communication network. The program may be stored in the hard disk drive in the host computer and transmitted from the host computer to the computer via the communication network. The recording medium in this specification may include such a host computer which stores the program in the recording medium such as the hard disk or the like.

As an alternative, the program may be stored in an encoded form. The program may be decoded and read out to another recording medium such as the RAM or the like and then executed. Further a CPU in the computer may first decode and install the program into the hard disk drive or the like from the recording medium, read out the program to another recording medium such as the RAM or the like, and then execute the program.

All recording media described in this specification are used exclusively to manufacture the image processing apparatus, the image managing server, the image displaying apparatus, the digital watermark embedding apparatus, and the digital watermark extracting apparatus explained in this specification. Therefore, it is obvious that the manufacture and sale of such recording media will constitute infringement of the patent rights based on the present invention.

As shown in the above explanation, according to the image processing system of the present invention, whether the image file has been tampered or not can be verified because the digital watermark information can be extracted from the image file, in which the digital watermark information is embedded, by using the watermark key. The watermark key includes the authentication information, which can be verified only by the apparatus that exchanges the image file with each other and identifies the image file sent from the valid provider.

Therefore, tampering by the user having a special privilege can be prevented, and thus the work of setting the access right for all the apparatus which handle images can be realized at a small cost. Moreover, because there is no need to encode the image file itself, there is no need to decode or re-encode the image file for each time of displaying the image as in conventional methods. Thus, the load for processing the image can be reduced in the system that processes a large amount of images. As a result, the system can manage the images more effectively. The iniquity made on the machine, which is less strictly secured, can be prevented in the system in which the images are used by a plurality of machines distributed within the system.

Even without the cryptosystem to manage the verifying data, tampering with the image can be detected, and thus the management of the cryptosystem itself does not have to be strictly secured.

Furthermore, the image processing system of the present invention can process the image within a short time and at a small cost, because the digital watermark is embedded only in the necessary part so that the quantity of the information of the image file itself can decrease. Then, the image size after the image compression becomes small and saves the storing space for storing the image file.

For an image which is mixed with the images with different quality such as a character and a photograph, the image processing system of the present invention can utilize the different digital watermark according to the partial difference in the image. Therefore, the problem of the deterioration in the image quality depending on the part of the image can be solved. The problem that the human eye or the OCR cannot recognize characters in which the watermark is embedded will not occur, because the noise, which is caused by embedding the watermark in characters, can be suppressed by embedding the appropriate digital watermark according to the character size and quality.

Furthermore, tamper can be easily detected because the message digest is embedded in a part of the image file as a digital watermark. If the image file has been tampered, the embedded message digest will changes so that tamper can be detected by comparing the message digest extracted from the image file and the message digest generated from the data which is displayed. The image processing system of the present invention thus can easily provide a strict security.

Therefore, the present invention can prevent tampering with the image file and detect tampering with the image file easily and provide the image processing system with a small image processing load and a small cost.

Furthermore, The image processing system of the present invention does not deteriorate the image quality and increase the image size after compressing the image file in which the digital watermarks is embedded. The image processing system of the present invention can provide a strictly secured system to detect tampering with the image files easily.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image processing system comprising:
    an image providing apparatus which acquires document information which indicates a document format of an image to be processed from at least a part of the image, said image providing apparatus defining a location information indicating at least one region of the image, in which region a digital watermark is embedded based on the document information, and provides said image having a predetermined region in which the digital watermark is embedded, based on said location information;
    a document format database for managing information of the region where the digital watermark is embedded so that the information can be retrieved by using the document information; and
    an image utilizing apparatus which extracts said digital watermark from image data of said image provided by said image providing apparatus based on said location information, and verifies whether any of said image data in said predetermined region, in which said digital watermark is embedded, has been tampered.

2. An image processing system comprising:
    an image providing apparatus which acquires document information which indicates a document format of an image to be processed from at least a part of the image, said image providing apparatus recognizing a format for indicating at least one region of the image, in which region a digital watermark is embedded based on the document information, and provides image data in which a digital watermark is embedded in a predetermined region identified by said document information;
    a document format database for managing information of the region where the digital watermark is embedded so that the information can be retrieved by using the document information; and
    an image utilizing apparatus which recognizes said format of image data of the at least one region of the image, extracts said digital watermark from said at least one region based on said format, and verifies whether said image data in said predetermined region, in which said digital watermark is embedded, has been tampered.

3. An image processing system as claimed in claim 1 or 2, wherein said image providing apparatus provides said image data in which a different kind of said digital watermark is embedded in a different region in said image data.

4. An image processing system as claimed in claim 3, wherein said image providing apparatus provides said image data in which a different kind of said digital watermark is embedded according to an image quality in each region where said digital watermark is embedded.

5. An image processing system as claimed in claim 1, wherein:
    said location information for embedding a digital watermark includes a location information of a region for displaying a specific information necessary for detecting a tamper; and
    said image utilizing apparatus extracts said digital watermark with said message digest from said image data based on said location information, and generates a corresponding message digest using said specific information in said provided image data, and detects tampering with said image data by comparing said extracted message digest with said corresponding generated message digest.

6. An image processing system as claimed in claim 1, wherein:
    said location information for embedding a digital watermark includes a location information of a region for displaying a specific information necessary for detecting a tamper and a location information of a region for embedding a message digest corresponding to said specific information; and
    said image utilizing apparatus extracts said digital watermark with said message digest from said image data based on said location information, generates a corresponding message digest using said specific information in said provided image data, and detects tampering with said image data by comparing said extracted message digest with said corresponding generated message digest.

7. An image processing system as claimed in claim 6, wherein said region for embedding said message digest corresponding to said specific information is independent of said region for displaying said specific information necessary for detecting said tamper.

8. An image processing system as claimed in claim 1, wherein:
    said location information is registered in both of said image providing apparatus and said image utilizing apparatus;
    said image providing apparatus embeds said digital watermark in said image data based on said registered location information; and
    said image utilizing apparatus extracts said digital watermark from said image data based on said registered location information.

9. An image processing system as claimed in claim 1, wherein:
    said image providing apparatus transfers said location information to said image utilizing apparatus;

said image providing apparatus embeds said digital watermark in said image data based on said location information to be transferred; and said image utilizing apparatus extracts said digital watermark from said image data based on said location information transferred from said image providing apparatus.

10. An image processing system as claimed in claim 1, wherein said digital watermark includes a digital watermark information that is extractable by using a watermark key that includes an authentication information which authenticates said image data provided by a valid provider, and said watermark key of said image data, and wherein said image utilizing apparatus which extracts said digital watermark information from said image data provided by said image providing apparatus using said watermark key provided by said image providing apparatus, verifies whether said watermark key has been tampered or not using said authentication information in said watermark key, verifies whether said image data has been tampered or not using said verified watermark key, and displays said verified image data.

11. The image processing system according to claim 10, wherein a density of said digital watermark is adjusted to a quality of said image data.

12. The image processing according to claim 11, wherein a data amount of said digital watermark for a character is smaller than one for another type of information in said image data.

13. The image processing system according to claim 1, wherein a density of said digital watermark is adjusted to a quality of said image data.

14. The image processing system according to claim 13, wherein a data amount of said digital watermark for a character is smaller than one for another type of information in said image data.

15. The image processing system according to claim 1, wherein said predetermined region includes at least one of character information or image information.

16. The image processing system according to claim 15, wherein a density of said digital watermark embedded in a predetermined region comprising character information is smaller than a density of said digital watermark embedded in a predetermined region comprising image information.

17. The image processing system according to claim 1, wherein said image processing apparatus further comprises means for storing said document information.

18. An image processing system as claimed in claim 2, wherein said digital watermark includes a digital watermark information that is extractable by using a watermark key that includes an authentication information which authenticates said image data provided by a valid provider, and said watermark key of said image data, and wherein said image utilizing apparatus which extracts said digital watermark information from said image data provided by said image providing apparatus using said watermark key provided by said image providing apparatus, verifies whether said watermark key has been tampered or not using said authentication information in said watermark key, verifies whether said image data has been tampered or not using said verified watermark key, and displays said verified image data.

19. The image processing system according to claim 18, wherein a density of said digital watermark is adjusted to a quality of said image data.

20. The image processing according to claim 19, wherein a data amount of said digital watermark for a character is smaller than one for another type of information in said image data.

21. The image processing system according to claim 2, wherein a density of said digital watermark is adjusted to a quality of said image data.

22. The image processing system according to claim 21, wherein a data amount of said digital watermark for a character is smaller than one for another type of information in said image data.

23. The image processing system according to claim 2, wherein said predetermined region includes at least one of character information or image information.

24. The image processing system according to claim 23, wherein a density of said digital watermark embedded in a predetermined region comprising character information is smaller than a density of said digital watermark embedded in a predetermined region comprising image information.

25. The image processing system according to claim 2, wherein said image processing apparatus further comprises means for storing said document information.

26. An image providing apparatus comprising:

a location defining means which acquires document information to indicate a document format of an image to be processed from at least a part of the image and defines a location information indicating at least one region of the image, in which region a digital watermark is embedded based on the document information;

a document format database for managing information of the region where the digital watermark is embedded so that the information can be retrieved by using the document information; and a providing means which provides said image having a predetermined region in in which said digital watermark is embedded based on said location information.

27. An image providing apparatus comprising:

a format recognizing means which acquires document information which indicates a document format of an image to be processed from at least a part of the image and recognizes a format for indicating at least one region of the image, in which region a digital watermark is embedded based on the document information;

a providing means which provides image data of the at least one region of the image in which a digital watermark is embedded in a predetermined region identified by the document information based on said format and a document format database for managing information of the region where the digital watermark is embedded so that the information can be retrieved by using the document information.

28. An image providing apparatus as claimed in claim 26 or 27, wherein said providing means provides said image data in which a different kind of said digital watermark is embedded in a different region in said image data.

29. An image providing apparatus as claimed in claim 28, wherein said providing means provides said image data in which a different kind of said digital watermark is embedded according to an image quality in each region where said digital watermark is embedded.

30. An image providing apparatus as claimed in claim 26, wherein said location information for embedding a digital watermark includes a location information of a region for displaying a specific information necessary for detecting a tamper and a location information of a region for embedding a message digest corresponding to said specific information.

31. An image providing apparatus as claimed in claim 30, wherein said region for embedding said message digest corresponding to said specific information is independent of said region for displaying said specific information necessary for detecting said tamper.

32. An image providing apparatus as claimed in claim 26, further comprising:
an image utilizing apparatus that includes:
an inputting means which inputs said image data;
an extracting means which extracts said digital watermark from said image data based on said location information; and
a verifying means which verifies whether said image data in said predetermined region, in which said digital watermark is embedded, has been tampered.

33. An image utilizing apparatus as claimed in claim 32, further comprising a generating means which generates a corresponding message digest using said specific information in said input image data, and wherein:
said extracting means which extracts said digital watermark with said message digest from said image data based on said location information; and
said verifying means which detects tampering with said image data by comparing said extracted message digest with said corresponding generated message digest.

34. The image utilizing apparatus according to claim 32, wherein a density of said digital watermark is adjusted to a quality of said image data.

35. The image utilizing apparatus according to claim 34, wherein a data amount of said digital watermark for a character is smaller than one for another type of information in said image data.

36. The image providing apparatus according to claim 26, wherein a density of said digital watermark is adjusted to a quality of said image data.

37. The image providing apparatus according to claim 36, wherein a data amount of said digital watermark for a character is smaller than one for another type of information in said image data.

38. The image providing apparatus according to claim 26, wherein said predetermined region includes at least one of character information or image information.

39. The image processing system according to claim 38, wherein a density of said digital watermark embedded in a predetermined region comprising character information is smaller than a density of said digital watermark embedded in a predetermined region comprising image information.

40. The image providing apparatus according to claim 26, further comprising:
means for storing said document information.

41. An image providing apparatus as claimed in claim 27, further comprising:
an image utilizing apparatus that includes:
an inputting means which inputs said image data;
an extracting means which extracts said digital watermark from said predetermined region based on said format; and
a verifying means which verifies whether said image data in said predetermined region, in which said digital watermark is embedded, has been tampered.

42. The image providing apparatus according to claim 41, wherein a density of said digital watermark is adjusted to a quality of said image data.

43. The image providing apparatus according to claim 42, wherein a data amount of said digital watermark for a character is smaller than one for another type of information in said image data.

44. The image providing apparatus according to claim 27, wherein a density of said digital watermark is adjusted to a quality of said image data.

45. The image providing apparatus according to claim 44, wherein a data amount of said digital watermark for a character is smaller than one for another type of information in said image data.

46. The image providing apparatus according to claim 27, wherein said predetermined region includes at least one of character information or image information.

47. The image providing apparatus according to claim 46, wherein a density of said digital watermark embedded in a predetermined region comprising character information is smaller than a density of said digital watermark embedded in a predetermined region comprising image information.

48. The image providing apparatus according to claim 27, further comprising:
means for storing said document information.

49. A recording medium storing a program to be executed by a computer, said program comprising:
a location defining module which acquires document information which indicates a document format of an image to be processed from at least a part of the image and defines a location information indicating at least one region of the image, in which region a digital watermark is embedded in a predetermined region identified by the document information;
a document format database for managing information of the region where the digital watermark is embedded so that the information can be retrieved by using the document information; and
a providing module which provides image data of the at least one region of the image in which said digital watermark is embedded based on said location information.

50. A recording medium storing a program to be executed by a computer, said program comprising:
a format recognizing module which acquires document information which indicates a document format of an image to be processed from at least a part of the image and recognizes a format for indicating at least one region of the image, in which region a digital watermark is embedded based on the document information;
a providing module which provides image data of the at least one region of the image in which a digital watermark is embedded in a predetermined region identified by the document information based on said format and
a document format database for managing information of the region where the digital watermark is embedded so that the information can be retrieved by using the document information.

51. A recording medium as claimed in claim 49 or 50, wherein said providing module provides said image data in which a different kind of said digital watermark is embedded in a different region in said image data.

52. A recording medium as claimed in claim 51, wherein said providing module provides said image data in which a different kind of said digital watermark is embedded according to an image quality in each region where said digital watermark is embedded.

53. A recording medium as claimed in claim 49, wherein said location information for embedding a digital watermark includes a location information of a region for displaying a specific information necessary for detecting a tamper and a location information of a region for embedding a message digest corresponding to said specific information.

54. A recording medium as claimed in claim 53, wherein said region for embedding said message digest corresponding to said specific information is independent of said region for displaying said specific information necessary for detecting said tamper.

55. A recording medium as claimed in claim 49, said program further comprising:
an inputting module which inputs said image data;
an extracting module which extracts said digital watermark from said image data based on said location information; and
a verifying module which verifies whether said image data in said predetermined region, in which said digital watermark is embedded, has been tampered.

56. A recording medium as claimed in claim 55, further comprising a generating module which generates a corresponding message digest using said specific information in said input image data, and wherein:
said extracting module which extracts said digital watermark with said message digest from said image data based on said location information; and
said verifying module which detects tampering with said image data by comparing said extracted message digest with said corresponding generated message digest.

57. The recording medium according to claim 55, wherein a density of said digital watermark is adjusted to a quality of said image data.

58. The recording medium according to claim 57, wherein a data amount of said digital watermark for a character is smaller than one for another type of information in said image data.

59. The recording medium according to claim 49, wherein a density of said digital watermark is adjusted to a quality of said image data.

60. The recording medium according to claim 59, wherein a data amount of said digital watermark for a character is smaller than one for another type of information in said image data.

61. The recording medium according to claim 49, wherein said predetermined region includes at least one of character information or image information.

62. The recording medium according to claim 61, wherein a density of said digital watermark embedded in a predetermined region comprising character information is smaller than a density of said digital watermark embedded in a predetermined region comprising image information.

63. The recording medium according to claim 49, said program further comprising:
a storing module which stores said document information.

64. A recording medium as claimed in claim 50, said program further comprising:
an inputting module which inputs said image data;
an extracting module which extracts said digital watermark from said predetermined region based on said format; and
a verifying module which verifies whether said image data in said predetermined region, in which said digital watermark is embedded, has been tampered.

65. The recording medium according to claim 64, wherein a density of said digital watermark is adjusted to a quality of said image data.

66. The recording medium according to claim 65, wherein a data amount of said digital watermark for a character is smaller than one for another type of information in said image data.

67. The recording medium according to claim 50, wherein a density of said digital watermark is adjusted to a quality of said image data.

68. The recording medium according to claim 67, wherein a data amount of said digital watermark for a character is smaller than one for another type of information in said image data.

69. The recording medium according to claim 50, wherein said predetermined region include at least one of character information or image information.

70. The recording medium according to claim 69, wherein a density of said digital watermark embedded in a predetermined region comprising character information is smaller than a density of said digital watermark embedded in a predetermined region comprising image information.

71. The recording medium according to claim 50, said program further comprising:
a storing module which stores said document information.

72. An image verifying method comprising:
inputting image data in which a document information indicates a document format of an image to be processed from at least a part of the image and a location information indicates at least one region of the image, in which region a digital watermark is embedded based on the document information;
a document format database for managing information of the region where the digital watermark is embedded so that the information can be retrieved by using the document information;
extracting said digital watermark from said image data based on said location information; and
verifying whether said image data in a predetermined region, in which said digital watermark is embedded, has been tampered.

73. An image verifying method as claimed in claim 72, further comprising generating a corresponding message digest using said specific information in said input image data, and wherein:
said extracting said digital watermark extracts said digital watermark with said message digest from said image data based on said location information; and
said verifying tampering detects tampering with said image data by comparing said extracted message digest with said corresponding generated message digest.

74. The image verifying method according to claim 72, wherein a density of said digital watermark is adjusted to a quality of said image data.

75. The image verifying method according to claim 74, wherein a data amount of said digital watermark for a character is smaller than one for another type of information in said image data.

76. The image verifying method according to claim 72, wherein said predetermined region include at least one of character information or image information.

77. The image verifying method according to claim 76, wherein a density of said digital watermark embedded in a predetermined region comprising character information is smaller than a density of said digital watermark embedded in a predetermined region comprising image information.

78. The image verifying method according to claim 72, further comprising:
storing said document information.

79. An image verifying method comprising:
inputting image data;
acquiring document information from the inputted image data which indicates a document format of an image to be processed from at least a part of the image;

recognizing said format of said image data and defining a location information which indicates at least one region of the image, in which region a digital watermark is embedded based on the document information;

a document format database for managing information of the region where the digital watermark is embedded so that the information can be retrieved by using the document information;

extracting said digital watermark from said predetermined region based on said format; and verifying whether said image data in a predetermined region, in which said digital watermark is embedded, has been tampered.

80. The image verifying method according to claim 79, wherein a density of said digital watermark is adjusted to a quality of said image data.

81. The image verifying method according to claim 80, wherein a data amount of said digital watermark for a character is smaller than one for another type of information in said image data.

82. The image verifying method according to claim 79, wherein said predetermined region includes at least one of character information or image information.

83. The image verifying method according to claim 82, wherein a density of said digital watermark embedded in a predetermined region comprising character information is smaller than a density of said digital watermark embedded in a predetermined region comprising image information.

84. The image verifying method according to claim 79, further comprising:

storing said document information.

85. An image processing system comprising:

an image providing apparatus comprising:
  a document identifying unit configured to provide original image data in a plurality of regions, acquire document information which indicates a document format of an image to be processed from at least a part of the image data, define a location information indicating at least one region of the image, in which region a digital watermark is embedded based on the document information and provide the document information to identify the region of the image in which the digital watermark is embedded;
  a document format database configured to manage information of the region by receiving the document information and providing a document format information for embedding a digital watermark in the at least one region of the image, and
  a digital watermark embedding unit configured to form processed image data by embedding the digital watermark in at least one predetermined region of the image according to the document format information, and provide the processed image data; and an image utilizing apparatus comprising:
  a document identifying unit configured to identify the processed image data, and provide the document information identifying the at least one region of the image where the digital watermark is embedded;
  a document format database configured to manage information by receiving the document information and providing the document format information for the at least one region of the image where the digital watermark is embedded, and
  a digital watermark extracting unit configured to extract the digital watermark embedded in the at least one region of the image according to the document format information, and verify whether any of said processed image data in said at least one region, in which said digital watermark is embedded, has been tampered.

86. An image processing system as claimed in claim 85, wherein said digital watermark extracting unit of the image utilizing apparatus is further configured to authenticate the processed image data in the at least one predetermined region by using a watermark key including an authentication information.

87. An image processing system as claimed in claim 85, wherein said digital watermark embedding unit of the image providing apparatus is further configured to recognize a format of said original image data, and embed the digital watermark the digital watermark in the at least one region based on said format, and wherein said digital watermark extracting unit of the image utilizing apparatus is further configured to recognize a format of said processed image data, and verify whether the processed image data in the at least one predetermined region, in which said digital watermark has been embedded, has been tampered.

* * * * *